United States Patent
Diorio, Jr. et al.

(10) Patent No.: US 12,259,616 B1
(45) Date of Patent: Mar. 25, 2025

(54) HELICONICAL LIQUID CRYSTAL POLARIZATION HOLOGRAM AND DEVICE INCLUDING THE SAME

(71) Applicant: Meta Platforms Technologies, LLC, Menlo Park, CA (US)

(72) Inventors: Nicholas John Diorio, Jr., Duvall, WA (US); Mengfei Wang, Woodinville, WA (US); Yuge Huang, Painted Post, NY (US); Kai-Han Chang, Troy, MI (US); Lu Lu, Kirkland, WA (US); Xiayu Feng, Kirkland, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 18/498,001

(22) Filed: Oct. 30, 2023

(51) Int. Cl.
G02F 1/13363 (2006.01)
G02F 1/1335 (2006.01)
G02F 1/1337 (2006.01)
G02F 1/1343 (2006.01)

(52) U.S. Cl.
CPC .. G02F 1/133636 (2013.01); G02F 1/133528 (2013.01); G02F 1/133753 (2013.01); G02F 1/134318 (2021.01)

(58) Field of Classification Search
CPC ......... G02F 1/133636; G02F 1/133528; G02F 1/133753; G02F 1/134318
See application file for complete search history.

(56) References Cited

U.S. PATENT DOCUMENTS

2008/0030635 A1* 2/2008 Chien ................. G02F 1/13718
349/33
2019/0361284 A1* 11/2019 Yang ........................ E06B 9/24

OTHER PUBLICATIONS

Xiang J., et al., "Electrooptic Response of Chiral Nematic Liquid Crystals with Oblique Helicoidal Director," Physical Review Letters, May 30, 2014, vol. 112, No. 21, 14 pages.
Yang D.K., "Chapter 8. Electrical Color Tuning in Polymer-stabilized Cholesteric Liquid Crystals," Polymer-modified Liquid Crystals, Jan. 2019, pp. 166-194.
Yu Bh., et al., "Light Shutter using Dye-Doped Cholesteric Liquid Crystals with Polymer Network Structure," Journal of Information Display, Jan. 2, 2017, vol. 18, No. 01, pp. 13-17.

* cited by examiner

Primary Examiner — James A Dudek
(74) Attorney, Agent, or Firm — MILLBURN IP PLLC

(57) ABSTRACT

A device includes a plurality of electrode layers. The device also includes a birefringent medium layer disposed between the plurality of electrode layers. The device also includes at least one alignment structure disposed at a surface of the birefringent medium layer. The birefringent medium layer includes liquid crystal molecules arranged in a plurality of helical twist structures having a helical axis. The plurality of electrode layers are configured to generate an electric field within the birefringent medium layer, and the liquid crystal molecules are aligned via the electric field to be titled with respect to the helical axis.

15 Claims, 30 Drawing Sheets

HELICONICAL LIQUID CRYSTAL POLARIZATION HOLOGRAM AND DEVICE INCLUDING THE SAME

TECHNICAL FIELD

The present disclosure generally relates to optical components and optical devices and, more specifically, to a heliconical liquid crystal polarization hologram and a device including the same.

BACKGROUND

Liquid crystal polarization holograms ("LCPHs") combine features of liquid crystal devices and polarization holograms. Liquid crystal displays ("LCDs"), having grown to a trillion dollar industry over the past decades, are the most successful examples of liquid crystal devices. The LCD industry has made tremendous investments to scale manufacturing, from the low end G2.5 manufacturing line to the high end G10.5+ to meet the market demands for displays. However, the LCD industry has recently faced competition from organic light-emitting diodes ("OLED"), e-paper and other emerging display technologies, which has flattened the growth rate of LCD industry and has rendered significant early generation capacity redundant. This provides an opportunity to repurpose the LCD idle capacity and existing supply chain to manufacture novel LC optical devices characterized by their polarization holograms.

LCPHs or LCPH elements have features such as small thickness (about 1 µm), light weight, compactness, large aperture, high efficiency, simple fabrication, etc. Thus, LCPH elements have gained increasing interests in optical device and system applications, e.g., near-eye displays ("NEDs"), head-up displays ("HUDs"), head-mounted displays ("HMDs"), smart phones, laptops, televisions, or vehicles, etc. For example, LCPH elements may be used for addressing accommodation-vergence conflict, enabling thin and highly efficient eye-tracking and depth sensing in space constrained optical systems, developing optical combiners for image formation, correcting chromatic aberrations for image resolution enhancement of refractive optical elements in compact optical systems, and improving the efficiency and reducing the size of optical systems.

SUMMARY OF THE DISCLOSURE

Consistent with an aspect of the present disclosure, a device is provided. The device includes a plurality of electrode layers. The device also includes a birefringent medium layer disposed between the plurality of electrode layers. The device also includes at least one alignment structure disposed at a surface of the birefringent medium layer. The birefringent medium layer includes liquid crystal molecules arranged in a plurality of helical twist structures having a helical axis. The plurality of electrode layers are configured to generate an electric field within the birefringent medium layer, and the liquid crystal molecules are aligned via the electric field to be titled with respect to the helical axis.

Other aspects of the present disclosure can be understood by those skilled in the art in light of the description, the claims, and the drawings of the present disclosure. The foregoing general description and the following detailed description are exemplary and explanatory only and are not restrictive of the claims.

BRIEF DESCRIPTION OF THE DRAWINGS

The following drawings are provided for illustrative purposes according to various disclosed embodiments and are not intended to limit the scope of the present disclosure. In the drawings.

DETAILED DESCRIPTION

Figure 1A:
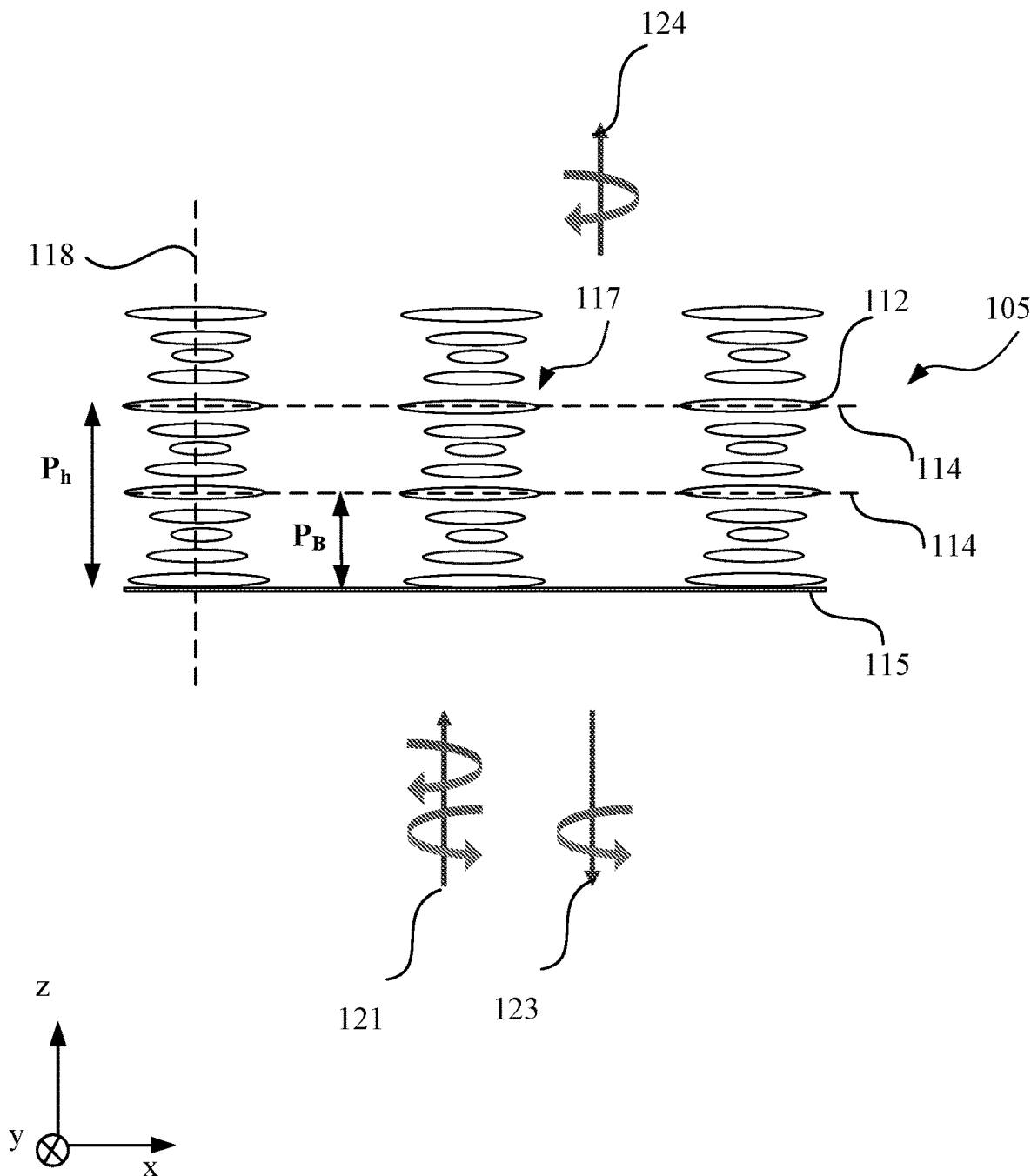
FIG. 1A illustrates a schematic diagram of a conventional cholesteric liquid crystal ("CLC") element including helicoidal twist structures.

Embodiments consistent with the present disclosure will be described with reference to the accompanying drawings, which are merely examples for illustrative purposes and are not intended to limit the scope of the present disclosure. Wherever possible, the same reference numbers are used throughout the drawings to refer to the same or similar parts, and a detailed description thereof may be omitted.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope of the present disclosure. Accordingly, the present disclosure is not limited to the disclosed embodiments. Instead, the scope of the present disclosure is defined by the appended claims.

As used herein, the terms "couple," "coupled," "coupling," or the like may encompass an optical coupling, a mechanical coupling, an electrical coupling, an electromagnetic coupling, or any combination thereof. An "optical coupling" between two optical elements refers to a configuration in which the two optical elements are arranged in an optical series, and a light output from one optical element may be directly or indirectly received by the other optical element. An optical series refers to optical positioning of a plurality of optical elements in a light path, such that a light output from one optical element may be transmitted, reflected, diffracted, converted, modified, or otherwise processed or manipulated by one or more of other optical elements. In some embodiments, the sequence in which the plurality of optical elements are arranged may or may not affect an overall output of the plurality of optical elements. A coupling may be a direct coupling or an indirect coupling (e.g., coupling through an intermediate element).

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" may be interpreted in a manner similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

When a first element is described as "attached," "provided," "formed," "affixed," "mounted," "secured," "connected," "bonded," "recorded," or "disposed," to, on, at, or at least partially in a second element, the first element may be "attached," "provided," "formed," "affixed," "mounted," "secured," "connected," "bonded," "recorded," or "disposed," to, on, at, or at least partially in the second element using any suitable mechanical or non-mechanical manner, such as depositing, coating, etching, bonding, gluing, screwing, press-fitting, snap-fitting, clamping, etc. In addition, the first element may be in direct contact with the second element, or there may be an intermediate element between the first element and the second element. The first element may be disposed at any suitable side of the second element, such as left, right, front, back, top, or bottom.

When the first element is shown or described as being disposed or arranged "on" the second element, term "on" is merely used to indicate an example relative orientation between the first element and the second element. The description may be based on a reference coordinate system shown in a figure, or may be based on a current view or example configuration shown in a figure. For example, when a view shown in a figure is described, the first element may be described as being disposed "on" the second element. It is understood that the term "on" may not necessarily imply that the first element is over the second element in the vertical, gravitational direction. For example, when the assembly of the first element and the second element is turned 180 degrees, the first element may be "under" the second element (or the second element may be "on" the first element). Thus, it is understood that when a figure shows that the first element is "on" the second element, the configuration is merely an illustrative example. The first element may be disposed or arranged at any suitable orientation relative to the second element (e.g., over or above the second element, below or under the second element, left to the second element, right to the second element, behind the second element, in front of the second element, etc.).

When the first element is described as being disposed "on" the second element, the first element may be directly or indirectly disposed on the second element. The first element being directly disposed on the second element indicates that no additional element is disposed between the first element and the second element. The first element being indirectly disposed on the second element indicates that one or more additional elements are disposed between the first element and the second element.

The term "processor" used herein may encompass any suitable processor, such as a central processing unit ("CPU"), a graphics processing unit ("GPU"), an application-specific integrated circuit ("ASIC"), a programmable logic device ("PLD"), or any combination thereof. Other processors not listed above may also be used. A processor may be implemented as software, hardware, firmware, or any combination thereof.

The term "controller" may encompass any suitable electrical circuit, software, or processor configured to generate a control signal for controlling a device, a circuit, an optical element, etc. A "controller" may be implemented as software, hardware, firmware, or any combination thereof. For example, a controller may include a processor, or may be included as a part of a processor.

The term "non-transitory computer-readable medium" may encompass any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("RAM"), a flash memory, etc.

The term "film," "layer," "coating," or "plate" may include rigid or flexible, self-supporting or free-standing film, layer, coating, or plate, which may be disposed on a supporting substrate or between substrates. The terms "film," "layer," "coating," and "plate" may be interchangeable. The term "film plane" refers to a plane in the film, layer, coating, or plate that is perpendicular to the thickness direction or a normal of a surface of the film, layer, coating, or plate. The film plane may be a plane in the volume of the film, layer, coating, or plate, or may be a surface plane of the film, layer, coating, or plate. The term "in-plane" as in, e.g., "in-plane orientation," "in-plane direction," "in-plane pitch," etc., means that the orientation, direction, or pitch is within the film plane. The term "out-of-plane" as in, e.g., "out-of-plane direction," "out-of-plane orientation," or "out-of-plane pitch" etc., means that the orientation, direction, or pitch is not within a film plane (i.e., non-parallel with a film plane). For example, the direction, orientation, or pitch may be along a line that is perpendicular to a film plane, or that forms an acute or obtuse angle with respect to the film plane. For example, an "in-plane" direction or orientation may refer to a direction or orientation within a surface plane, an "out-of-plane" direction or orientation may refer to a thickness direction or orientation non-parallel with (e.g., perpendicular to) the surface plane. In some embodiments, an "out-of-plane" direction or orientation may form an acute or right angle with respect to the film plane.

The term "orthogonal" as in "orthogonal polarizations" or the term "orthogonally" as in "orthogonally polarized" means that an inner product of two vectors representing the two polarizations is substantially zero. For example, two lights or beams with orthogonal polarizations (or two orthogonally polarized lights or beams) may be two linearly polarized lights (or beams) with two orthogonal polarization directions (e.g., an x-axis direction and a y-axis direction in a Cartesian coordinate system) or two circularly polarized lights with opposite handednesses (e.g., a left-handed circularly polarized light and a right-handed circularly polarized light).

The wavelength ranges, spectra, or bands mentioned in the present disclosure are for illustrative purposes. The disclosed optical device, system, element, assembly, and method may be applied to a visible wavelength band, as well as other wavelength bands, such as an ultraviolet ("UV") wavelength band, an infrared ("IR") wavelength band, or a combination thereof. The term "substantially" or "primarily" used to modify an optical response action, such as transmit, reflect, diffract, deflect, block or the like that describes processing of a light means that a major portion, including all, of a light is transmitted, reflected, diffracted, deflected, or blocked, etc. The major portion may be a predetermined percentage (greater than 50%) of the entire light, such as 100%, 98%, 90%, 85%, 80%, etc., which may be determined based on specific application needs. It is understood that when a light is transmitted, the propagation direction of the light is not affected. When a light is deflected (e.g., reflected, diffracted), the propagation direction is usually changed.

The term "optic axis" may refer to a direction in a crystal. A light propagating in the optic axis direction may not experience birefringence (or double refraction). An optic axis may be a direction rather than a single line: lights that are parallel to that direction may experience no birefringence.

FIG. 1A illustrates an x-z sectional view of a conventional CLC element 100 including helicoidal twist structures. As shown in FIG. 1A, the CLC element 100 may include a layer 105 of cholesteric liquid crystals ("CLCs"), which is an LC mixture including a nematic LC material (that is a host LC material) and a chiral dopant (that is doped into the host LC material). The nematic LC material may include uniaxial LCs (e.g., LCs in uniaxial nematic phase). The layer 105 of CLCs may also be referred to as a CLC layer 105. LC molecules 112 located in close proximity to a surface 115 of the CLC layer 105 may have a uniform in-plane orientation pattern. For example, the LC molecules 112 may be uniformly aligned in an x-axis direction shown in FIG. 1A.

Within the volume of the CLC layer 105, uniaxial LC molecules 112 may form a plurality of helical twist structures 117 with a plurality of helical axes 118, and a plurality of series of Bragg planes 114. The helical axis 118 may be perpendicular to a surface 115 of the CLC layer 105, extending in a thickness direction of the CLC layer 105, and the Bragg planes 114 may be parallel to the surface 115. FIG. 1A shows that the Bragg planes 114 are within an x-y plane, the helical axis 118 extends in a z-axis direction, and the Bragg planes 114 are perpendicular to the helical axis 118. A distance between two adjacent Bragg planes 114 is defined as a Bragg period $P_B$. A helical pitch $P_h$ of the helical twist structure 117 may be defined as a distance along the helical axis 118 over which the azimuthal angles of the LC molecules 112 change by 3600 or the directors of the LC molecules 112 rotate by 360°.

The helical twist structures 117 may be helicoidal twist structures, where the LC molecules 112 are located within a plane substantially perpendicular to the helical axis 118. That is, the directors of the LC molecules 112 may be substantially perpendicular to the helical axis 118. The CLCs included in the CLC layer 105 may be referred to as helicoidal CLCs, and the CLC layer 105 may be referred to as a helicoidal CLC layer. The helicoidal CLCs has a bend elastic constant ($K_{33}$) and a twist elastic constant ($K_{22}$), where a ratio between the bend elastic constant ($K_{33}$) and the twist elastic constant ($K_{22}$) is often greater than 0.5.

The CLC element 100 may function as a circular reflective polarizer, with a reflection bandwidth $\Delta\lambda_R=\Delta n*P_h$, and a peak reflection wavelength $\lambda_R=n*P_h$, where $P_h$ is the helical pitch, $\Delta n$ is the birefringence of the host LC material, and n is the average refractive index of the host LC material. The helical pitch $P_h$ and the Bragg period $P_B$ may be determined by a weight concentration and a helical twist power of the chiral dopant doped into the host LC material. That is, the helical pitch $P_h$ and the Bragg period $P_B$ of the CLC element 100 having the helicoidal twist structures may be determined by the material properties of LC mixture. For a circularly polarized light having a wavelength range within the reflection band of the CLC element 100, the CLC element 100 may primarily or substantially reflect the circularly polarized light when the circularly polarized light has a handedness that is the same as the handedness of the helical twist structures 117, and primarily or substantially transmit the circularly polarized light when the circularly polarized light has a handedness that is opposite to the handedness of the helical twist structures 117.

Referring to FIG. 1A, a linearly polarized light 121 (having a wavelength within the reflection band of the CLC element 100) incident onto the CLC element 100 may include a right-handed circularly polarized component and a left-handed circularly polarized component. When the helical twist structure 117 has a right handedness, it may be desirable to have the CLC element 100 substantially reflect the right-handed circularly polarized component of the input light 121 as a reflected light 123 that is a right-handed circularly polarized light, and substantially transmit the left-handed circularly polarized component of the input light 121 as a transmitted light 124 that is a left-handed circularly polarized light. However, in practical applications, due to the waveplate effect (e.g., negative C-plate effect) of the CLC element 100, the polarization state of the reflected light 123 and/or the transmitted light 124 may be changed to an elliptical polarization. That is, the reflected light 123 and/or the transmitted light 124 may be an elliptically polarized light, rather than a circularly polarized light. This phenomenon is referred to as depolarization. The depolarization of the reflected light 123 and/or the transmitted light 124 may result in a light leakage of the CLC element 100, which may reduce a signal efficiency (e.g., the reflection efficiency or the transmission efficiency for the incident light 121, depending on different applications), and degrade the extinction ratio of the CLC element 100. Further, the light leakage of the CLC element 100 may increase as the incidence angle increases.

Figure 1B:
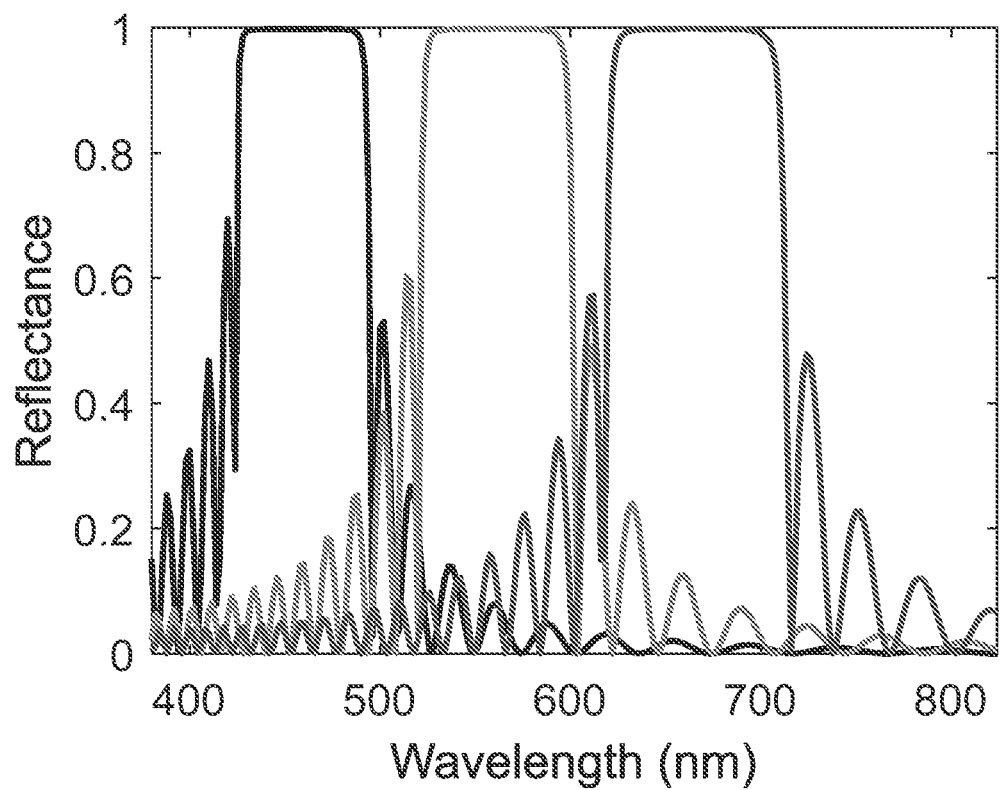
FIG. 1B illustrates a reflection band of a conventional CLC element including a stack of three CLC layers with different helical pitches.

The CLC element 100 in FIG. 1A is shown to have the constant (or single) helical pitch $P_h$ (or Bragg period $P_B$), and the CLC layer 105 is referred to as a single-pitch CLC layer. A single-pitch CLC layer often has a relatively narrow reflection band, e.g., a reflection band corresponding to a single-color spectrum range of about 20 nm~100 nm. Thus, the conventional CLC element 100 may merely provide a high reflectance in a relatively narrow reflection band and a narrow angle of incidence ("AOI") range, which limits the applications. In conventional technologies, a stack of multiple single-pitch CLC layers with different helical pitches or a CLC layer with a gradient pitch may be used to provide a high reflectance in a relatively broad reflection band and/or a wide AOI range. FIG. 1B illustrates a reflection band of a conventional CLC element including a stack of single-pitch CLC layers with different helical pitches. As shown in FIG. 1B, the horizontal axis represents the wavelength (unit: nanometer ("nm")), and the vertical axis represents the normalized reflectance. The stack of single-pitch CLC layers may include three single-pitch CLC layers with different helical pitches corresponding to a red wavelength range, a green wavelength range and a blue wavelength range, respectively. Each single-pitch CLC layer may have a reflection band with a 100-nm-bandwidth. The overall reflection band of the stack of three single-pitch CLC layers may substantially cover the visible wavelength range. However, the stacking method may not solve the issue of the efficiency loss due to the depolarization of the reflected light and/or the transmitted light of each CLC layer.

Figure 1C:
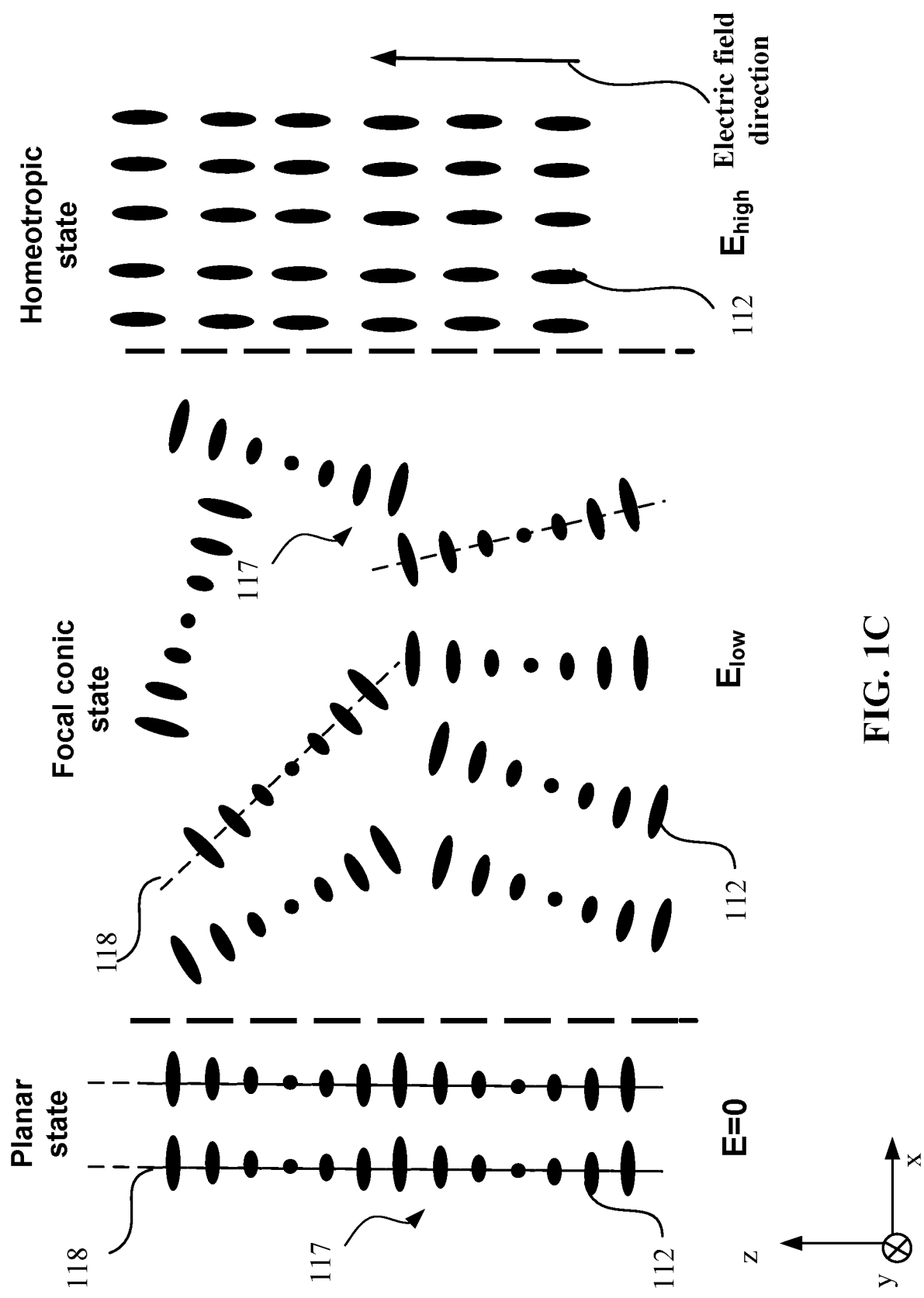
FIG. 1C illustrates transitions in cholesteric liquid crystals with a positive dielectric anisotropy in the conventional CLC element shown in FIG. 1A.

FIG. 1C illustrates transitions in the CLCs with a positive dielectric anisotropy in the CLC layer 105 shown in FIG. 1A. As shown in FIG. 1C, when the electric field within the CLC layer 105 is zero (or lower than a first threshold voltage of the CLC layer 105), the CLCs may be in a planar state, where the helical axes 118 of the respective helicoidal twist structures 117 are perpendicular to the surface 115 of the CLC layer 105, and the directors of the LC molecules 112 are substantially perpendicular to the helical axis 118. The CLC element 100 may function as a circular reflective polarizer, which reflects the right-handed circularly polarized component of the input light 121 as the reflected light 123 and transmits the left-handed circularly polarized component of the input light 121 as the transmitted light 124, as shown in FIG. 1A. The propagation directions of the reflected light 123 and the transmitted light 124 may be parallel to the propagation direction of the input light 121.

When a vertical electric field $E_{low}$ (that is greater than the first threshold voltage and lower than a second threshold voltage of the CLC layer 105) is generated within the CLC layer 105, the CLCs may transform to a focal conic state where the helicoidal twist structures 117 are preserved whereas the helical axes 118 of the respective helicoidal twist structures 117 are oriented in different directions. In this case, the CLC element 100 may function as a scattering element that scatters the right-handed circularly polarized component of the input light 121 as multiple reflected lights having different propagation directions. When the vertical electric field $E_{low}$ is removed, the CLCs may remain in the focal conic state. When a vertical electric field $E_{high}$ (that is greater than the second threshold voltage of the CLC layer 105) is generated within the CLC layer 105, the CLCs may transform to a homeotropic state where the helicoidal twist structures 117 are unwound, and the directors of the LC molecules 112 are substantially oriented along the electric field direction. In this case, the CLC element 100 may substantially transmit both the right-handed circularly polarized component and the left-handed circularly polarized component of the input light 121. When the vertical electric field $E_{high}$ is removed, the CLCs may restore to the planar state.

In view of the limitations in the conventional technologies, the present disclosure provides a liquid crystal polarization hologram ("LCPH") element that may operate at a heliconical state, where optically anisotropic molecules are aligned via a suitable electric field to form heliconical twist structures in the volume of a birefringent medium layer. For discussion purposes, the LCPH element that may operate at the heliconical state may be referred to as a heliconical LCPH element. A helical pitch, a Bragg period, and/or an in-plane pitch of the heliconical LCPH element may be tunable via adjusting an applied electric field. Thus, the reflection wavelength, the reflection efficiency, and/or the reflection angle of the heliconical LCPH element may be tunable via adjusting the applied electric field. In addition, the heliconical LCPH element may also be configured to reduce a light leakage, increase a signal efficiency, and enhance an extinction ratio over a wide AOI range.

The heliconical LCPH elements may include a polarization volume hologram ("PVH") element and a cholesteric liquid crystal ("CLC") element. A reflective PVH element may be based on self-organized CLCs, and may also be referred to as a slanted or patterned CLC element. The heliconical LCPH elements described herein may be fabricated based on various methods, such as holographic interference, laser direct writing, ink-jet printing, and various other forms of lithography. Thus, a "hologram" described herein is not limited to fabrication by holographic interference, or "holography."

Figure 2A:
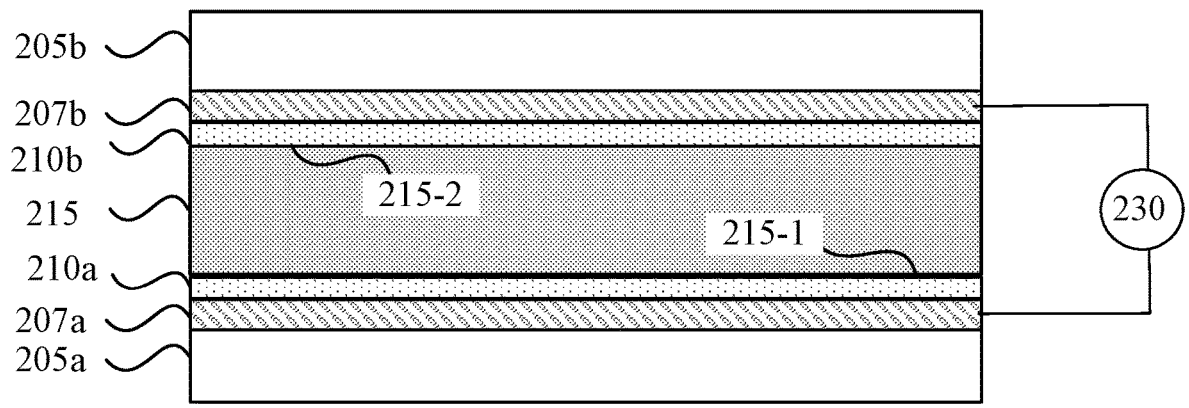
FIG. 2A illustrates a schematic diagram of a liquid crystal polarization hologram ("LCPH") element, according to an embodiment of the present disclosure.
Figure 2A:
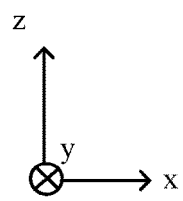

FIG. 2A illustrates an x-z sectional view of a heliconical LCPH element 200 (referred to as LCPH element 200 for simplicity), according to an embodiment of the present disclosure. As shown in FIG. 2A, the LCPH element 200 may include a first substrate 205a and a second substrate 205b, and a birefringent medium layer 215 disposed between the first and second substrates 205a and 205b. The LCPH element 200 may include a first alignment structure 210a and a second alignment structure 210b, which may be disposed at two inner surfaces of the first and second substrates 205a and 205b that face each other, respectively. The birefringent medium layer 215 may be in contact with both of the first and second alignment structures 210a and 210b. The LCPH element 200 may also include a first electrode layer 207a and a second electrode layer 207b (collectively referred to as electrode layer 207). The first electrode layer 207a may be disposed between the first substrate 205a and the first alignment structure 210a, and the second electrode layer 207b may be disposed between the second substrate 205b and the second alignment structure 210b.

The birefringent medium layer 215 may have a first surface 215-1 and an opposing second surface 215-2. In some embodiments, the first surface 215-1 and the second surface 215-2 may be substantially parallel surfaces. In some embodiments, the first surface 215-1 may function as an interface between the birefringent medium layer 215 and the first alignment structure 210a, and the second surface 215-2 may function as an interface between the birefringent medium layer 215 and the second alignment structure 210b. Although the body of the birefringent medium layer 215 is shown as flat for illustrative purposes, the body of the birefringent medium layer 215 may have a curved shape. For example, at least one (e.g., each) of the first surface 215-1 and the second surface 215-2 may be curved.

The substrates 205a and 205b may be configured to provide support and/or protection to various layers, films, and/or structures disposed at (e.g., on or between) the substrate 205a and 205b. In some embodiments, at least one of the first substrate 205a or the second substrate 205b may be optically transparent (e.g., having a light transmittance of about 90% or more) in at least a visible spectrum (e.g., wavelength ranging from about 380 nm to about 700 nm). In some embodiments, the substrates 205a and 205b may include a suitable material that is substantially transparent to lights of the above-listed wavelength ranges, such as, a glass, a plastic, a sapphire, a polymer, a semiconductor, or a combination thereof, etc. The substrates 205a and 205b may be rigid, semi-rigid, flexible, or semi-flexible. In some embodiments, the substrates 205a and 205b may have one or more surfaces in a flat, convex, concave, asphere, or free-form shape. In some embodiments, at least one of the first substrate 205a or the second substrate 205b may be a part of another optical element or device, or a part of another opto-electrical element or device. For example, at least one of the first substrate 205a or the second substrate 205b may be a solid optical lens or a part of a solid optical lens, a part of a waveguide (or light guide), or a part of a functional device (e.g., a display screen).

The first electrode layer 207a and the second electrode layer 207b may be configured to apply a driving voltage provided by a power source 230 to the birefringent medium layer 215, and generate an out-of-plane electric field within the birefringent medium layer 215, thereby controlling an operation state of the LCPH element 200. One of the first electrode layer 207a and the second electrode layer 207b may be a transmissive electrode layer, and the other one of the first electrode layer 207a and the second electrode layer 207b may be a transmissive electrode layer or a reflective electrode layer. The electrode layer 207 may include a suitable conductive material, such as a transparent conductive oxide material (e.g., indium tin oxide ("ITO"), aluminum zinc oxide ("AZO"), etc.), a metal material, structured metal grids, a conducting polymer, a dielectric-metal-dielectric ("DMD") structure, carbon nanotubes, silver nanowires, or a combination thereof. In some embodiments, the electrode layer 207 may include a flexible transparent conductive layer, such as ITO disposed on a plastic film. In some embodiments, the plastic film may include polyethylene terephthalate ("PET"). In some embodiments, the plastic film may include cellulose triacetate ("TAC"), which is a type of flexible plastic with a substantially low birefringence.

The electrode layer 207 may be a continuous planar electrode layer, a patterned planar electrode layer, a protrusion electrode layer, or any other suitable type of electrode layer. In some embodiments, both of the first electrode layer 207a and the second electrode layer 207b may be continuous electrode layers. In some embodiments, one of the first electrode layer 207a and the second electrode layer 207b may be a continuous electrode layer, and the other one of the first electrode layer 207a and the second electrode layer 207b may be a patterned electrode layer.

Figure 3A:
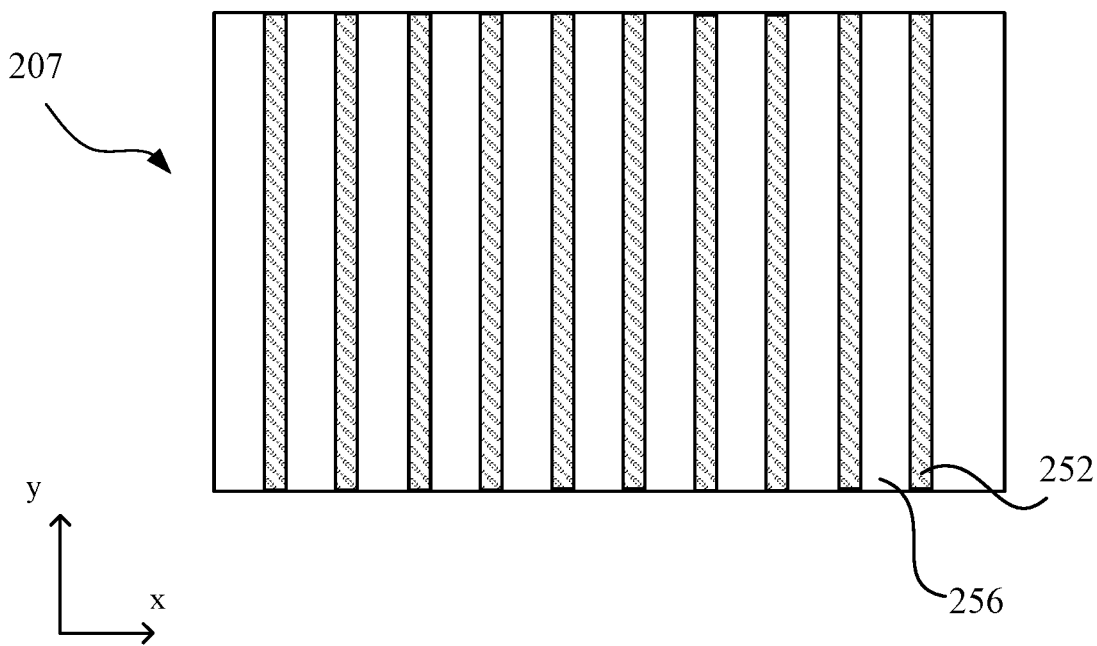
FIGS. 3A-3F illustrate schematic diagrams of various electrode layers that may be included in the LCPH element shown in FIG. 2A, according to various embodiments of the present disclosure.
Figure 3B:
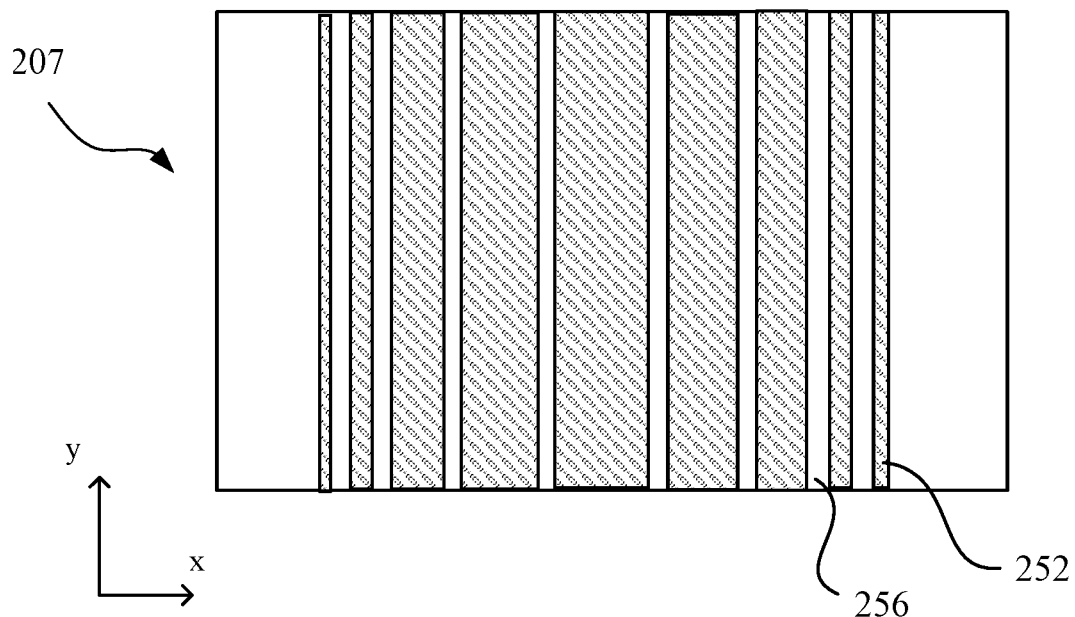
Figure 3C:
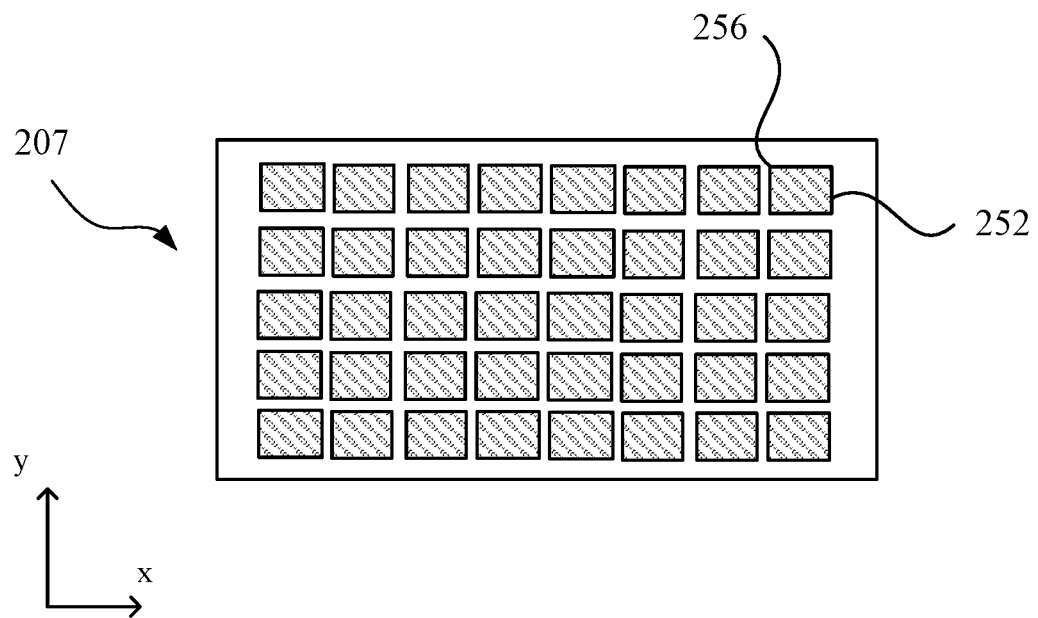
Figure 3D:
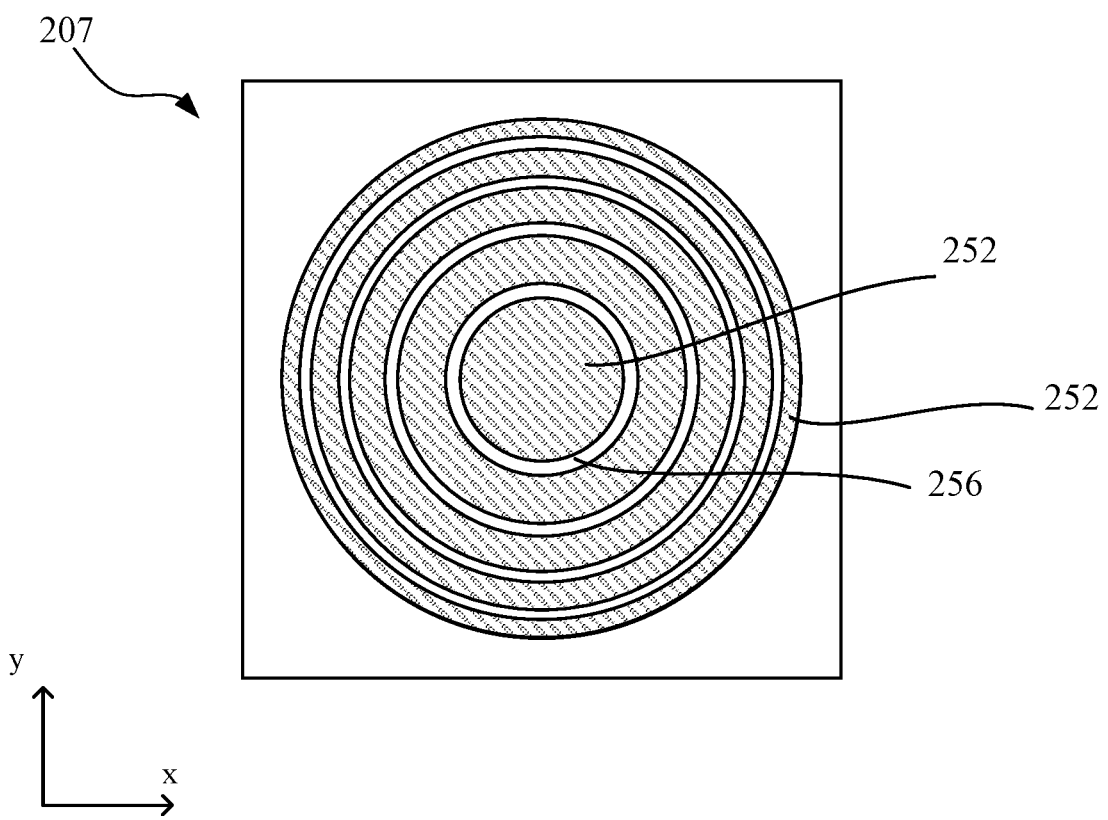

FIGS. 3A-3E illustrate x-y sectional views of the electrode layer 207, according to various embodiments of the present disclosure. As shown in FIGS. 3A-3E, the electrode layer 207 may be a patterned planar electrode layer including a plurality of patterned electrodes 252 spaced apart from one another with gaps 256. In some embodiments, the patterned electrodes 252 may include stripe-shaped electrodes (e.g., as shown in FIGS. 3A and 3B), pixelated electrodes (e.g., as shown in FIG. 3C), zig-zag electrodes, interdigitated electrodes, or annular (ring-shaped) electrodes (which may include a circular electrode at the center, e.g., as shown in FIG. 3D), etc.

In some embodiments, as shown in FIG. 3A, the stripe-shaped electrodes may have the same width. In some embodiments, as shown in FIG. 3B, the stripe-shaped electrodes may have different widths, e.g., the width of the stripe-shaped electrode may gradually decrease from a center of the electrode layer 207 to a periphery of the electrode layer 207. In some embodiments, as shown in FIG. 3D, the patterned electrodes 252 may include a plurality of electrodes including a central, circular electrode and a plurality of annular electrodes that are concentric with the central electrode. In some embodiments, the central, circular electrode and the annular electrodes that are concentric with the central electrode may have different surface areas. In some embodiments, the voltages applied to the patterned electrodes 252 may be individually controllable, via a controller (not shown). In some embodiments, the patterned electrodes 252 may be applied with a same voltage.

Figure 3E:
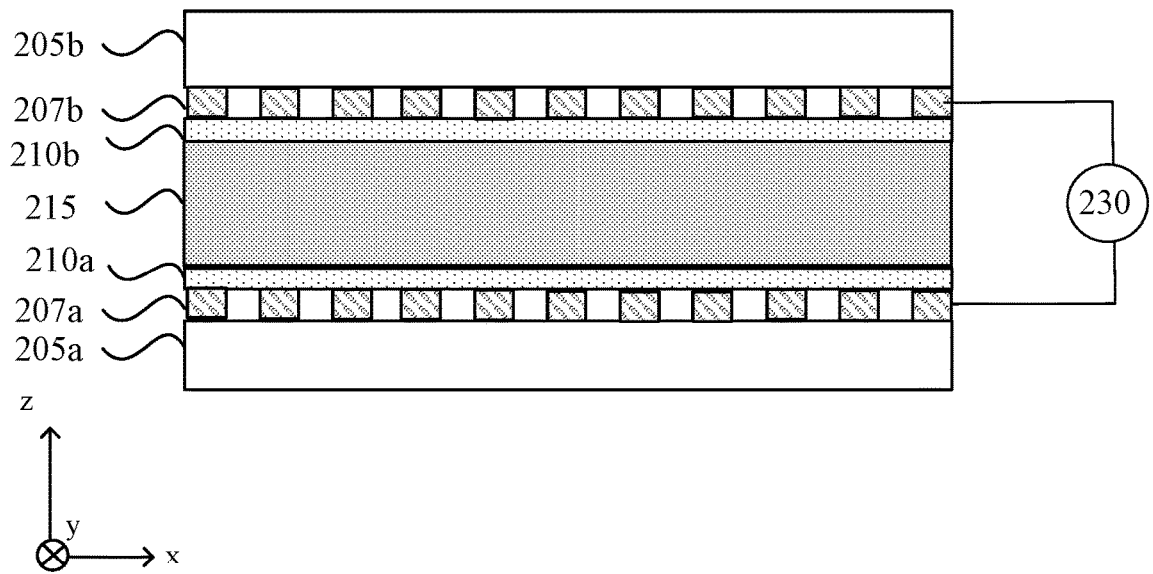
Figure 3F:
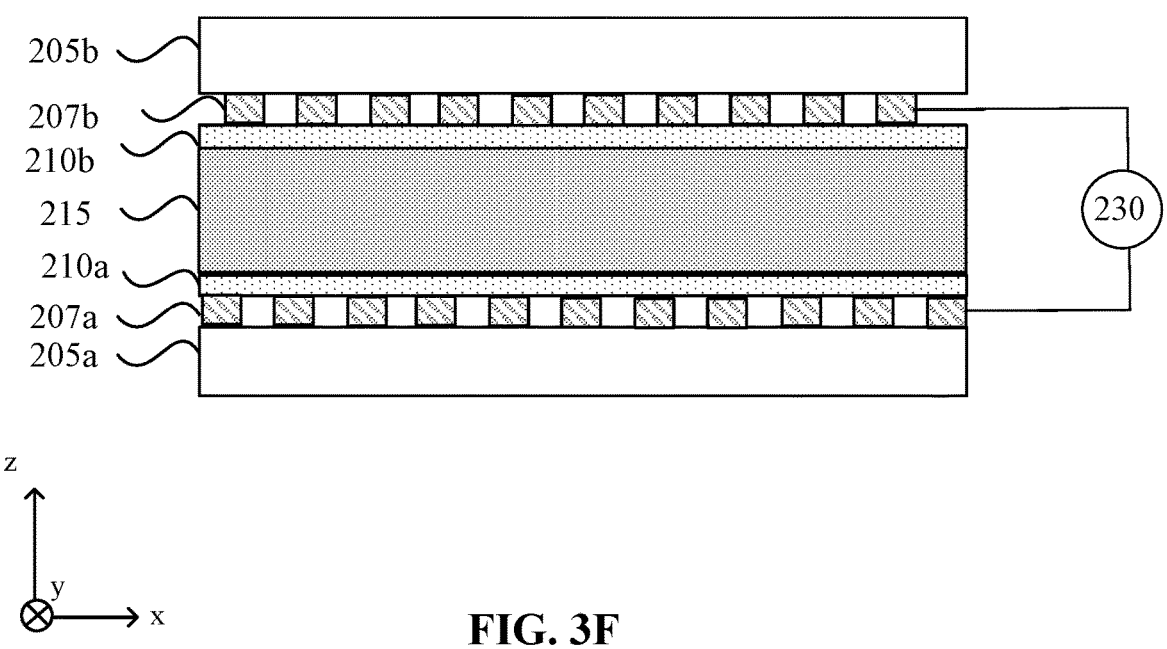

In some embodiments, both of the first electrode layer 207a and the second electrode layer 207b may be patterned electrode layers, which may generate an out-of-plane electric field having a direction perpendicular to or slanted with respect to the surface 215-1 or 215-2 of the birefringent medium layer 215. In some embodiments, as shown in FIG. 3E, the patterned electrodes of the first electrode layer 207a may be aligned with the corresponding patterned electrodes of the second electrode layer 207b. In some embodiments, as shown in FIG. 3F, the patterned electrodes of the first electrode layer 207a may be partially offset from the patterned electrodes of the second electrode layer 207b.

In some embodiments, the electrode layer 207 including the stripe-shaped electrodes shown in FIG. 3A may be implemented into the LCPH element 200 functioning as a grating. In some embodiments, the electrode layer 207 including the stripe-shaped electrodes shown in FIG. 3B may be implemented into the LCPH element 200 functioning as a cylindrical lens. In some embodiments, the electrode layer 207 including the stripe-shaped electrodes shown in FIG. 3C may be implemented into the LCPH element 200 functioning as a freeform phase plate. In some embodiments, the electrode layer 207 including the stripe-shaped electrodes shown in FIG. 3D may be implemented into the LCPH element 200 functioning as a spherical lens. In some embodiments, the electrode layer 207 including the stripe-shaped electrodes shown in FIG. 3E or FIG. 3F may be implemented into the LCPH element 200 functioning as a circular reflective polarizer or a grating. In some embodiments, the electrode layer 207 including a continuous electrode layer may be implemented into the LCPH element 200 functioning as a circular reflective polarizer.

Referring back to FIG. 2A, the first and second alignment structures 210a and 210b may be any suitable alignment structures. For example, at least one (e.g., each) of the first alignment structure 210a or the second alignment structure 210b may include a polyimide layer, a photo-alignment material ("PAM") layer, a plurality of nanostructures or microstructures, an alignment network, or any combination thereof. The first alignment structure 210a or the second alignment structure 210b may be configured to provide a surface alignment to optically anisotropic molecules located in close proximity to the surface 215-1 or 215-2 of birefringent medium layer 215. In some embodiments, the first alignment structure 210a or the second alignment structure 210b may be configured to provide a homogeneous surface alignment with substantially small pretilt angles (e.g., 0° to 10°, 0° to 5°, or 0° to 3°, etc.) to the optically anisotropic molecules that are in contact with the alignment structure. In some embodiments, the first alignment structure 210a and the second alignment structure 210b may be configured to provide anti-parallel surface alignments, or hybrid surface alignments (e.g., one providing a homogeneous surface alignment and the other providing a homeotropic surface alignment) to the optically anisotropic molecules that are in contact with the alignment structures.

Further, at least one (e.g., each) of the first alignment structure 210a or the second alignment structure 210b may be configured to provide a predetermined, suitable surface alignment pattern. The surface alignment pattern may be a uniform surface alignment pattern, or a non-uniform surface alignment pattern. The uniform surface alignment pattern may provide a substantially uniform alignment direction, whereas the non-uniform surface alignment pattern may provide alignment directions that vary in one or more in-plane directions of the alignment structure.

The birefringent medium layer 215 may include a birefringent medium having a chirality. In some embodiments, the birefringent medium may have an induced chirality, e.g., the birefringent medium may include a chiral dopant. In some embodiments, the birefringent medium may have an intrinsic molecular chirality, e.g., the birefringent medium may include chiral LC molecules, or molecules having one or more chiral functional groups. In some embodiments, the birefringent medium may include nematic LCs, twist-bend LCs, smectic LCs, ferroelectric LCs, or any combination thereof.

The birefringent medium may exhibit a nematic phase called twist-bend nematic phase, for example, in some embodiments, the birefringent medium may include nematic LCs that exhibit the twist-bend nematic phase. The nematic LCs that exhibit the twist-bend nematic phase may be configured with a ratio between the bend elastic constant ($K_{33}$) and the twist elastic constant ($K_{22}$) that is less than 0.5, i.e., $K_{33}/K_{22}<0.5$. In some embodiments, the nematic LCs having $K_{33}/K_{22}<0.5$ may include a cyanobiphenyl-based LC material. In some embodiments, the cyanobiphenyl-based LC material may include a member of 1,ω-bis(4-cyanobiphenyl-4'-yl) alkane homologous series having the following chemical structure:

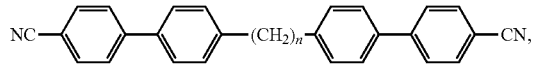

where two mesogenic units (i.e., cyanobiphenyl groups) are connected using a flexible linkage consisting of an alkyl chain. 1,ω-bis(4-cyanobiphenyl-4'-yl) alkane homologous series is referred to using an acronym CBnCB, where CB denotes cyanobiphenyl and n denotes a number of methylene units in the flexible linkage. An odd-numbered member of CBnCB may have a molecular structure, where the two cyanobiphenyl groups at the two ends are connected via the alkyl chain with an odd number of carbons and are inclined at some angle with respect to each other. That is, an odd-numbered member of CBnCB may have a bent molecular shape, and such a conformation facilitates a large bend flexoelectric coefficient. An even-numbered member of CBnCB may have a molecular structure where the long axes of the two cyanobiphenyl groups at the two ends are parallel to each other. That is, an even-numbered member of CBnCB may have a linear molecular shape, and the bend flexoelectric coefficient of the even-numbered members of CBnCB may be suppressed as compared to the that of the odd-numbered members of CBnCB.

CB7CB and CB11CB are examples of odd-membered member of CBnCB. CB7CB has the following molecular structure:

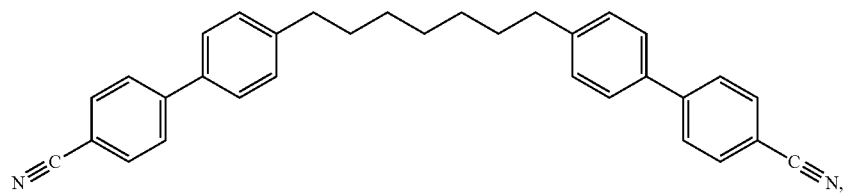 [SMILES: N#Cc1ccc(-c2ccc(CCCCCCCc3ccc(-c4ccc(C#N)cc4)cc3)cc2)cc1]

where the two cyanobiphenyl groups at the two ends are connected via the alkyl chain with seven carbons and are inclined at some angle with respect to each other. CB11CB has the following molecular structure:

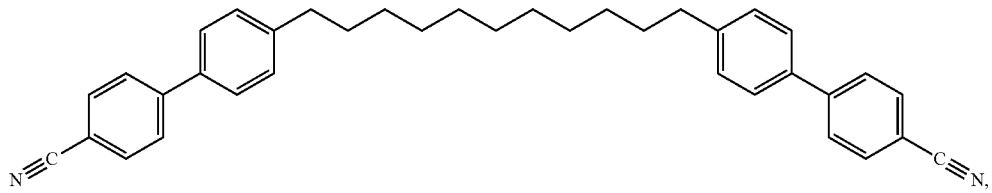 [SMILES: N#Cc1ccc(-c2ccc(CCCCCCCCCCCc3ccc(-c4ccc(C#N)cc4)cc3)cc2)cc1]

which is similar to that of CB11CB except that the alkyl chain consists of eleven carbons. In some embodiments, one or more oxygen atoms may substitute for one or more carbon atoms of the alkyl chain of the odd-numbered member of CBnCB, e.g., CB6OCB has the following molecular structure:

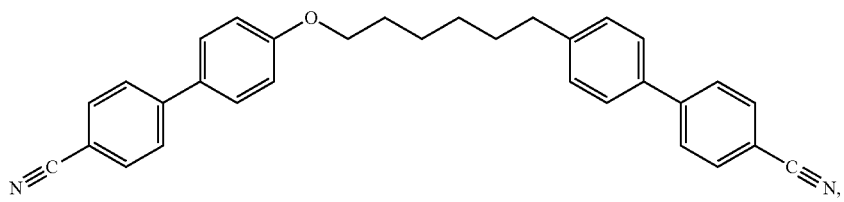 [SMILES: N#Cc1ccc(-c2ccc(CCCCCCOc3ccc(-c4ccc(C#N)cc4)cc3)cc2)cc1]

where the two cyanobiphenyl groups at the two ends are connected via the alkyl chain with seven carbons and are inclined at some angle with respect to each other, and an oxygen atom substitutes for one of the seven carbon atom of the alkyl chain.

In some embodiments, the birefringent medium may also include a chiral dopant doped into the nematic LCs having $K_{33}/K_{22}<0.5$, thereby introducing the chirality of the birefringent medium. In some embodiments, the birefringent medium may also include nematic LCs configured with the bend elastic constant ($K_{33}$) greater than the twist elastic constant ($K_{22}$) i.e., $K_{33}>K_{22}$, such as 5CB. The nematic LCs having $K_{33}>K_{22}$ may not exhibit a twist-bend nematic phase. In some embodiments, the nematic LCs having $K_{33}/K_{22}<0.5$, the chiral dopant, and the nematic LCs having $K_{33}>K_{22}$ may be mixed to form an LC mixture exhibiting the twist-bend nematic phase. In some embodiments, the nematic LCs having $K_{33}>K_{22}$ may have a relatively large weight percentage in the LC mixture, whereas the nematic LCs having $K_{33}/K_{22}<0.5$ may have a relatively small weight percentage in the LC mixture. For discussion purposes, the nematic LCs having $K_{33}>K_{22}$ may be referred to as an LC host, while the nematic LCs having $K_{33}/K_{22}<0.5$ may be referred to as an LC dimer. The LC mixture may be prepared in a manner known in the art, for example, heating a mixture of the host LC and the LC dimer to a temperature approximately above the clearing point, then cooling the mixture to the room temperature.

Figure 2B:
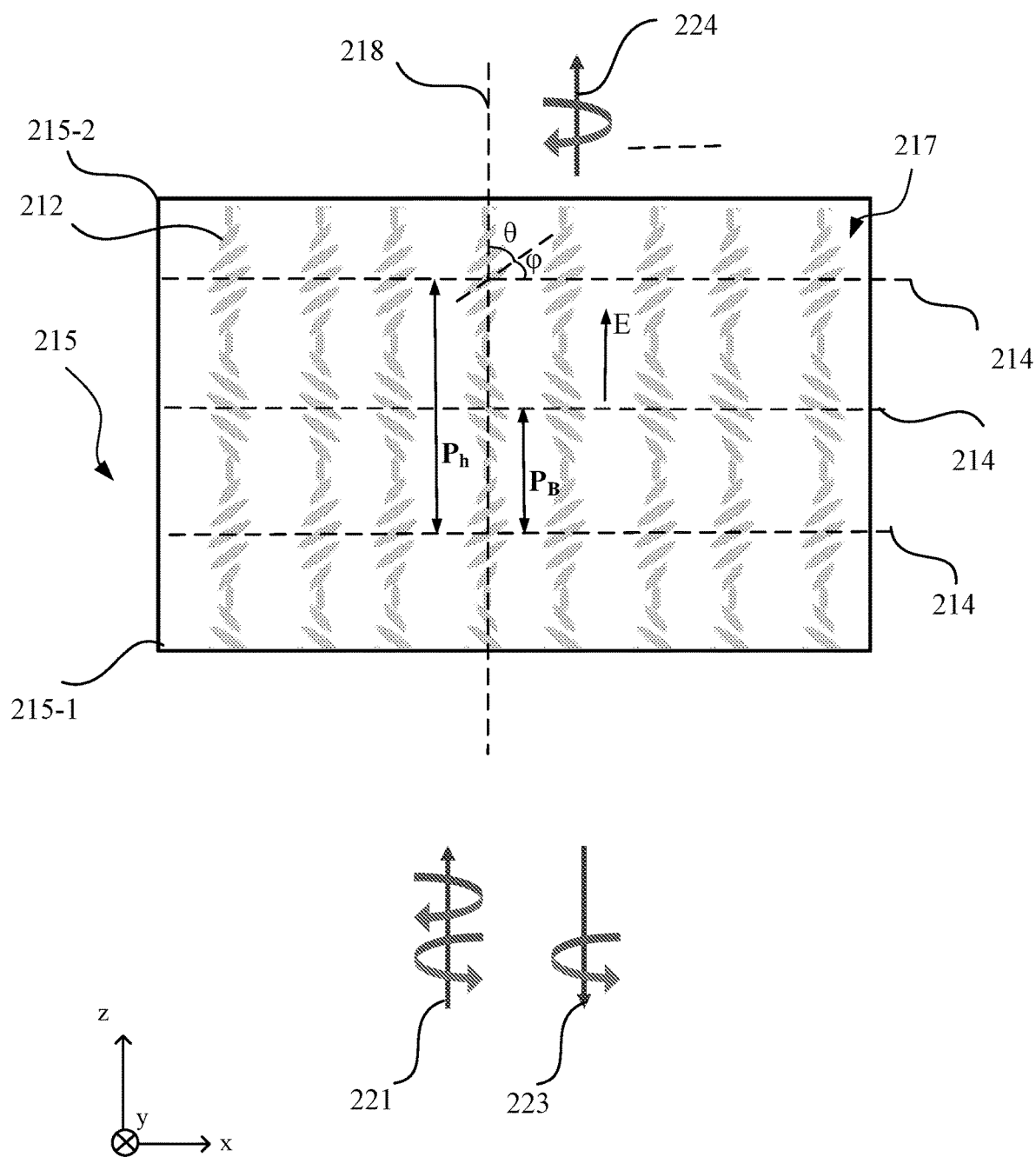
FIG. 2B illustrates a schematic diagram showing out-of-plane orientations of LC molecules in the LCPH element shown in FIG. 2A, according to an embodiment of the present disclosure.
Figure 2C:
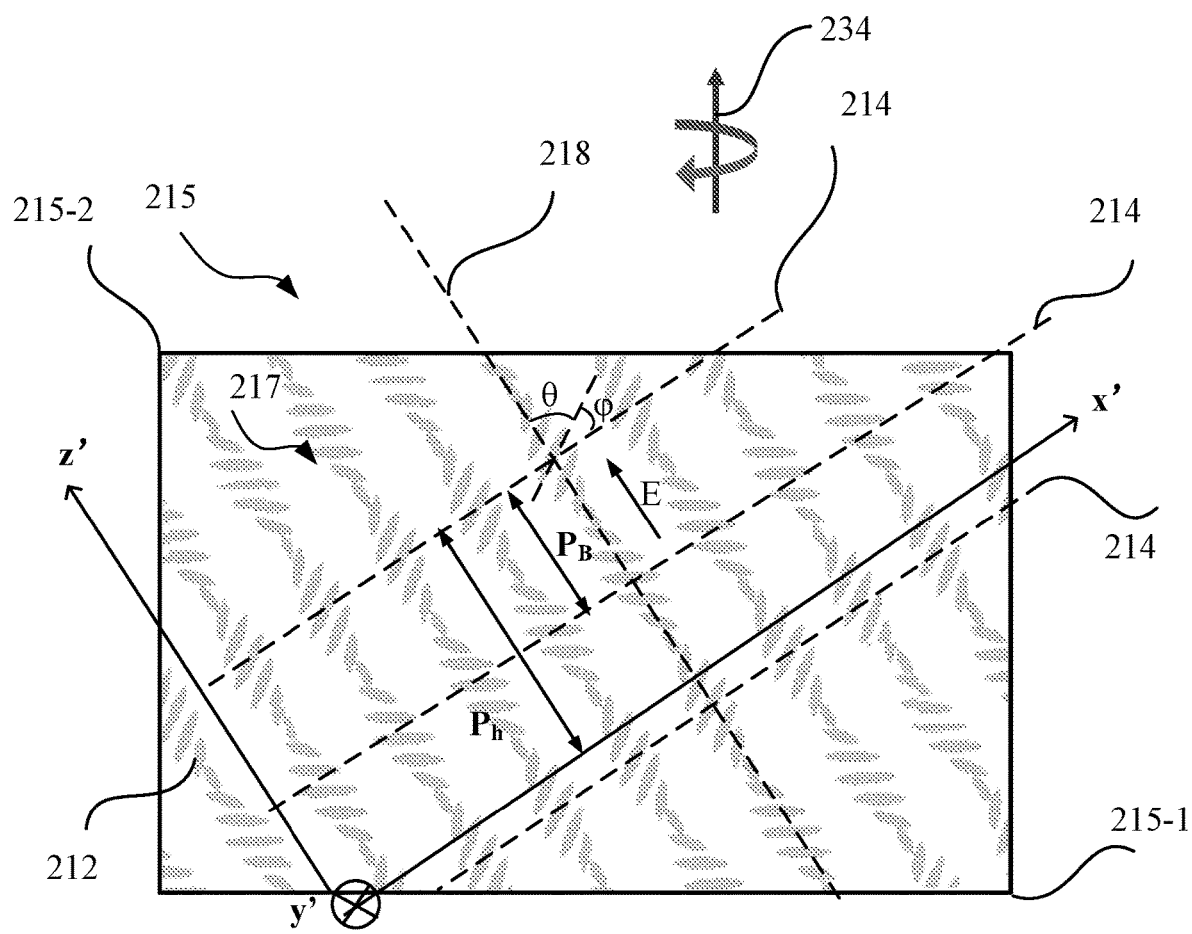
FIG. 2C illustrates a schematic diagram showing out-of-plane orientations of LC molecules in the LCPH element shown in FIG. 2A, according to an embodiment of the present disclosure.
Figure 2C:
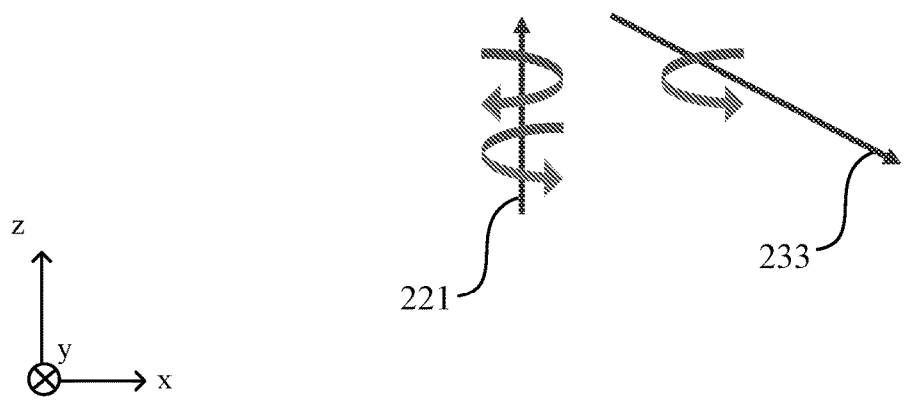

FIGS. 2B and 2C illustrate x-z sectional views of the birefringent medium layer 215, showing out-of-plane orientations of LC molecules 212 in the birefringent medium layer 215 shown in FIG. 2A, according to various embodiments of the present disclosure. For discussion purposes, rod-like LC molecules 212 are used as examples of the LC molecules 212 of the birefringent medium layer 215. The rod-like LC molecule 212 may have a longitudinal direction (or a length direction) and a lateral direction (or a width direction). The longitudinal direction of the LC molecule 212 may be referred to as a director of the LC molecule 212 or an LC director. An orientation of the LC director may determine a local optic axis orientation or an orientation of the optic axis at a local point of the birefringent medium layer 215.

In the embodiments shown in FIGS. 2B and 2C, the LC molecules 212 within a volume of the birefringent medium layer 215 may be arranged in a plurality of helical twist structures 217 with a plurality of helical axes 218, and a plurality of series of Bragg planes 214. In each helical twist structure 217, the directors of the LC molecules 212 may continuously rotate around the helical axis 218 in a predetermined rotation direction, e.g., clockwise direction or counter-clockwise direction. Accordingly, the helical twist structure 217 may exhibit a handedness, e.g., right handedness or left handedness. A helical pitch $P_h$ of the helical twist structure 217 may be defined as a distance along the helical axis 218 over which the directors of the LC molecule 212 rotate by 360°. The birefringent medium layer 215 may be a single-pitch layer having a constant helical pitch $P_h$, or a varying-pitch layer having a varying helical pitch $P_h$. In some embodiments, the birefringent medium layer 215 may include a stack of multiple single-pitch layers having different helical pitches $P_h$.

The helical twist structures 217 may be configured to be heliconical twist structures 217, where the LC molecules 212 are tilted towards the helical axis 218. That is, the LC molecules 212 may not be located in a plane perpendicular to the helical axis 218, and the directors of the LC molecules 212 may not be perpendicular to the helical axis 218. The LC molecules 212 forming the heliconical twist structures 217 may be configured with a cone angle θ, which is greater than 0° and equal to or less than a first predetermined angle (e.g., 35°, 33°, 30°, etc.). The cone angle θ of the LC molecule 212 is defined as an angle of the director of the LC molecule 212 with respect to the helical axis 218. A tilt angle φ of the LC molecule 212 forming the heliconical twist structures 217 may be defined as an angle of the director of the LC molecule 212 with respect to a plane (e.g., Bragg plane 214) that is perpendicular to the helical axis 218. The cone angle θ and the tilt angle φ may be complementary angles. In some embodiments, the tilt angle φ may be configured to be equal to or greater than a second predetermined angle (e.g., 55°, 57°, 60°, etc.) and less than 90°. In some embodiments, the LC molecules 212 forming the heliconical twist structures 217 may have substantially the same cone angle θ and the same tilt angle (p.

The heliconical twist structures 217 where the LC molecules 212 are slanted with respect to the helical axis 218 may be introduced via an out-of-plane electric field generated within the birefringent medium layer 215. An intensity of the out-of-plane electric field may be configured, such that the LC molecules 212 may trend to be oriented parallel with a direction of the out-of-plane electric field E to form the heliconical twist structures 217. The direction of the out-of-plane electric field generated within the birefringent medium layer 215 may be perpendicular to a surface (e.g., at least one of the first surface 215-1 or the second surface 215-2) of the birefringent medium layer 215, or slanted with respect to the surface (e.g., at least one of the first surface 215-1 or the second surface 215-2) of the birefringent medium layer 215. The heliconical twist structures 217 may not be introduced via the alignment structures 210a and 210b, as the first alignment structure 210a or the second alignment structure 210b may provide a homogeneous surface alignment with substantially small pretilt angles (e.g., 0° to 10°, 0° to 5°, or 0° to 3°, etc.) to the LC molecules 212 that are in contact with the alignment structures.

Further, the LC molecule 212 having a first same orientation (e.g., same first tilt angle and same first azimuthal angle) may form a first series of slanted and parallel refractive index planes (i.e., a first series of Bragg planes) 214 periodically distributed within the volume of the birefringent medium layer 215. Although not labeled, the LC molecules 212 with a second same orientation (e.g., same second tilt angle and same second azimuthal angle) different from the first same orientation may form a second series of slanted and parallel refractive index planes (i.e., a second series of Bragg planes) 214 periodically distributed within the volume of the birefringent medium layer 215. Different series of Bragg planes may be formed by the LC molecules 212 having different orientations. In the same series of Bragg planes, the LC molecules 212 may have the same orientation, and the refractive index may be the same. Different series of Bragg planes may correspond to different refractive indices. When the number of the Bragg planes (or the thickness of the birefringent medium layer 215) increases to a sufficient value, Bragg reflection may be established. The distance between adjacent Bragg planes 214 of the same series may be referred to as a Bragg period $P_B$. In the embodiment shown in FIGS. 2B and 2C, the Bragg period $P_B$ is half of the helical pitch $P_h$. The Bragg period $P_B$ and the helical pitch $P_h$ of the LCPH element 200 may be tunable via tuning the intensity of the out-of-plane electric field and/or the direction of the out-of-plane electric field generated within the birefringent medium layer 215.

In the embodiment shown in FIG. 2B, the birefringent medium layer 215 may be a non-slanted CLC layer, where the helical axis 218 is perpendicular to a surface (e.g., at least one of the first surface 215-1 or the second surface 215-2) of the birefringent medium layer 215, extending in a thickness direction of the birefringent medium layer 215. The Bragg planes 214 may be parallel to the surface 215-1 or 215-2 of the birefringent medium layer 215. FIG. 2B shows that the Bragg planes 214 are within an x-y plane, the helical axis 218 extends in a z-axis direction, and the Bragg planes 214 are perpendicular to the helical axis 218. The out-of-plane electric field generated within the birefringent medium layer 215 may be along the thickness direction (e.g. a z-axis direction) of the birefringent medium layer 215, and the helical axis 218 may be parallel to the direction of the out-of-plane electric field.

As shown in FIG. 2B, a linearly polarized incident light 221 of the LCPH element 200 may have a wavelength within the reflection band of the LCPH element 200. The linearly polarized light 221 may include a right-handed circularly polarized component and a left-handed circularly polarized component. For discussion purposes, the helical twist structures 217 may have a right handedness. The first electrode layer 207a may be a transmissive electrode layer, and the second electrode layer 207b may be a transmissive electrode layer or a reflective electrode layer. In some embodiments, the LCPH element 200 may substantially reflect the right-handed circularly polarized component of the linearly polarized light 221 as a reflected light 223 that is substantially close to a right-handed circularly polarized light, and substantially transmit the left-handed circularly polarized component of the linearly polarized light 221 as a transmitted light 224 that is substantially close to a left-handed circularly polarized light. FIG. 2B shows that when the linearly polarized light 221 is normally incident onto the LCPH element 200, the propagation directions of the reflected light 223 and the transmitted light 224 are substantially parallel with the propagation directions of the incident light 221. When the second electrode layer 207b is a reflective electrode layer, the transmitted light 224 may be reflected at the second electrode layer 207b, and output from the same side (e.g., a first side) of the LCPH element 200 as the reflected light 223. When the second electrode layer 207b is a transmissive electrode layer, the transmitted light 224 may be transmitted through the second electrode layer 207b, and output from a second side of the LCPH element 200.

In the embodiment shown in FIG. 2C, the birefringent medium layer 215 may be a slanted CLC layer, where the helical axis 218 is slanted with respect to the surface (e.g., the first surface 215-1 or the second surface 215-2) of the birefringent medium layer 215, and the LCPH element 200 may be reflective PVH element. In some embodiments, an angle of the helical axis 218 with respect to a normal of the surface (e.g., the first surface 215-1 or the second surface 215-2) of the birefringent medium layer 215 may be less than 45°. The Bragg planes 214 may form an angle (e.g., an acute angle) with the surface of the birefringent medium layer 215. The x-y-z coordinate system shown in FIG. 2C refers to a global coordinate system for the birefringent medium layer 215, whereas an x'-y'-z' coordinate system shown in FIG. 2C refers to a local coordinate system for the helical twist structure 217. FIG. 2C shows that the Bragg planes 214 are within an x'-y' plane, the helical axis 218 extends in a z'-axis direction, and the Bragg planes 214 are perpendicular to the helical axis 218. In the birefringent medium layer 215 (or the non-slanted CLC layer) shown in FIG. 2B, the x'-y'-z' coordinate system may coincide with the x-y-z coordinate system. The direction of the out-of-plane electric field generated within the birefringent medium layer 215 may be slanted with respect to the surface (e.g., the first surface 215-1 or the second surface 215-2) of the birefringent medium layer 215, and the helical axis 218 may be parallel to the direction of the out-of-plane electric field.

As shown in FIG. 2C, the birefringent medium layer 215 (or the LCPH element 200) may substantially diffract, via backward reflection, the right-handed circularly polarized component of the linearly polarized light 221 as a reflected (or diffracted) light 233 that is substantially close to a right-handed circularly polarized light, and substantially transmit the left-handed circularly polarized component of the linearly polarized light 221 as a transmitted light 224 that is substantially close to a left-handed circularly polarized light. When the linearly polarized light 221 is normally incident onto the LCPH element 200, the propagation direction of the transmitted light 224 may be parallel with the propagation direction of the incident light 221, and the propagation direction of the diffracted light 233 may not be parallel with the propagation direction of the linearly polarized light 221. When the second electrode layer 207b is a reflective electrode layer, the transmitted light 224 may be reflected at the second electrode layer 207b, and output from the same side (e.g., a first side) of the LCPH element 200 as the reflected light 233. When the second electrode layer 207b is a transmissive electrode layer, the transmitted light 234 may be transmitted through the second electrode layer 207b, and output from a second side of the LCPH element 200.

Referring to FIGS. 2B and 2C, the heliconical twist structures 217 in the LCPH element 200 may be maintained via maintaining the applied electric field, or via polymerizing the heliconical twist structures 217 under the applied electric field and removing the applied electric field after the polymerization. Because the LC molecules 212 tilt towards the helical axis 218, the birefringence experienced by a circularly polarized light (e.g., the right-handed a circularly polarized component of the input light 221) may be lower than the birefringence ($\Delta n=n_e-n_o$) of the birefringent medium in the birefringent medium layer 215, which may narrow the reflection band of the LCPH element 200. FIG. 2F illustrates a reflection band of the LCPH element 200 shown in FIG. 2A, according to an embodiment of the present disclosure. As shown in FIG. 2F, the horizontal axis represents the wavelength (unit: nanometer ("nm")), and the vertical axis represents the normalized reflectance. For discussion purposes, FIG. 2F shows that the LCPH element 200 provides an ultra-narrow reflection band in the red wavelength range. In some embodiments, the LCPH element 200 may be configured to provide an ultra-narrow reflection band in another suitable wavelength range.

In some embodiments, the bandwidth $\Delta\lambda$ of the LCPH element 200 may be within a range of about 5 nm to 10 nm, a range of about 10 nm to 20 nm, a range of about 20 nm to 30 nm, or a range of about 30 nm to 40 nm, etc. In some embodiments, the LCPH element 200 may be optically coupled with a corresponding narrowband light source (e.g., a light emitting diode ("LED"), a superluminescent diode ("SLED" or "SLD"), a laser diode, etc.), and the reflection band of the LCPH element 200 may substantially match with the emission band of the narrowband light source. The LCPH element 200 may substantially reflect the light received from the narrowband light source when the light is a circularly polarized light having a handedness that is the same as the handedness of the helical twist structures 217. The LCPH element 200 may substantially transmit a light having a wavelength range outside of the ultranarrow reflection band.

Conventional narrowband (A)=20~40 nm) CLC element or PVH element are often fabricated based on a low-birefringence LC material (e.g., $n_o=1.4$~1.6, $\Delta n<0.08$). The stability of the low-birefringence LC material may be poor, and the material options of the low-birefringence LC materials may be rather limited. As the LC molecules 212 tilt towards the helical axis 218, the disclosed LCPH element 200 may be fabricated based on a moderate-to-high birefringence LC mater (e.g., $n_o>1.6$, $\Delta n>0.1$) to provide a narrowband reflection band that is comparable to the conventional narrowband CLC element or PVH element. When the disclosed LCPH element 200 is fabricated based on the same low-birefringence LC material, the disclosed LCPH element 200 may provide a narrower reflection band than the conventional narrowband CLC element or PVH element.

Figure 2D:
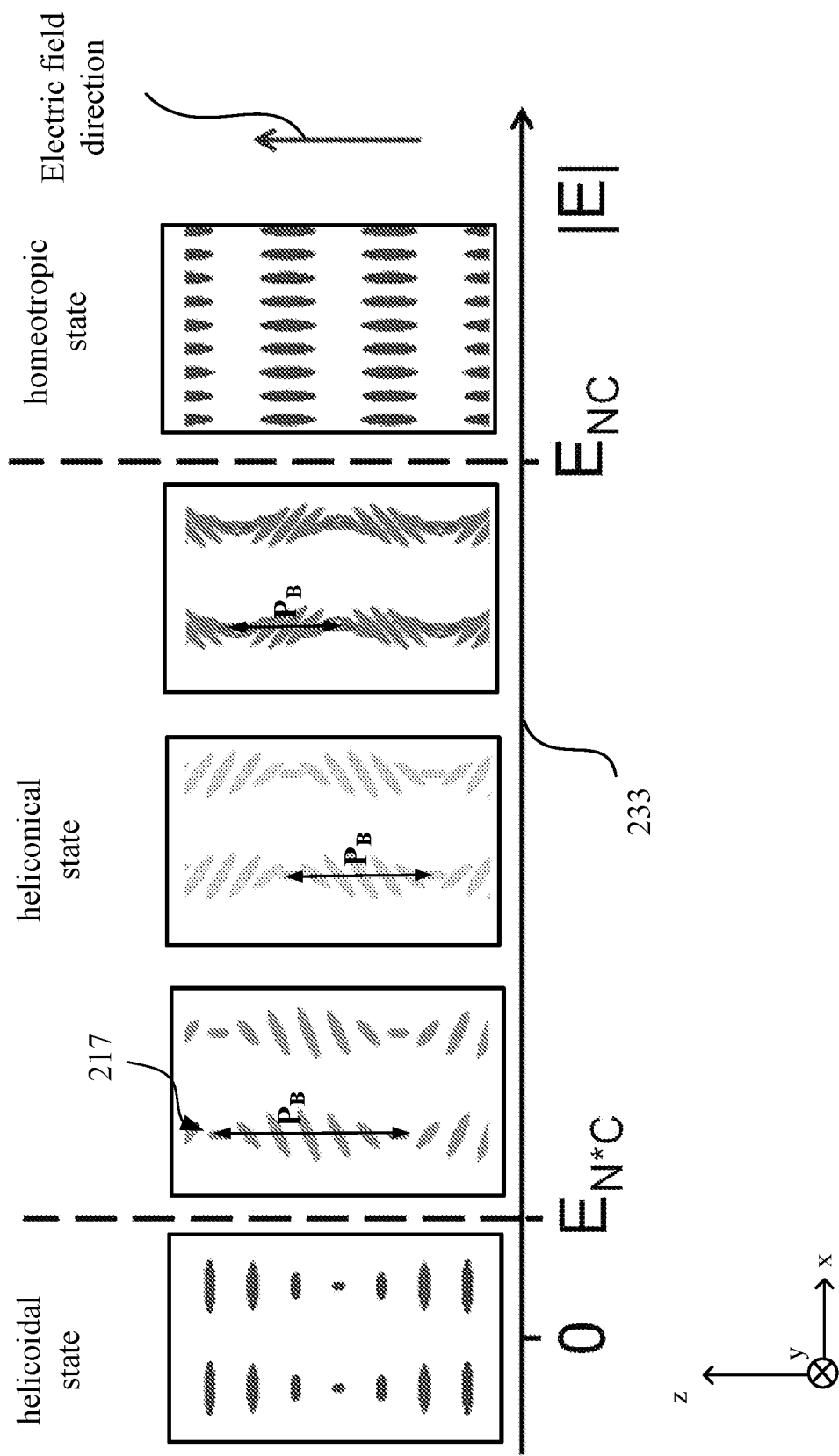
FIG. 2D illustrates various operation states of the LCPH element shown in FIG. 2B, according to an embodiment of the present disclosure.
Figure 2E:
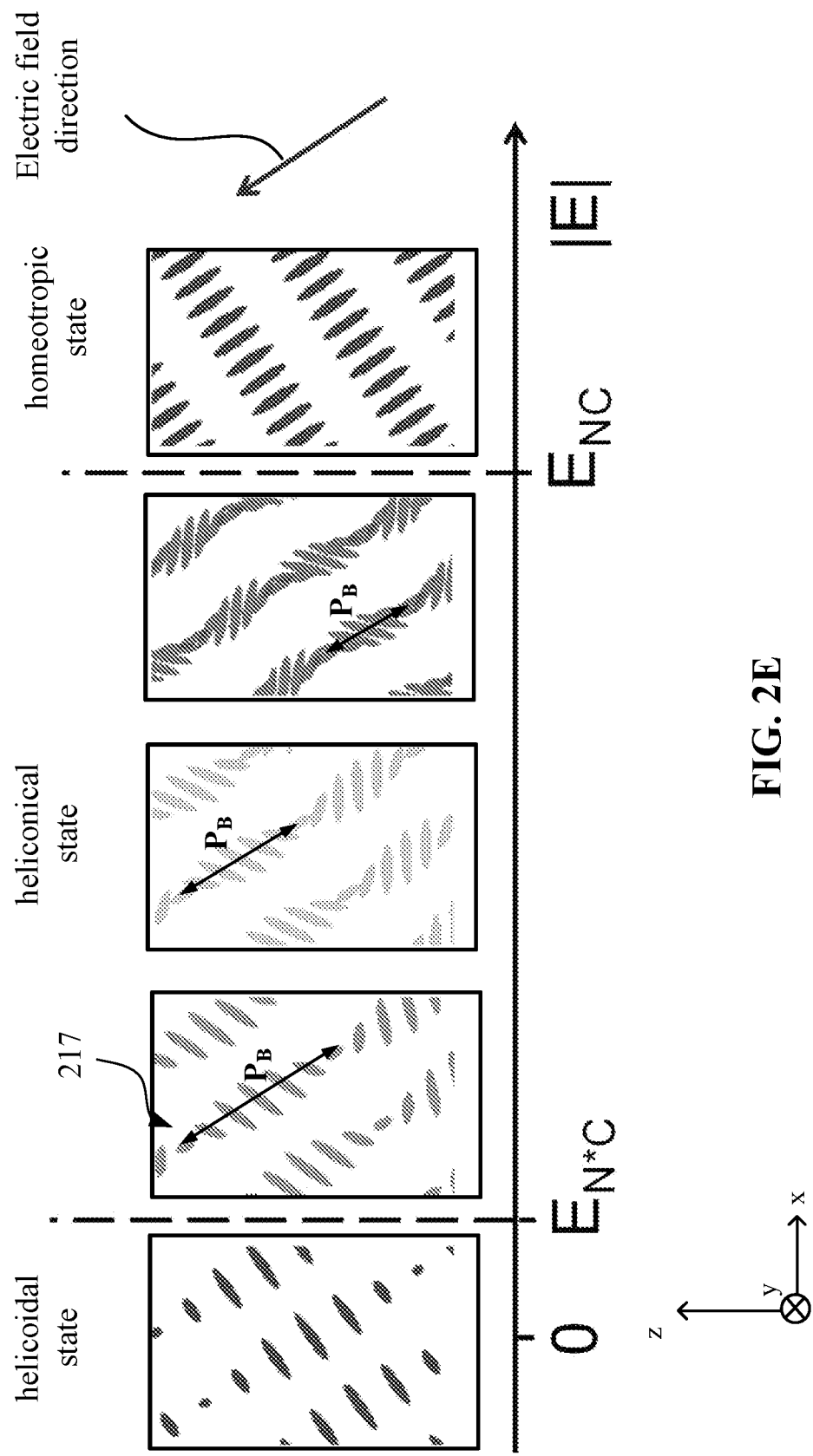
FIG. 2E illustrates various operation states of the LCPH element shown in FIG. 2C, according to an embodiment of the present disclosure.
Figure 2F:
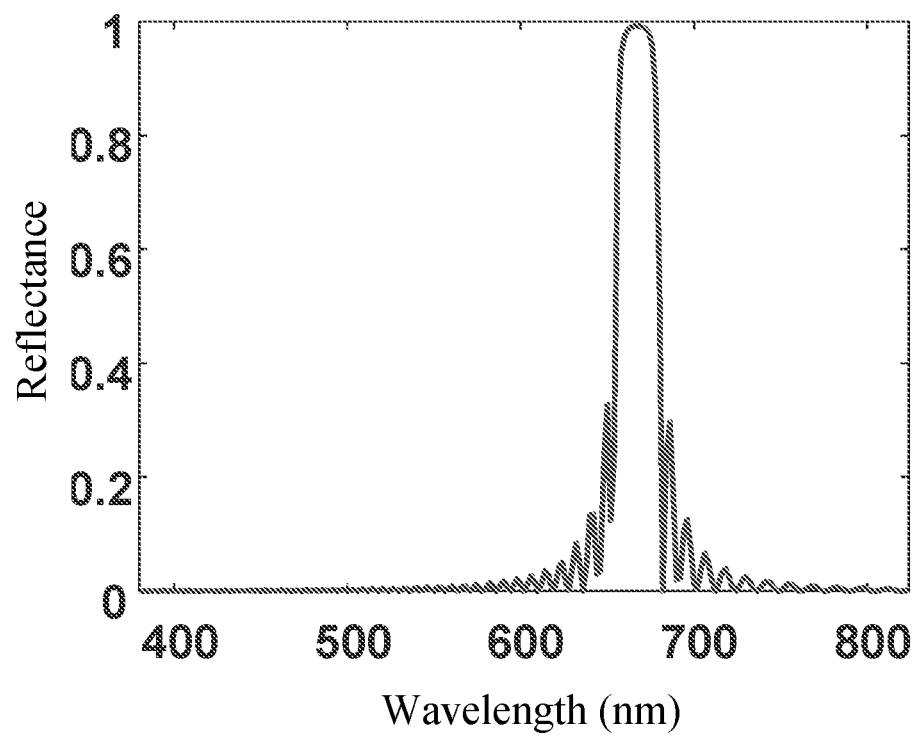
FIG. 2F illustrates a reflection band of the LCPH element shown in FIG. 2A, according to an embodiment of the present disclosure.

FIG. 2D illustrates various operation states of the LCPH element 200 shown in FIG. 2B, according to an embodiment of the present disclosure, and FIG. 2E illustrates various operation states of the LCPH element 200 shown in FIG. 2C, according to an embodiment of the present disclosure. As shown in FIGS. 2D and 2E, the LCPH element 200 may operate at a helicoidal state (or planar state), a heliconical state, or a homeotropic state, depending on the intensity of the applied electric field. For discussion purposes, FIG. 2D shows that the direction of the out-of-plane electric field generated within the birefringent medium layer 215 is perpendicular to the surface 215-1 or 215-2 of the birefringent medium layer 215, and FIG. 2E shows that the direction of the out-of-plane electric field generated within the birefringent medium layer 215 is slanted with respect to surface 215-1 or 215-2 of the birefringent medium layer 215. For discussion purposes, FIGS. 2D and 2E show that the birefringent medium in the birefringent medium layer 215 has a positive dielectric anisotropy.

When the intensity of the applied electric field is greater than 0 and less than or equal to a first threshold electric field intensity $E_1$ (i.e., $0<E\leq E_1$), the LC molecules 212 may not be reoriented by the applied electric field. The LCPH element 200 may operate at the helicoidal state, and the helical twist structures 217 may be helicoidal twist structures, where the LC molecules 212 may be located within a plane substantially perpendicular to the helical axis 218, and the directors of the LC molecules 212 may be substantially perpendicular to the helical axis 218 (e.g., the tilt angle φ of the LC molecules 212 may be about zero degree).

The LC molecules 212 located in close proximity to the surface 215-1 or 215-2 of the birefringent medium layer 215 may be aligned in a predetermined in-plane orientation pattern according to the predetermined surface alignment pattern of the first alignment structure 210a and the second alignment structure 210b. The predetermined in-plane orientation pattern may be a uniform in-plane orientation pattern or a non-uniform in-plane orientation pattern. The uniform in-plane orientation pattern means that the orientations of the optical anisotropic molecules may be substantially the same. The non-uniform in-plane orientation pattern means that the orientations of the optical anisotropic distributed along one or more in-plane directions may change in the one or more in-plane directions. Depending on the in-plane orientation pattern, the LCPH element 200 may function as a circular reflective polarizer, a grating, a lens, a freeform phase plate, etc. Exemplary orientations of the LC molecules 212 located in close proximity to the surface 215-1 or 215-2 of the birefringent medium layer 215 are shown in FIGS. 4A-4E. The orientations of the LC molecules 212 within the volume of the birefringent medium layer 215 may be determined by the material properties of the birefringent medium in the birefringent medium layer 215. Thus, the Bragg period and the helical pitch of the LCPH element 200 operating at the helicoidal state may be determined by the material properties of the birefringent medium in the birefringent medium layer 215.

When the intensity of the applied electric field is greater than the first threshold electric field intensity $E_1$ and less than or equal to a second threshold electric field intensity $E_2$ (i.e., $E_1<E\leq E_2$), the LC molecules 212 may be reoriented by the applied electric field, whereas the helical twist structures 217 may be preserved. The directors of the LC molecules 212 may trend to be reoriented to be parallel with the direction of the applied electric field. The LCPH element 200 may operate at a heliconical state, and the helical twist structures 217 may be heliconical twist structures, where the LC molecules 212 may be tilted with respect to the helical axis 218. In some embodiments, the cone angle θ of the LC molecules 212 may be greater than 0° and equal to or less than the first predetermined angle (e.g., 35°, 33°, 30°, etc.), and the tilt angle (p may be equal to or greater than the second predetermined angle (e.g., 55°, 57°, 60°, etc.) and less than 90°.

When the LCPH element 200 operates at the heliconical state, the direction of the helical axis may be parallel with the direction of the out-of-plane electric field generated within the birefringent medium layer 215. When the LCPH element 200 operates at the heliconical state, the Bragg period and the helical pitch of the LCPH element 200 may be determined by the material properties of the birefringent medium in the birefringent medium layer 215, and the intensity and the direction of the out-of-plane electric field generated within the birefringent medium layer 215. For example, as shown in FIGS. 2D and 2E, when the intensity of the applied electric field gradually increases from the first threshold electric field intensity $E_1$ to the second threshold electric field intensity $E_2$, the directors of the LC molecules 212 may be gradually reoriented to be parallel with the direction of the applied electric field. The Bragg period $P_B$ (and the helical pitch) of the LCPH element 200 may gradually decrease and, accordingly, the reflection band of the LCPH element 200 may be blue shifted (e.g., shifted toward a shorter wavelength) whereas the ultranarrow reflection band may be maintained.

When the intensity of the applied electric field is greater than the second threshold electric field intensity $E_2$ (i.e., $E>E_2$), the LCPH element 200 may operate at a homeotropic state, where the heliconical twist structures 217 may be unwound, and the directors of the LC molecules 212 may be substantially oriented along the direction of the out-of-plane electric field. When the out-of-plane electric field is removed, the LCPH element 200 may return to the helicoidal state (or planar state).

In some embodiments, the second threshold electric field intensity $E_2$ may be determined according to the following equation:

$$E_2 = \frac{2\pi}{P_0} \frac{K_{22}}{\sqrt{\varepsilon_0 \varepsilon_a K_{33}}},$$

where $K_{33}$ and $K_{22}$ are the bend elastic constant and the twist elastic constant of the LC material, Ea is the dielectric anisotropy of the LC material, $\varepsilon_0$ is the vacuum permittivity, $P_0$ is the helical pitch of the helical twist structures 217 when the helical twist structures 217 are helicoidal twist structures (e.g., the tilt angle φ of the LC molecules 212 is about zero degree). In some embodiments, the second threshold electric field intensity $E_2$ may be the threshold electric field intensity for the helical twist structures 217 to transform from the heliconical twist structures to the unwounded state.

In some embodiments, the first threshold electric field intensity $E_1$ may be determined according to the following equation:

$$E_1 \approx E_2 \frac{k(2 + \sqrt{2(1-k)})}{1+k},$$

where k is a ratio between the bend elastic constant ($K_{33}$) and the twist elastic constant ($K_{22}$) of the LC material, i.e., $k=K_{33}/K_{22}$, and $E_2$ is the second threshold electric field intensity. In some embodiments, the first threshold electric field intensity $E_1$ may be the threshold electric field intensity for the helical twist structures 217 to transform from the helicoidal twist structures where the tilt angle φ of the LC molecules 212 is about zero degree to the heliconical twist structures where the tilt angle φ of the LC molecules 212 changes to be greater than the second predetermined angle (e.g., 55°, 57°, 60°, etc.) and less than 90°.

In some embodiments, the cone angle θ of the heliconical twist structures 217 may be determined according to the following equation:

$$\theta = \arcsin\left(\sqrt{\frac{k}{1-k}\left(\frac{E_2}{E} - 1\right)}\right),$$

where E is the intensity of the applied electric field within the birefringent medium layer 215, k is the ratio between the bend elastic constant ($K_{33}$) and the twist elastic constant ($K_{22}$) of the LC material, i.e., $k=K_{33}/K_{22}$, and $E_2$ is the second threshold electric field intensity.

In some embodiments, the helical pitch $P_h$ of the heliconical twist structures 217 may be determined according to the following equation:

$$P_h = \frac{2\pi}{E}\sqrt{\frac{K_{33}}{\varepsilon_0 \varepsilon_a}} = \frac{kE_2 P_0}{E},$$

where E is the intensity of the applied electric field within the birefringent medium layer 215, $\varepsilon_a$ is the dielectric anisotropy of the LC material, $\varepsilon_0$ is the vacuum permittivity, $K_{33}$ is the bend elastic constant of the LC material, $E_2$ is the second threshold electric field intensity, and $P_0$ is the helical pitch of the helical twist structures 217 when the helical twist structures 217 are helicoidal twist structures (e.g., the tilt angle φ of the LC molecules 212 is about zero degree). As the equation of the helical pitch $P_h$ of the heliconical twist structures 217 shows, when the intensity E of the applied electric field within the birefringent medium layer increases, the helical pitch $P_h$ of the heliconical twist structures 217 may decrease. Accordingly, the Bragg period $P_B$ of the LCPH element 200 may decrease, and the reflection band of the LCPH element 200 may be blued shifted.

FIGS. 4A-4E illustrate x-y sectional views of a portion of the birefringent medium layer 215 shown in FIG. 2A, showing exemplary in-plane orientation patterns of the LC directors of the LC molecules 212 located in close proximity to the surface (e.g., 215-1 and/or 215-2) of the birefringent medium layer 215, when the LCPH element 200 operates at the helicoidal state according to various embodiments of the present disclosure. In some embodiments, the LC molecules 212 located in close proximity to the surface 215-1 and/or 215-2 of the birefringent medium layer 215 may have other suitable surface alignment patterns different from those shown in FIGS. 4A-4E.

Figure 4A:
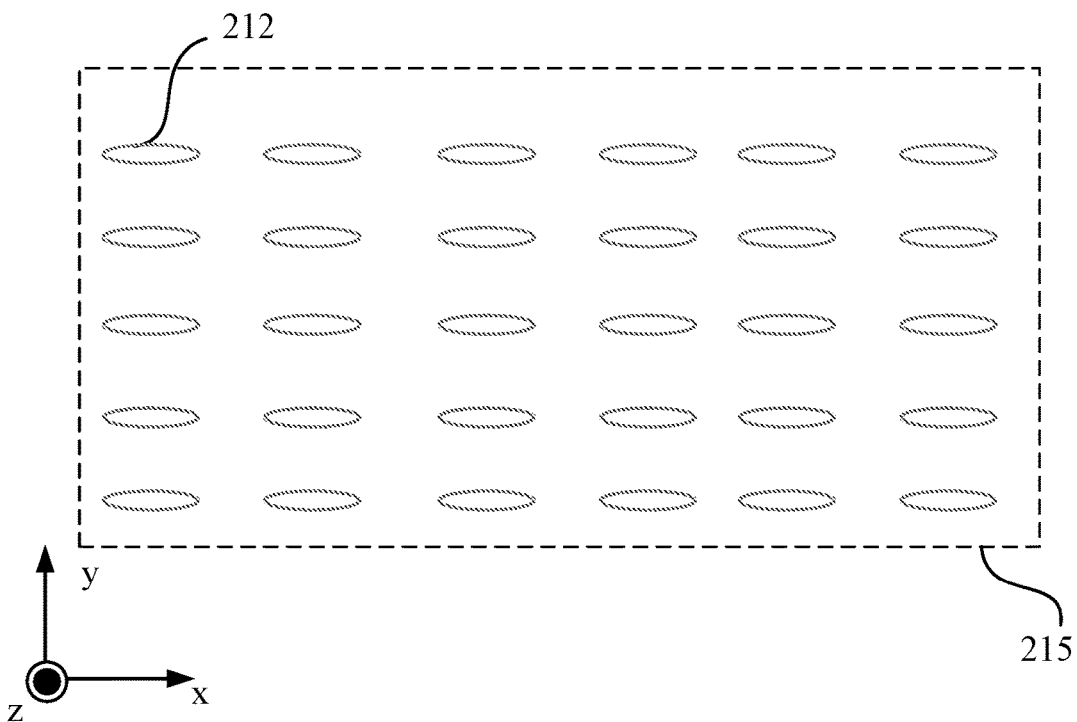
FIGS. 4A-4E illustrate schematic diagrams showing in-plane orientations of LC molecules in the LCPH element shown in FIG. 2A at a heliconical state, according to various embodiments of the present disclosure.

In the embodiment shown in FIG. 4A, at least one (e.g., each) of the first alignment structure 210a or the second alignment structure 210b may be configured to provide spatially uniform alignments to the LC molecules 212 that are located in close proximity to the surface of the birefringent medium layer 215. That is, the LC directors of the LC molecules 212 that are located in close proximity to the surface of the birefringent medium layer 215 may be substantially uniformly aligned (e.g., along an x-axis direction shown in FIG. 4A). Accordingly, the orientations of the LC directors of the LC molecules 212 located in close proximity to the surface of the birefringent medium layer 215 may exhibit a uniform in-plane orientation pattern. In some embodiments, the LCPH element 200 including the birefringent medium layer 215 having the in-plane orientation pattern shown in FIG. 4A and the out-of-plane orientation pattern shown in FIG. 2B may function as a circular reflective polarizer.

In some embodiments, at least one (e.g., each) of the first alignment structure 210a or the second alignment structure 210b may be configured to provide spatially non-uniform surface alignments. Thus, the orientations of the LC directors of the LC molecules 212 located in close proximity to the surface of the birefringent medium layer 215 may exhibit a non-uniform in-plane orientation pattern. For example, orientations of the LC directors of the LC molecules located in close proximity to the surface of the birefringent medium layer 215 may periodically or non-periodically vary in at least one in-plane direction within the surface, such as in a linear direction, in a radial direction, in a circumferential (e.g., azimuthal) direction, or a combination thereof. Accordingly, the birefringent medium layer 215 may provide different optical functions. For example, the LCPH element 200 may function as a grating, a prism, a lens, a segmented waveplate or a segmented phase retarder, a lens array, a prism array, etc. Exemplary non-uniform alignment patterns of the LC molecules that are located in close proximity to the surface of the birefringent medium layer 215 are shown in FIGS. 4B-4E.

Figure 4B:
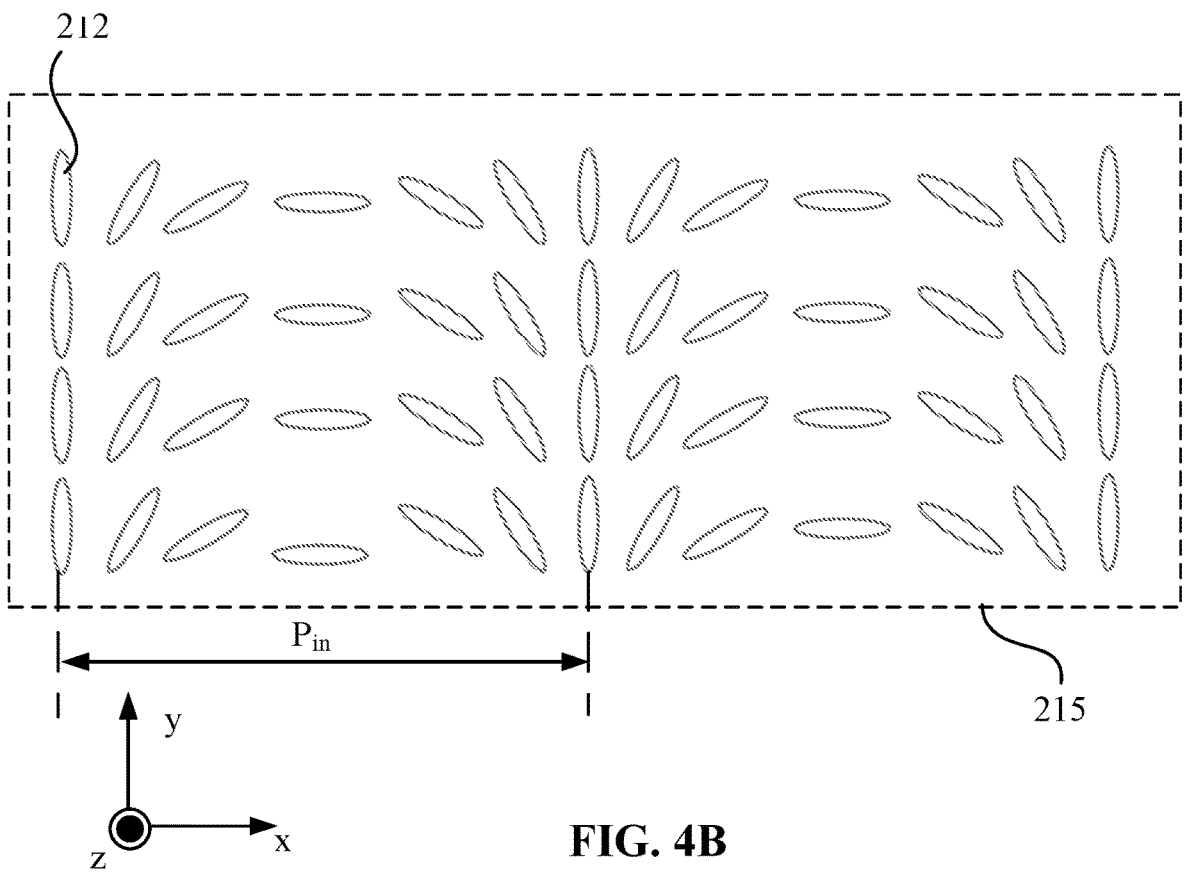

In the embodiment shown in FIG. 4B, the directors of the LC molecules 212 located in close proximity to the surface of the birefringent medium layer 215 may exhibit a periodic, continuous rotation in a predetermined in-plane direction within the surface, e.g., the x-axis direction. The continuous rotation of the LC directors may form a periodic rotation pattern with a uniform (e.g., same) in-plane pitch $P_{in}$. It is noted that the predetermined in-plane direction may be any other suitable direction within the surface, such as the y-axis direction, the radial direction, or the circumferential direction within the x-y plane. The in-plane pitch (or horizontal pitch) $P_{in}$ may be defined as a distance along the predetermined in-plane direction (e.g., the x-axis) over which the orientations of the LC directors exhibit a rotation by a predetermined angle (e.g., 180°). The periodically varying in-plane orientations of the LC directors shown in FIG. 4B may be referred to as a grating pattern, and the LCPH element 200 including the birefringent medium layer 215 configured with the in-plane orientation pattern shown in FIG. 4B and the out-of-plane orientation pattern shown in FIG. 2C may function as a reflective PVH grating.

In addition, within the surface of the birefringent medium layer 215, the orientations of the directors of the LC molecules 212 may rotate along the predetermined in-plane direction (e.g., the x-axis) in a predetermined rotation direction, e.g., a clockwise direction or a counter-clockwise direction. Accordingly, the rotation of the orientations of the directors of the LC molecules 212 along the predetermined in-plane direction (e.g., the x-axis) may exhibit a handedness, e.g., right handedness or left handedness. For discussion purposes, FIG. 2C shows that the orientations of the directors of the LC molecules 212 may rotate along the predetermined in-plane direction (e.g., the x-axis) in a clockwise direction, exhibiting a left handedness.

Although not shown in FIG. 4B, in some embodiments, the orientations of the directors of the LC molecules 212 located in close proximity to the surface of the birefringent medium layer 215 may exhibit a rotation in a counter-clockwise direction. Accordingly, the rotation of the orientations of the directors of the LC molecules 212 may exhibit a right handedness. Although not shown, in some embodiments, within the surface of the birefringent medium layer 215, domains in which the orientations of the directors of the LC molecules 212 exhibit a rotation in a clockwise direction (referred to as domains $D_L$) and domains in which the orientations of the directors of the LC molecules 212 exhibit a rotation in a counter-clockwise direction (referred to as domains $D_R$) may be alternatingly arranged in two in-plane directions, e.g., in x-axis and y-axis directions.

Figure 4C:
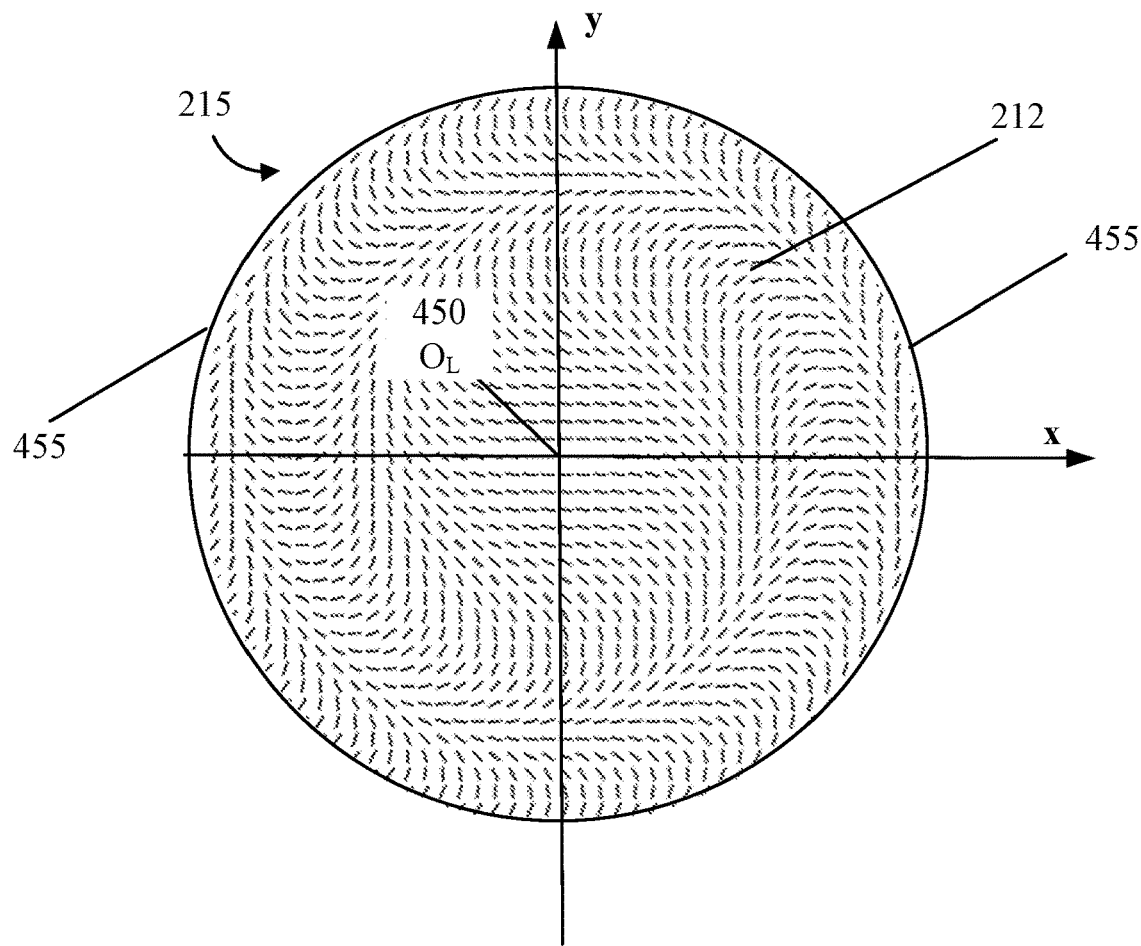

The in-plane orientation pattern of the LC directors shown in FIG. 4C may be referred to as a lens pattern (e.g., a spherical lens pattern). The LCPH element 200 including the birefringent medium layer 215 configured with the in-plane orientation pattern shown in FIG. 4C and the out-of-plane orientation pattern shown in FIG. 2C may function as a reflective PVH lens (e.g., spherical lens). In the embodiment shown in FIG. 4C, the orientations of the LC directors of LC molecules 212 located in close proximity to the surface of the birefringent medium layer 215 may exhibit a continuous rotation in at least two opposite in-plane directions from a lens pattern center 450 to opposite lens pattern peripheries 455 with a varying pitch. The orientations of the LC directors may exhibit a rotation in the same rotation direction (e.g., clockwise, or counter-clockwise) from the lens pattern center 450 to the opposite lens pattern peripheries 455.

Figure 4D:
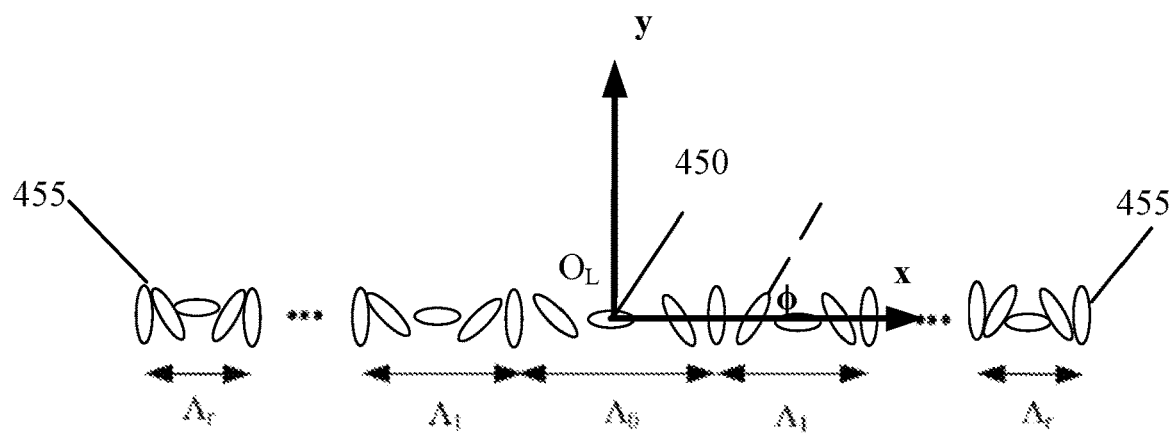

The in-plane pitch $\Lambda$ of the in-plane orientation pattern may be defined as a distance in the in-plane direction (e.g., a radial direction) over which the orientations of the LC directors (or azimuthal angles $\phi$ of the LC molecules 212) change by a predetermined angle (e.g., 180°) from a predetermined initial state. FIG. 4D illustrates a section of the in-plane orientation pattern taken along an x-axis in the birefringent medium layer 215 shown in FIG. 4C, according to an embodiment of the present disclosure. As shown in FIG. 4D, according to the LC director field along the x-axis direction, the pitch $\Lambda$ may be a function of the distance from the lens pattern center 450. The pitch $\Lambda$ may monotonically decrease from the lens pattern center 450 to the lens pattern peripheries 455 in the at least two opposite in-plane directions (e.g., two opposite radial directions) in the x-y plane, e.g., $\Lambda_0 > \Lambda_1 > \ldots > \Lambda_r$. $\Lambda_0$ is the pitch at a central region of the lens pattern, which may be the largest. The pitch $\Lambda_r$ is the pitch at a periphery region (e.g., lens pattern periphery 455) of the lens pattern, which may be the smallest. In some embodiments, the azimuthal angle $\varphi$ of the LC molecule 212 may change in proportional to the distance from the lens pattern center 450 to a local point of the birefringent medium layer 215 at which the LC molecule 212 is located.

Figure 4E:
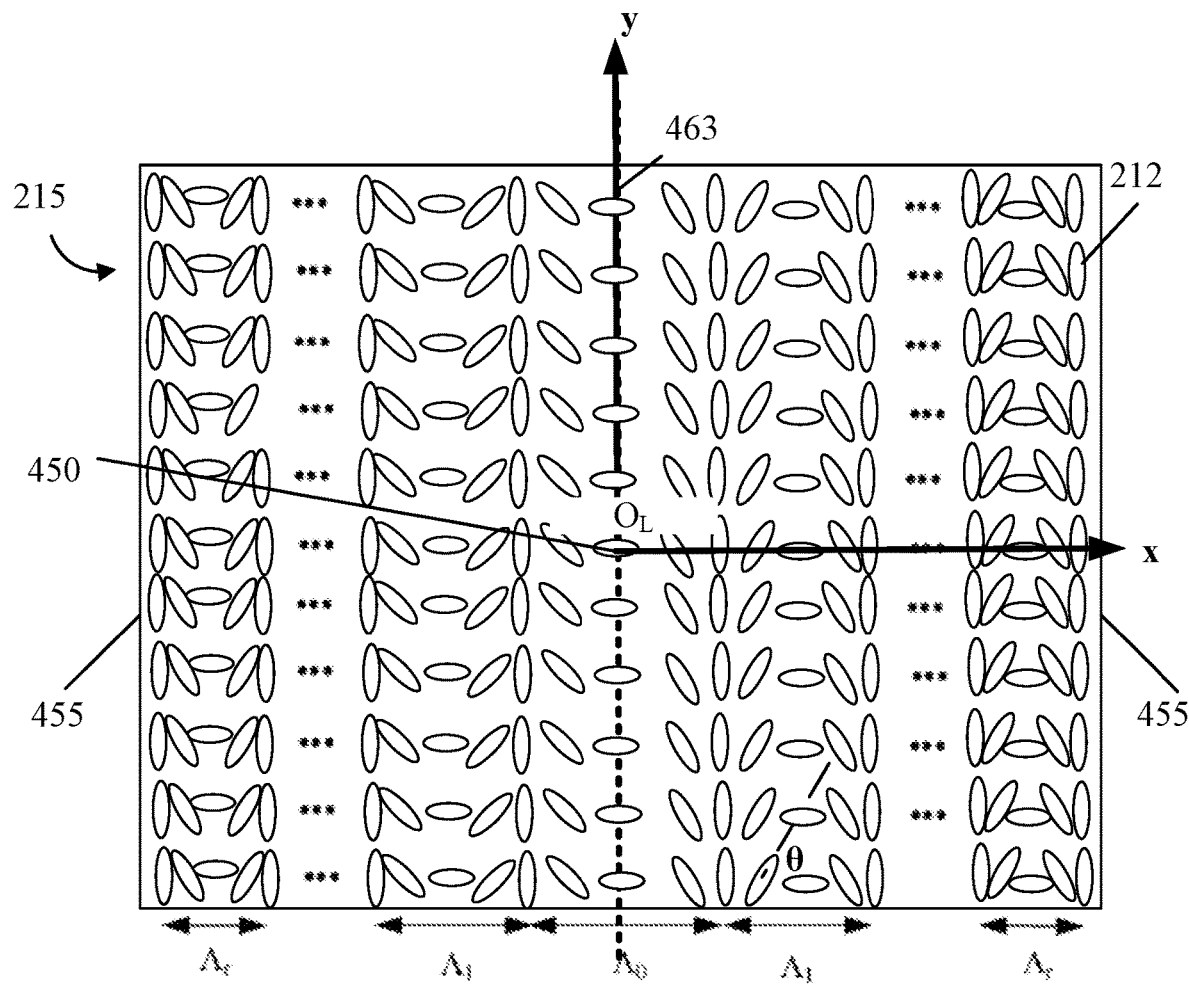
Figure 4E:
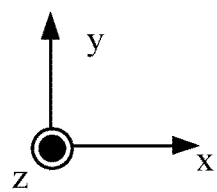

In the embodiment shown in FIG. 4E, the LCPH element 200 is shown as having a rectangular shape (or a rectangular lens aperture). A width direction of LCPH element 200 may be referred to as a lateral direction (e.g., an x-axis direction in FIG. 4E), and a length direction of the LCPH element 200 may be referred to as a longitudinal direction (e.g., a y-axis direction in FIG. 4E). In the embodiment shown in FIG. 4E, the orientations of the LC molecules 212 located in close proximity to the surface of the birefringent medium layer 215 may be configured with an in-plane orientation pattern having a varying pitch in at least two opposite lateral directions, from the lens pattern center ("$O_L$") 450 to the opposite lens pattern peripheries 455. The orientations of the LC directors of the LC molecules 212 located on the same side of an in-plane lens pattern center axis 463 and at a same distance from the in-plane lens pattern center axis 463 may be substantially the same. The rotations of the orientations of the LC directors from the lens pattern center 450 to the opposite lens pattern peripheries 455 in the two opposite lateral directions may exhibit a same handedness (e.g., right, or left handedness).

In the embodiment shown in FIG. 4E, the directors of the LC molecules 212 may be configured with a continuous in-plane rotation pattern with a varying pitch ($\Lambda_0, \Lambda_1, \ldots, \Lambda_r$) from the lens pattern center 450 to opposite lens pattern peripheries 455 in the two opposite lateral directions. As shown in FIG. 4E, the pitch of the lens pattern may vary with the distance to the in-plane lens pattern center axis 463 in the lateral direction. In some embodiments, the pitch of the lens pattern may monotonically decrease as the distance to the in-plane lens pattern center axis 463 in the lateral direction increases, i.e., $\Lambda_0 > \Lambda_1 > \ldots > \Lambda_r$, where $\Lambda_0$ is the pitch at a central portion of the lens pattern, which may be the largest. The pitch $\Lambda_r$ is the pitch at an edge or periphery region of the lens pattern, which may be the smallest.

The LCPH element 200 including the birefringent medium layer 215 configured with the in-plane orientation pattern shown in FIG. 4E and the out-of-plane orientation pattern shown in FIG. 2C may function as a reflective PVH lens, e.g., an on-axis focusing cylindrical lens that may focus a beam into a line (e.g., a line of focal points or a line focus). The cylindrical lens with the in-plane orientation pattern shown in FIG. 4E may be considered as a 1D example of the spherical lens with the in-plane orientation pattern shown in FIGS. 4C and 4D, and the at least two opposite in-plane directions in the LCPH element 200 may include at least two opposite lateral directions (e.g., the +x-axis and −x-axis directions).

Referring to FIGS. 2A, 2C, and 4B-4E, the in-plane pitch $P_{in}$ (or $\Lambda$) of the LCPH element 200 may determine the diffraction angle of a diffracted light. The diffraction angle of a first order diffracted light may be calculated by the following grating equation:

$$\theta_{def} = \arcsin(\lambda_0/(n*P_{in})),$$

where $\theta_{def}$ is the diffraction angle of the first order diffracted light, $\lambda_0$ is the wavelength of an input light of the LCPH element 200, n is the refractive index of the birefringent medium in the LCPH element 200, and $P_{in}$ is the in-plane pitch of the LCPH element 200. According to the grating equation, the diffraction angle of the first order diffracted light may increase as the in-plane pitch $P_{in}$ decreases. Thus, through changing the in-plane pitch $P_{in}$ of the LCPH element 200, the diffraction angle of the first order diffracted light may be tunable. Accordingly, the LCPH element 200 may provide a beam steering function. In some embodiments, the LCPH element 200 may provide a continuous beam steering through changing the in-plane pitch $P_{in}$ in a continuous manner. In some embodiments, the LCPH element 200 may provide a discrete beam steering through changing the in-plane pitch $P_{in}$ of the LCPH element 200 in a discrete manner. In some embodiments, the beam steering range may be further increased by stacking two or more LCPH elements 200 with independently tunable in-plane pitches $P_{in}$. In each of the two or more LCPH elements 200, the in-plane pitches $P_{in}$ may be tuned in the same or different manners or profiles. In some embodiments, a two-dimensional ("2D") beam steering may be provided by stacking two LCPH elements 200 that steer a light in two different axes, respectively.

The Bragg period $P_B$, and/or the in-plane pitch $P_{in}$ of the LCPH element 200 operating at the heliconical state may be tunable via adjusting the intensity and/or the direction of the applied electric field. In some embodiments, as discussed in FIGS. 2D and 2E, the Bragg period $P_B$ of the LCPH element 200 may be tunable via varying the intensity of the applied electric field and, accordingly, the reflection band of the LCPH element 200 may be tunable. In some embodiments, the in-plane pitch $P_{in}$ of the LCPH element 200 may be tunable via varying the direction of the applied electric field and, accordingly, the diffraction angle of a diffract light of the LCPH element 200 may be tunable.

In some embodiments, through varying the intensity of the applied electric field and maintaining the direction of the applied electric field, the reflection band of the LCPH element 200 may be tunable, while the diffraction angle of a diffract light of the LCPH element 200 may be maintained. In some embodiments, through varying the direction of the applied electric field and maintaining the intensity of the applied electric field, the diffraction angle of a diffract light of the LCPH element 200 may be tunable, while the reflection band of the LCPH element 200 may be maintained. In some embodiment, through varying both the intensity and the direction of the applied electric field, both the diffraction angle of a diffract light of the LCPH element 200 and the reflection band of the LCPH element 200 may be adjustable.

Figure 5A:
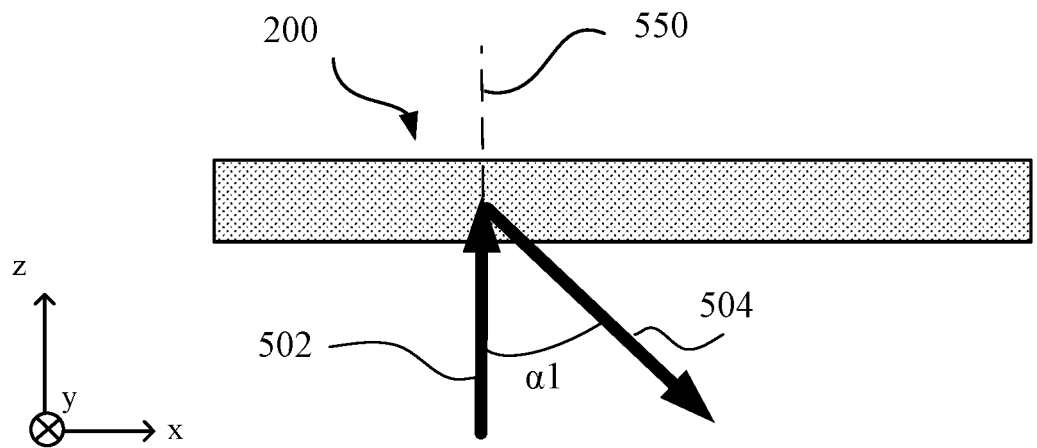
FIGS. 5A and 5B illustrate electrically tuning a diffraction angle of a diffract light of the LCPH element shown in FIG. 2C, according to an embodiment of the present disclosure.
Figure 5B:
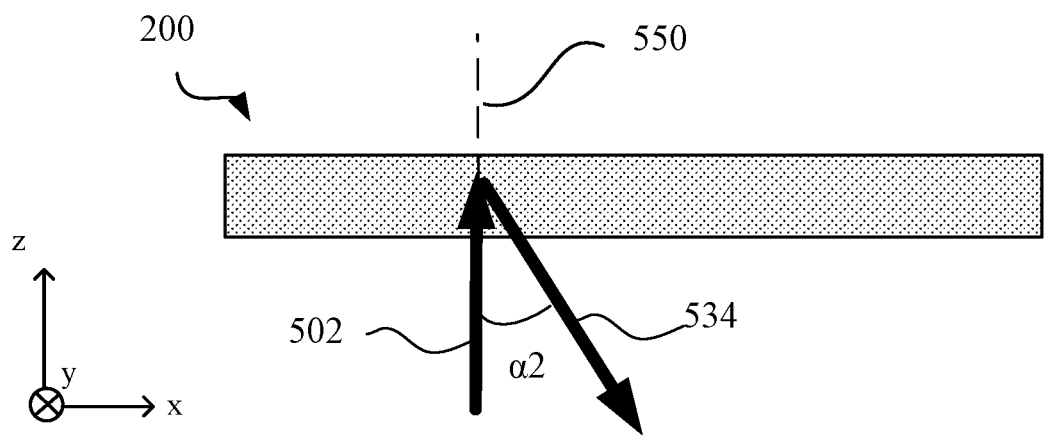
Figure 5C:
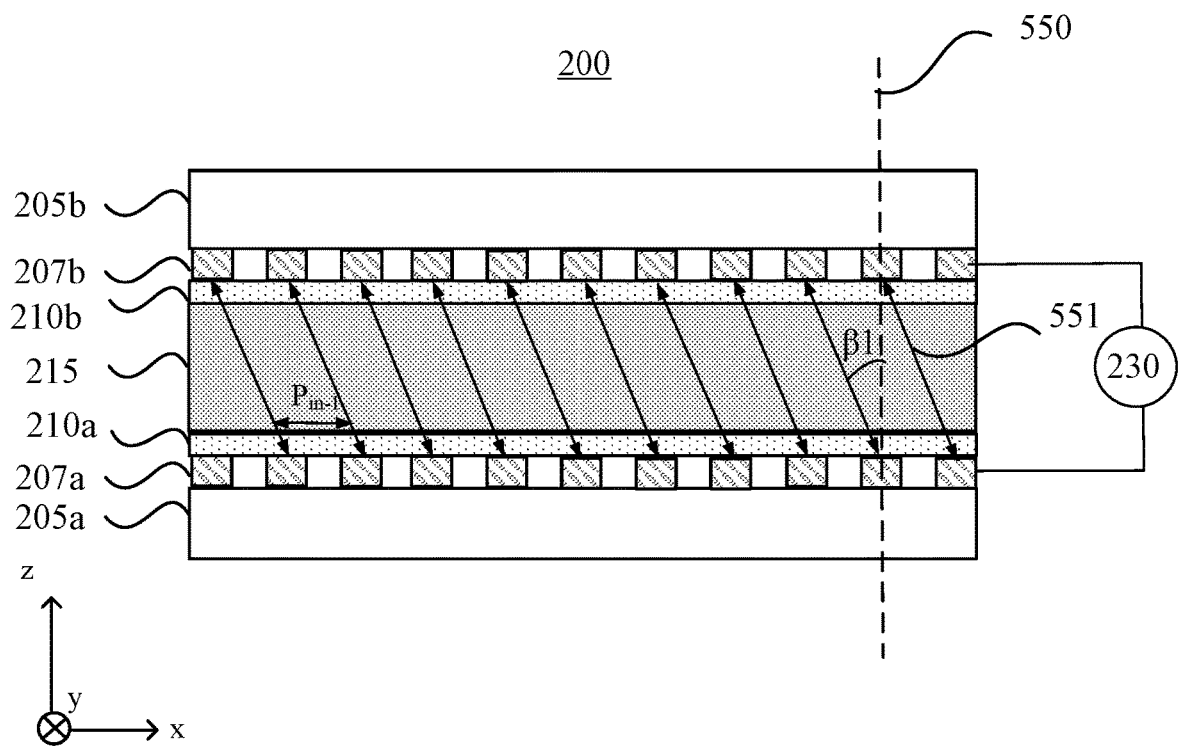
FIG. 5C illustrates an applied electric field within the LCPH element shown in FIG. 5A, according to an embodiment of the present disclosure.
Figure 5D:
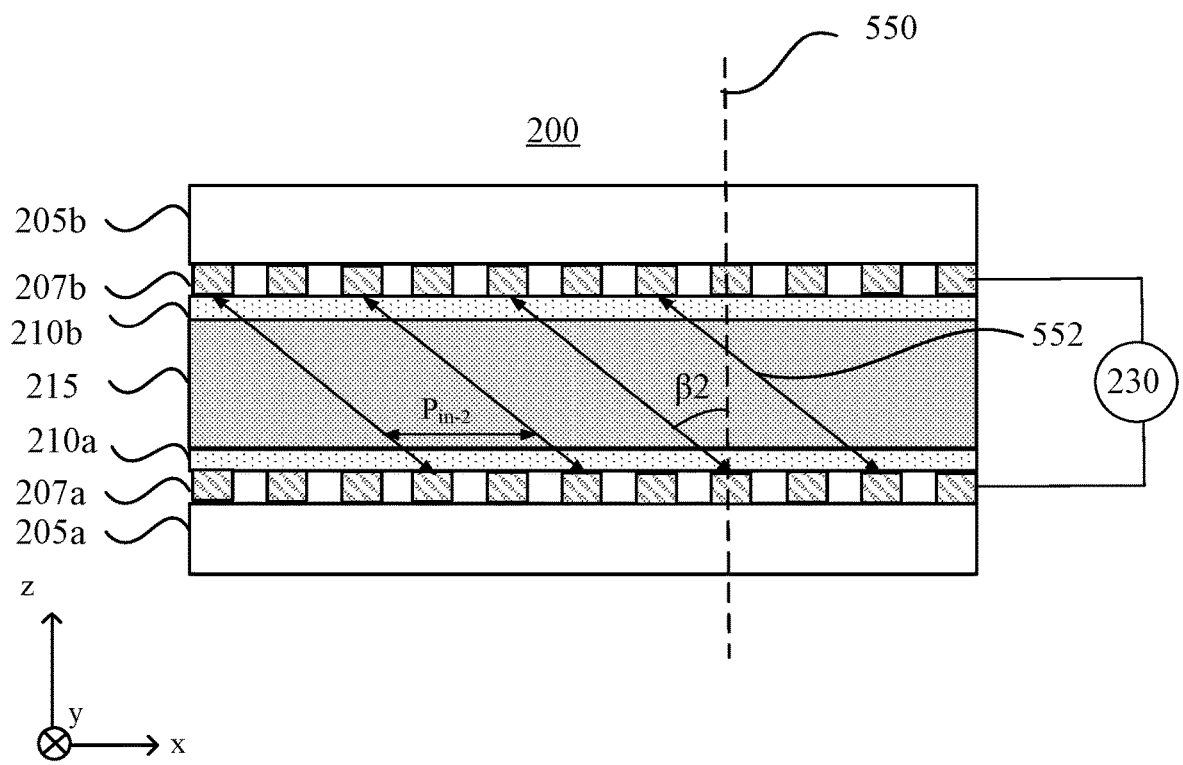
FIG. 5D illustrates an applied electric field within the LCPH element shown in FIG. 5B, according to an embodiment of the present disclosure.

FIGS. 5A and 5B illustrate electrical tuning of a diffraction angle of a diffract light of the LCPH element 200 operating at the heliconical state, according to an embodiment of the present disclosure. FIG. 5C illustrates an applied electric field within the LCPH element 200 shown in FIG. 5A, according to an embodiment of the present disclosure. FIG. 5D illustrates an applied electric field within the LCPH element 200 shown in FIG. 5B, according to an embodiment of the present disclosure. For discussion purposes, the LCPH element 200 shown in FIGS. 5A and 5B functions as a reflective PVH element, and the applied electric fields within the LCPH element 200 shown in FIG. 5C and FIG. 5D may have different directions and the same intensity.

As shown FIG. 5C, the direction of the applied electric field within the LCPH element 200 may be configured to be along a first direction 551, which may render the LCPH element 200 to have a first in-plane pitch $P_{in-1}$. The first direction 551 may be tilted with respect to a normal 550 of the surface 215-1 or 215-2 of the birefringent medium layer 215 by a first angle θ1. As shown FIG. 5A, a circularly polarized input light 502 may have a wavelength range within a reflection band of the LCPH element 200, and a handedness that is the same as the handedness of the heliconical twist structures of the LCPH element 200. The LCPH element 200 may substantially reflect (e.g., via backward diffraction) the circularly polarized input light 502 as a substantially circularly polarized output light 504, which may form a first deflection (or diffraction) angle $\alpha_1$ with respect to the surface normal 550 of the LCPH element 200.

As shown in FIG. 5D, the direction of the applied electric field within the LCPH element 200 may be configured to be along a second direction 552, which may render the LCPH element 200 to have a second in-plane pitch $P_{in-2}$. The second direction 552 may be tilted with respect to the surface normal 550 of the birefringent medium layer 215 by a second angle $\beta_2$. Referring to FIGS. 5C and 5D, the second angle $\beta_2$ may be greater than the first angle $\beta_1$ shown in FIG. 5C, and the second in-plane pitch $P_{in-2}$ may be greater than the first in-plane pitch $P_{in-1}$ shown in FIG. 5C. As shown in FIG. 5B, the LCPH element 200 may substantially reflect (e.g., via backward diffraction) the circularly polarized input light 502 as a substantially circularly polarized output light 534, which may form a second deflection (or diffraction)

angle $\alpha_2$ with respect to the surface normal 550 of the LCPH element 200. The second deflection (or diffraction) angle $\alpha_2$ may be less than the first deflection (or diffraction) angle $\alpha_1$ shown in FIG. 5A.

For discussion purposes, FIGS. 5A-5D show that as the tilting of the applied electric field with respect to the surface normal 550 increases, the in-plane pitch $P_{in}$ the LCPH element 200 may increase and, accordingly, the deflection (or diffraction) angle of the diffracted light of the LCPH element 200 may decrease. Thus, through varying the direction of the applied electric field within the LCPH element 200, the LCPH element 200 may function as or may be implemented in a beam steering device.

Figure 6A:
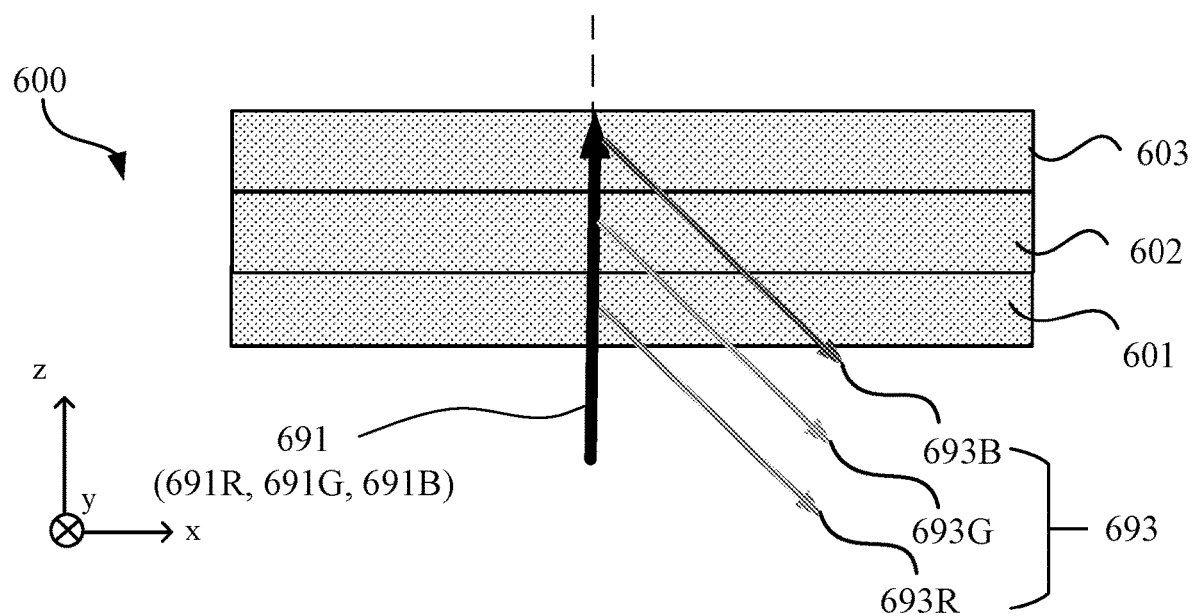
FIG. 6A illustrates a schematic diagram of an LCPH device, according to an embodiment of the present disclosure.

FIG. 6A illustrates an x-z sectional view of an LCPH device 600, according to an embodiment of the present disclosure. The LCPH device 600 may include elements that are similar to or the same as those included in the LCPH element 200 shown in FIGS. 2A-5D. Descriptions of the same or similar elements or features can refer to the above corresponding descriptions, including those rendered in connection with FIGS. 2A-5D. As shown in FIG. 6A, the LCPH device 600 may include a plurality of LCPH elements 601, 602, and 603, each of which may be an embodiment of the LCPH element disclosed herein, such as the LCPH element 200 shown in FIGS. 2A-5D. The LCPH elements 601, 602, and 603 may include heliconical twist structures having the same handedness, e.g., a first handedness. Each of the LCPH elements 601, 602, and 603 may include a single pitch layer having a constant helical pitch, whereas the helical pitches of the LCPH elements 601, 602, and 603 may vary from one to another. Thus, the reflection bands of the LCPH elements 601, 602, and 603 may vary from one to another. Each reflection band may have an ultranarrow bandwidth within a range of about 5 nm to 10 nm, a range of about 10 nm to 20 nm, a range of about 20 nm to 30 nm, or a range of about 30 nm to 40 nm, etc.

Figure 6B:
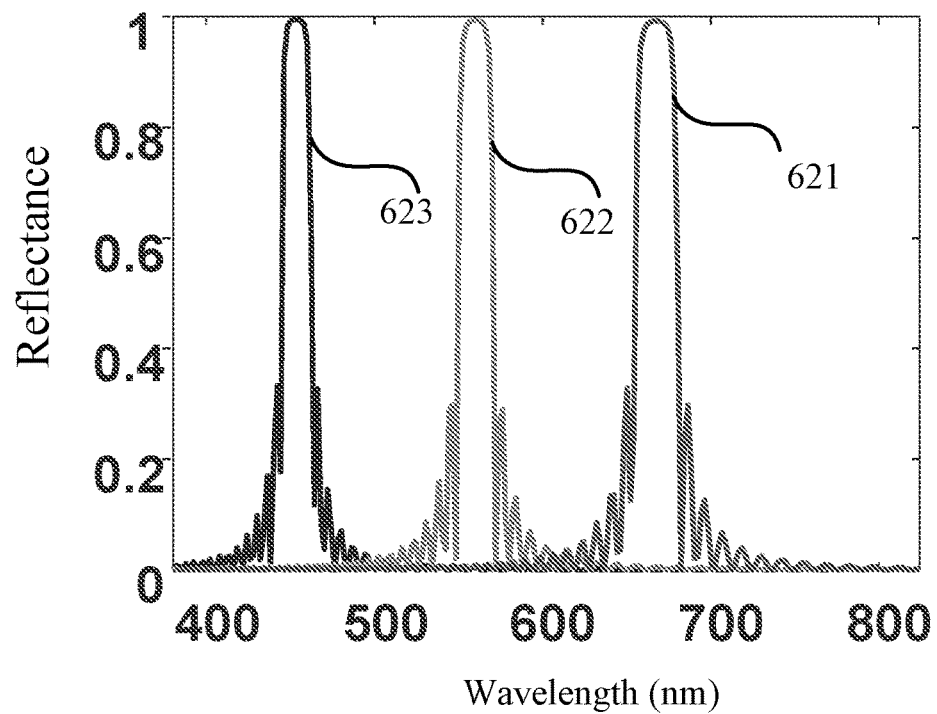
FIG. 6B illustrates a reflection band of the LCPH device shown in FIG. 6A, according to an embodiment of the present disclosure.

In some embodiments, the helical pitches of the LCPH elements 601, 602, and 603 may be configured to be of the same order as the wavelengths of visible lights and, accordingly, the LCPH device 600 may have a reflection band in the visible spectrum. FIG. 6B illustrates a reflection band of the LCPH device 600 shown in FIG. 6A, according to an embodiment of the present disclosure. As shown in FIG. 6B, the horizontal axis represents the wavelength (unit: nanometer ("nm")), and the vertical axis represents the normalized reflectance. Reflection bands 621, 622, and 623 of the LCPH elements 601, 602, and 603 may respectively correspond to a red wavelength range, a green wavelength range, and a blue wavelength range, each of which has an ultranarrow bandwidth of about 20 nm. The reflection bands of the LCPH elements 601, 602, and 603 may not overlap with one another. In some embodiments, the LCPH element 601, 602, or 603 may be optically coupled with a corresponding narrowband (e.g., 20-nm bandwidth) light source, and the reflection band of the LCPH element 601, 602, or 603 may substantially match with the emission band of the corresponding narrowband light source.

Referring back to FIG. 6A, the LCPH element 601, 602, or 603 may substantially reflect a circularly polarized light having a wavelength range within the corresponding reflection band and the first handedness. The LCPH element 601, 602, or 603 may substantially transmit a light having a wavelength range outside of the corresponding reflection band, independent of the polarization state thereof. In some embodiments, the directions of the applied electric fields within the LCPH elements 601, 602, and 603 may be individually or independently adjustable and, thus, the in-plane pitches of the LCPH elements 601, 602, and 603 may be individually or independently adjustable. In some embodiments, through configuring the in-plane pitches of the LCPH elements 601, 602, and 603, the LCPH elements 601, 602, and 603 may be configured to backwardly diffract lights of the three wavelength ranges by a common diffraction angle. Thus, the LCPH device 600 may be configured to function as an apochromatic device, e.g., an apochromatic grating that diffracts a polychromatic input light by a common diffraction angle, or an apochromatic grating that focuses a polychromatic input light to a common focal point, etc. For example, in some embodiments, the LCPH elements 601, 602, and 603 may function as reflective polarization volume hologram ("R-PVH") gratings, where the LCPH element 601 having the red reflection band may have the greatest in-plane pitch, the LCPH element 603 having the blue reflection band may have the smallest in-plane pitch, and the LCPH element 602 having the green reflection band may have a medium in-plane pitch that is between the smallest in-plane pitch and the greatest in-plane pitch.

For example, as shown in FIG. 6A, an input light 691 of the LCPH device 600 may be a polychromatic light including a red portion 691R, a green portion 691G, and a blue portion 691B. For discussion purposes, FIG. 6A shows that the LCPH device 600 functions as a left-handed R-PVH grating. The input light 691 may be a left-handed circularly polarized polychromatic light, which is substantially normally incident onto the LCPH device 600. The LCPH elements 601, 602, and 603 may backwardly diffract the red portion 691R, the green portion 691G, and the blue portion 691B of the input light 691 as a red light 693R, a green light 693G, and a blue light 693B having the common diffraction angle, respectively. Thus, the red light 693R, the green light 693G, and the blue light 693B may form a polychromatic output light 693 at the output side of the LCPH device 600. In some embodiments, the diffraction angle of the polychromatic output light 693 at the output side of the LCPH device 600 may be adjustable via adjusting the respective directions of the applied electric fields within the LCPH elements 601, 602, and 603.

Figure 6C:
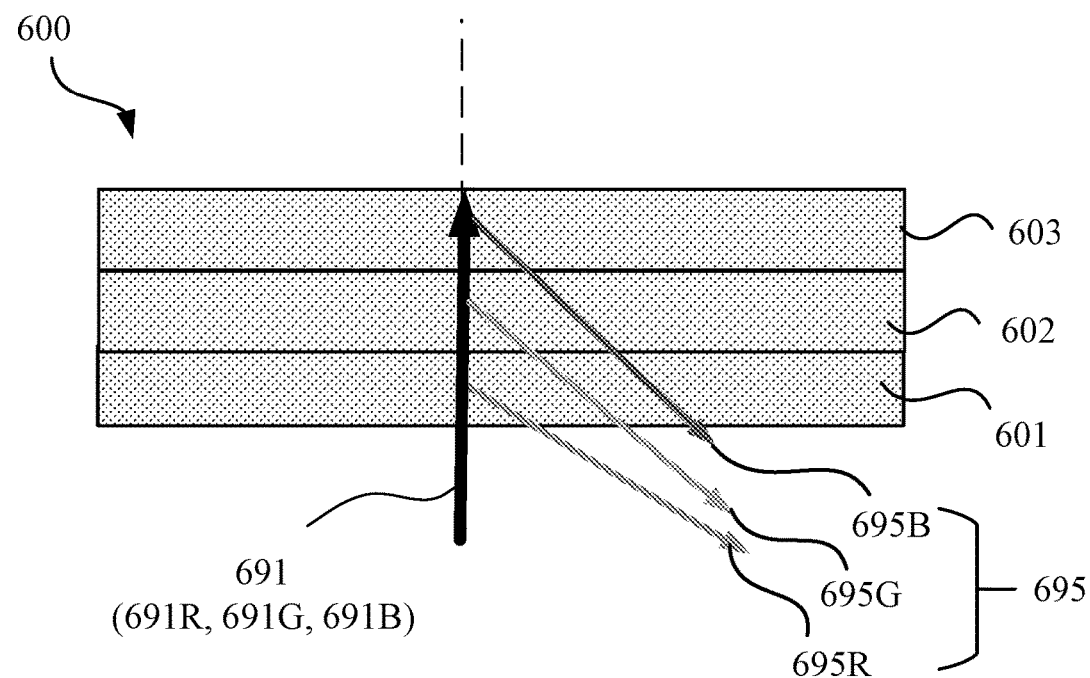
FIG. 6C illustrates light reflection of the LCPH device shown in FIG. 6A, according to an embodiment of the present disclosure.
Figure 6C:
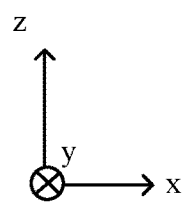

In some embodiments, as shown in FIG. 6C, the in-plane pitches of the LCPH elements 601, 602, and 603 may be configured to be the same, and the LCPH elements 601, 602, and 603 may backwardly diffract the red portion 691R, the green portion 691G, and the blue portion 691B of the input light 691 as the red light 693R, the green light 693G, and the blue light 693B having different diffraction angles.

The LCPH elements described herein may be implemented in systems or devices for imaging, sensing, communication, biomedical applications, etc. For example, the LCPH elements described herein may be implemented in various systems for augmented reality ("AR"), virtual reality ("VR"), and/or mixed reality ("MR") applications, e.g., near-eye displays ("NEDs"), head-up displays ("HUDs"), head-mounted displays ("HMDs"), smart phones, laptops, televisions, vehicles, etc. For example, the disclosed LCPH element may be implemented as a passive or active reflective polarizer in a path-folding lens assembly (e.g., a pancake lens assembly), implemented as a light guide image combiner in a light guide display assembly, implemented as an input or output coupler (or in-coupling element or out-coupling element) in a light guide illumination assembly, or implemented as a retinal projection combiner in a retinal projection display assembly, etc. The disclosed LCPH element may also be used to provide multiple image planes, pupil steered AR, VR, and/or MR display systems (e.g., holographic near eye displays, retinal projection eyewear, and wedged waveguide displays), smart glasses for AR, VR, and/or MR applications, compact illumination optics for projectors, light-field displays, etc. In some embodiments, the disclosed LCPH element may be implemented as a passive or active reflective polarizer in an object tracking system (e.g., an eye tracking system, a face tracking system, etc.). The object tracking system including one or more disclosed LCPH elements may provide an object tracking with enhanced accuracy.

Figure 7:
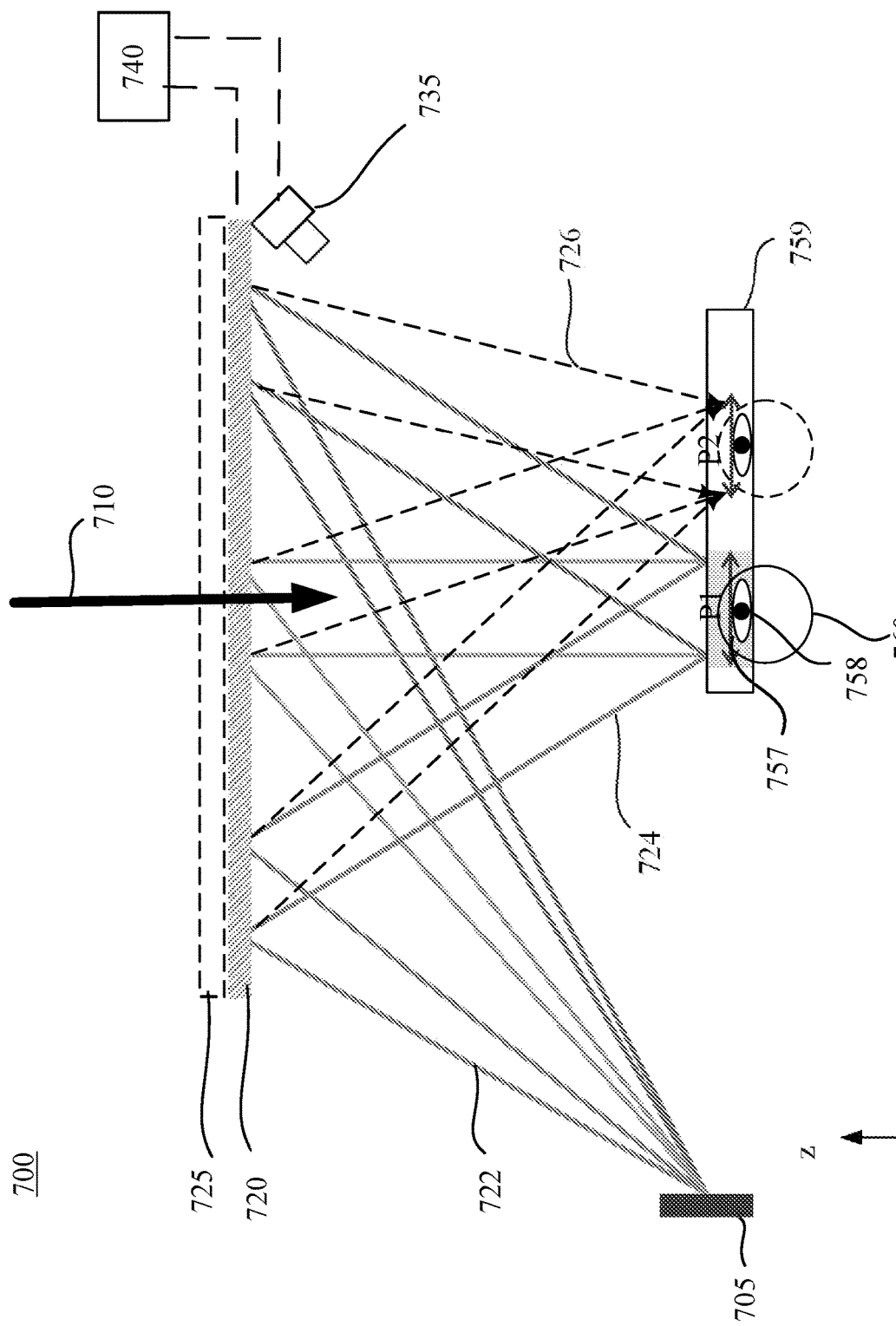
FIGS. 7-9B schematically illustrate systems including one or more LCPH elements disclosed herein, according to various embodiments of the present disclosure.

Exemplary applications of the disclosed LCPH elements in AR, VR, and/or MR systems will be explained. The various systems including one or more disclosed LCPH elements may be a part of a system for VR, AR, and/or MR applications (e.g., an NED, an HUD, an HMD, a smart phone, a laptop, or a television, etc.). FIG. 7 schematically illustrates an x-y sectional view of a system 700, according to an embodiment of the present disclosure. As shown in FIG. 7, the system 700 may include a display element 705 configured to generate an image light (or beam) 722 representing a virtual image, and an off-axis combiner 720 configured to direct the image light 722 toward an eyebox 759 of the system 700. The system 700 may further include an eye tracking device 735 and a controller 740. The controller 740 may be communicatively coupled with one or more devices in the system 700, such as the display element 705, the eye tracking device 735, and the off-axis combiner 720. The controller 740 may receive signals from the one or more devices, and may control the operations of the one or more devices.

In some embodiments, the display element 705 may include a projector (e.g., retinal projection display) configured to output the image light 722. In some embodiments, the display element 705 may be an off-axis display element configured to provide an off-axis projection with respective to the off-axis combiner 720. For example, the image light 722 may be an off-axis light with respective to the off-axis combiner 720. In some embodiments, the display element 705 may include one or more narrowband light sources, e.g., outputting narrowband blue, green, and red image lights each having a bandwidth (full width at half maximum (FWHM)) within a range of about 5 nm to 10 nm, a range of about 10 nm to 20 nm, a range of about 20 nm to 30 nm, or a range of about 30 nm to 40 nm, etc. For example, the display element 705 may include a micro-LED display panel configured to emit blue, green, and red image lights each having a bandwidth of about 20 nm. In some embodiments, the display element 705 may include a laser scanning display panel configured to emit blue, green, and red image lights each having a bandwidth of several nanometers, e.g., 5 nm.

In some embodiments, the off-axis combiner 720 may include one or more LCPH elements disclosed herein, such as the LCPH element 200 shown in FIG. 2A, or the LCPH device 600 shown in FIG. 6A or FIG. 6C. In some embodiments, the reflection band of the off-axis combiner 720 may substantially match with the emission band of the one or more narrowband light sources included in the display element 705. In some embodiments, the off-axis combiner 720 may function as an off-axis reflective lens configured to focus the off-axis image light 722 to one or more spots at one or more exit pupils 757 within the eyebox 759 of the system 700. An exit pupil 757 may be a portion of the eyebox 759, where an eye pupil 758 of a user may be positioned to receive the image light. The size of a single exit pupil 757 may be larger than and comparable with the size of the eye pupil 758. The exit pupils 757 may be sufficiently spaced apart, such that when one of the exit pupils 757 substantially coincides with the position of the eye pupil 758, the remaining one or more exit pupils 757 may be located beyond the position of the eye pupil 758 (e.g., outside of the eye pupil 758). For example, as shown in FIG. 7, the off-axis combiner 720 may focus the off-axis image light 722 as an image light 724 propagate through one or more exit pupils 757 at the eyebox 759.

When configured for AR or MR applications, the off-axis combiner 720 may also combine the image light 722 received from the display element 705 and a light (or beam) 710 from a real-world environment (referred to as a real-world light 710), and direct both of the lights 710 and 722 toward the eyebox 759. Thus, the off-axis combiner 720 may also be referred to as an off-axis image combiner. In some embodiments, the system 700 may include a compensator 725 coupled with (e.g., stacked with) the off-axis combiner 720. The off-axis combiner 720 may be disposed between the compensator 725 and the eyebox 759. The real-world light 710 may be incident onto the compensator 725 before being incident onto the off-axis combiner 720. In some embodiments, the controller 740 may be configured to control the compensator 725 and the off-axis combiner 720 to provide opposite steering effects and lensing effects to the real-world light 710. For example, when the optical powers provided by the compensator 725 and the off-axis combiner 720 have opposite signs and a substantially same absolute value, the steering provided by the compensator 725 and the off-axis combiner 720 may have opposite directions. Thus, the compensator 725 may compensate for the distortion of the real-world light 710 caused by the off-axis combiner 720, such that images of real-world objects viewed through the system 700 may be substantially unaltered. In some embodiments, when the system 700 is configured for VR applications, the compensator 725 may be omitted.

In some embodiments, the off-axis combiner 720 may be a passive element that is not tunable by an external field. In some embodiments, the off-axis combiner 720 may be an active element that is tunable by an external field. For example, the optical power of the off-axis combiner 720 may be tunable by an applied voltage. In some embodiments, the birefringent medium layer included in the off-axis combiner 720 may include a plurality of sub-layers stacked together. The plurality of sub-layers may be configured to have high diffraction efficiencies at a plurality of wavelengths, (e.g., red, green, and blue wavelength ranges), thereby enabling a full color display. For example, the off-axis image light 722 may be a visible polychromatic light, and the respective sub-layers may be configured to focus the respective portions of the off-axis image light 722 associated with different wavelength ranges to the same exit pupil 757.

In some embodiments, the birefringent medium layer included in the off-axis combiner 720 may include a plurality of sub-layers stacked together, and different sub-layers may be configured to reflect and focus the off-axis image light 722 to propagate through different exit pupils 757. That is, different sub-layers may be configured to steer the off-axis image light 722 by different steering angles to propagate through different exit pupils 757. In some embodiments, the plurality of sub-layers may function as passive elements, each of which may be configured to simultaneously reflect and focus the off-axis image light 722 to propagate through one of the exit pupils 757 with a relatively low efficiency. The plurality of sub-layers may be configured to simultaneously reflect and focus the off-axis image light 722 to propagate through a plurality of exit pupils 757 forming the eyebox 759. For discussion purposes, each exit pupil 757 may also be referred to as a sub-eyebox, and the eyebox 759 formed by the plurality of exit pupils 757 may also be referred to as an uncompressed eyebox, which is relatively large.

In some embodiments, the plurality of sub-layers may function as active elements, each of which may be configured to operate in an active state to reflect the off-axis image light 722 to an exit pupil 757 with a relatively high efficiency, and operate in a non-active state to transmit the off-axis image light 722. In some embodiments, one or more (not all) of the sub-layers may be configured to operate in the active state to focus the off-axis image light 722 to propagate through one or more exit pupils 757 (or one or more sub-eyeboxes), forming a compressed eyebox having a size smaller than a size of the uncompressed eyebox. The remaining sub-layers may operate in the non-active state to transmit the off-axis image light 722. In some embodiments, the controller 740 may be communicatively coupled with one or more power sources (not shown) to adjust the voltages applied to the respective sub-layers included in the off-axis combiner 720.

In some embodiments, the eye tracking device 735 may include one or more light sources (e.g., infrared light sources) and one or more optical sensors. The one or more light sources may be configured to emit infrared ("IR") lights to illuminate one or both eyes of the user, and the optical sensors may be configured to receive the IR lights reflected from the eyes. In some embodiments, the optical sensors may be configured to generate image data of one or both eyes of the user based on the received IR lights. For example, the optical sensors may be imaging devices, such as cameras. In some embodiments, a processor included in the eye tracking device 735 may be configured to obtain, in real time, the eye-tracking information relating to the eye pupil 758 by analyzing the captured images of the eye pupil 758.

The eye-tracking information may include at least one of a position (or location), a moving direction, a size, or a viewing direction of the eye pupil 758. The position, moving direction, size, or viewing direction of the eye pupil 758 may be dynamically changing. Thus, the eye tracking device 735 may dynamically capture the images of the eye pupil 758 and dynamically obtain and/or provide the eye-tracking information in real time. In some embodiments, the eye tracking device 735 may measure or determine (e.g., through the processor) the position and/or movement of the eye pupil 758 up to six degrees of freedom (i.e., 3D position, roll, pitch, and yaw).

In some embodiments, the eye tracking device 735 may transmit, through a transmitter included in the eye tracking device 735, the eye-tracking information to the controller 740. In some embodiments, the eye tracking device 735 may transmit the images (i.e., image data) of the eye pupil 758 to the controller 740, and the controller 740 may analyze the images to obtain the eye-tracking information in real time. In some embodiments, the controller 740 may determine, based on one or more types of the eye-tracking information (e.g., based on the position of the eye pupil 758), the operation state of the off-axis combiner 720, such as, the operation states of the active sub-layers included in the off-axis combiner 720.

According to the eye-tracking information, the off-axis combiner 720 may provide different steering angles to the off-axis image light 722 to focus the off-axis image light 722 to propagate through different exit pupils 757. In other words, the off-axis combiner 720 may function as a pupil steering element that provides a pupil steering function. For example, during an operation, based on the eye-tracking information, the controller 740 may control one or more of the sub-layers included in the off-axis combiner 720 to operate in the active state, and the remaining sub-layers to operate in the non-active state. For illustrative purposes, FIG. 7 shows two operation states of the off-axis combiner 720. For example, at a first time instance, the eye tracking device 735 may detect that the eye pupil 758 of the user is located at a position P1 at the eyebox 759. Based on the eye-tracking information, the controller 740 may control a first sub-layer in the off-axis combiner 720 to operate in the active state while controlling the remaining sub-layers to operate in the non-active state. The first sub-layer may reflect and focus the off-axis image light 722 as an image light 724, which propagates through to an exit pupil 757 (e.g., a first sub-eye box) that substantially coincides with the position P1 of the eye pupil 758.

At a second time instance, the eye tracking device 735 may detect that the eye pupil 758 of the user has moved to a new position P2 at the eyebox 759 in the x-axis direction from the previous position P1. Based on new eye-tracking information relating to the new position P2, the controller 740 may control a second, different sub-layer in the off-axis combiner 720 to operate in the active state while controlling the remaining sub-layers to operate in the non-active state. The second sub-layer may reflect and focus the off-axis image light 722 as an image light 726 (represented by dashed lines), which propagates through an exit pupil 757 (e.g., a second sub-eye box) that substantially coincides with the position P2 of the eye pupil 758.

For discussion purposes, FIG. 7 shows that the off-axis combiner 720 provides a 1D pupil steering, e.g., steering the exit pupil 757 in the x-axis direction shown in FIG. 7. In some embodiments, although not shown, the off-axis combiner 720 may provide a 2D pupil steering, e.g., steering the exit pupil 757 in two different directions (e.g., the x-axis direction and the y-axis direction shown in FIG. 7). In some embodiments, although not shown, the off-axis combiner 720 may provide a 3D pupil steering, e.g., steering the exit pupil 757 in three different directions (e.g., the x-axis direction, the y-axis direction, and the z-axis direction shown in FIG. 7). For example, the off-axis combiner 720 may include three birefringent medium layers configured to steer the exit pupil 757 in the x-axis direction, the y-axis direction, and the z-axis direction, respectively.

Figure 8A:
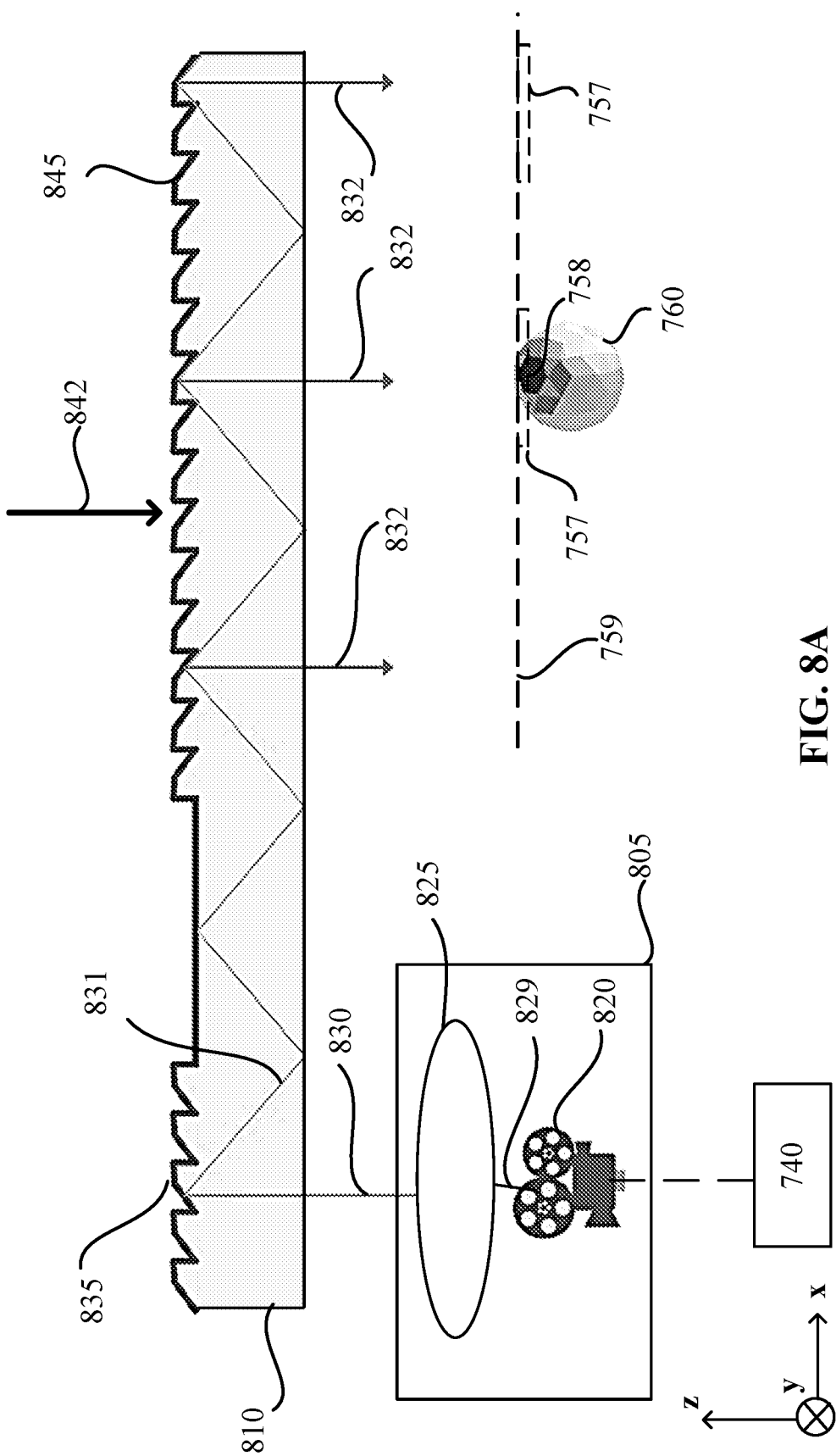

FIG. 8A schematically illustrates a diagram of a system 800, according to an embodiment of the present disclosure. The system 800 may also be referred to as a light guide display system or assembly. As shown in FIG. 8A, the system 800 may include a light source assembly 805 that includes a display element (e.g., a display panel) 820 and a collimating lens 825, a light guide 810 coupled with an in-coupling element (or input coupler) 835 and an out-coupling element (or output coupler) 845, and the controller 740. The light guide 810 coupled with the in-coupling element 835 and the out-coupling element 845 may also be referred to as a light guide image combiner.

The display panel 820 may output an image light 829 representing a virtual image (having a predetermined image size associated with a linear size of the display panel 820) toward the collimating lens 825. The image light 829 may be a divergent image light including a bundle of rays. For illustrative purposes, FIG. 8A shows a single ray of the image light 829. The collimating lens 825 may transmit the image light 829 as an image light 830 having a predetermined input field of view ("FOV") (e.g., a) toward an input side of the light guide 810. The collimating lens 825 may transform or convert a linear distribution of the pixels in the virtual image formed by the image light 829 into an angular distribution of the pixels in the image light 830 having the predetermined input FOV. Each ray in the in the image light 830 may represent an FOV direction of the input FOV. For illustrative purposes, FIG. 8A shows a single ray (e.g., central ray) of the image light 830 that is normally incident onto the in-coupling element 835, and the single ray of the image light 830 may represent a single FOV direction (e.g., 0° FOV direction) of the input FOV.

The in-coupling element 835 may couple the image light 830 into the light guide 810 as an in-coupled image light 831, which may propagate inside the light guide 810 toward the out-coupling element 845 via total internal reflection ("TIR"). The out-coupling element 845 may couple the in-coupled image light 831 out of the light guide 810 as a plurality of output image lights 832 at different locations along the longitudinal direction (e.g., x-axis direction) of the light guide 810, each of which may have an output FOV that may be substantially the same as the input FOV (e.g., as represented by an angle α). For discussion purposes, FIG. 8A shows three output image lights 832, and shows a single ray (e.g., central ray) of each output image light 832. At least one of the in-coupling element 835 or the out-coupling element 845 may include one or more LCPH elements disclosed herein, such as the LCPH element 200 shown in FIG. 2A, or the LCPH element 600 shown in FIG. 6A or FIG. 6C. In some embodiments, the LCPH element may be configured to function as a grating that couples the image light into the light guide 810 or out of the light guide 810 via diffraction. Thus, the light guide 810 coupled with the in-coupling element 835 and the out-coupling element 845 may replicate the image light 830 at the output side of the light guide 810, to expand an effective pupil of the system 800.

For discussion purposes, FIG. 8A shows a one-dimensional pupil expansion along the x-axis direction in FIG. 8A. In some embodiments, the system 800 may also provide a two-dimensional pupil expansion, e.g., along both the x-axis direction and the y-axis direction in FIG. 8A. For example, in some embodiments, although not shown, the system 800 may also include a redirecting element (or folding element) coupled to the light guide 810, and configured to redirect the in-coupled image light 831 to the out-coupling element 845. The redirecting element may be configured to expand the input image light 830 in a first direction, e.g., the y-axis direction, and the out-coupling element 845 may be configured to expand the input image light 830) in a second, different direction, e.g., the x-axis direction.

In some embodiments, the redirecting element may include one or more disclosed LCPH elements functioning as a grating that redirects the in-coupled image light 831 to the out-coupling element 845. The plurality of image lights 832 may propagate through the exit pupils 757 located in the eyebox 759 of the system 800. The light guide 810 and the out-coupling element 845 may also transmit a light 842 from a real-world environment (referred to as a real-world light 842), combining the real-world light 842 with the output image light 832 and delivering the combined light to the eye 760. Thus, the eye 760 may observe the virtual scene optically combined with the real world scene.

Figure 8B:
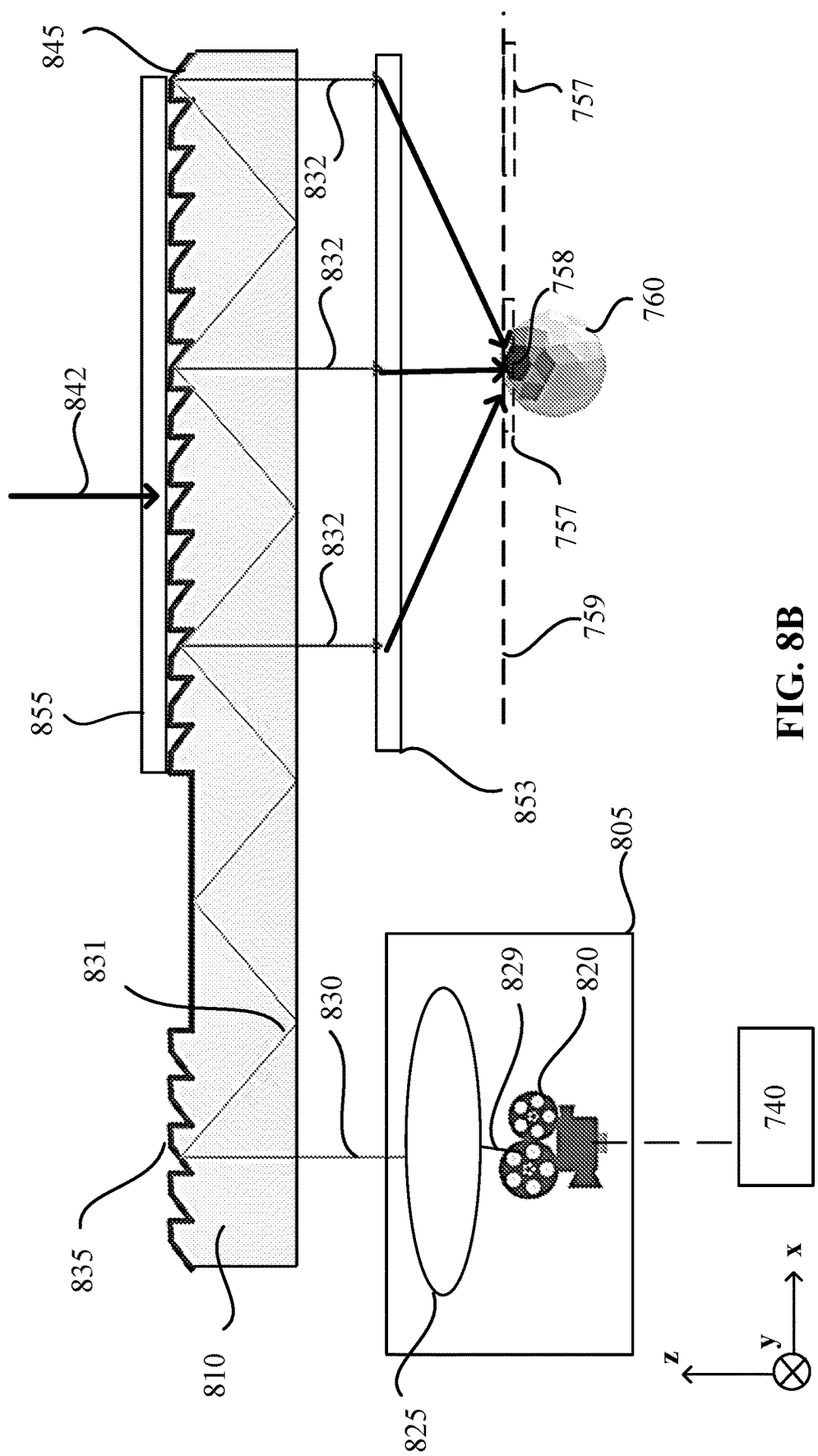

In the embodiment shown in FIG. 8A, the light guide image combiner may generate an image of the display element 820 at an image plane that has an infinite depth (or image plane distance) with respect to the eye pupil 758 positioned at the eyebox 759. In some embodiments, the light guide image combiner may generate an image of the display element 820 at an image plane that has a finite depth (or image distance) with respect to the eye pupil 758 positioned at the eyebox 759. FIG. 8B schematically illustrates a diagram of a system 850, according to an embodiment of the present disclosure. The system 850 may also be referred to as a light guide display system or assembly. The system 850 may include elements that are similar to or the same as those included in the system 800 shown in FIG. 8A. Descriptions of the same or similar elements or features can refer to the above corresponding descriptions, including those rendered in connection with FIG. 8A.

As shown in FIG. 8B, the system 850 may include the light source assembly 805, and the light guide 810 coupled with the in-coupling element 835 and the output-coupling element 845 (also referred to as the light guide image combiner). The system 800 may also include a lens or lens assembly 853 disposed between the light guide image combiner and the eyebox 759. In some embodiments, the lens assembly 853 may be configured to provide at least one of an adjustable optical power or an adjustable steering angle to the output image lights 832.

In some embodiments, based on the eye tracking information from the eye tracking system (not shown), the controller 740 may be configured to control the lens assembly 853 to steer and focus the plurality of output image lights 832 to an image plane within the eyebox 759, where one or more exit pupils 757 are located. In some embodiments, the lens assembly 853 may be configured to provide a 3D beam steering to the output image lights 832. For example, the lens assembly 853 may be configured to laterally steer (or shift) the focus of the output image lights 832 in one or two dimensions (e.g., an x-axis direction and/or a y-axis direction). In some embodiments, the lens assembly 853 may also be configured to vertically shift the image plane, at which the output image lights 832 are focused, in a third dimension (e.g., in a z-axis direction). Thus, a continuous or discrete shift of the exit pupil 757 of the system 850 may be provided in a 3D space to cover an expanded eyebox based on the eye tracking information.

In some embodiments, the vertical distance of the image plane of the display element 820 with respect to the eyebox 759 may be adjusted for addressing the vergence accommodation conflict. Accordingly, the user experience of the system 850 may be improved. For example, the display element 820 may display a virtual image. Based on the eye tracking information provided by the eye tracking system (not shown), the controller 740 may determine a virtual object within the virtual image at which the eyes 760 are currently looking. The controller 740 may determine a vergence depth ($d_v$) of the gaze of the user based on the gaze point or an estimated intersection of gaze lines determined by the eye tracking system. The gaze lines may converge or intersect at the distance $d_v$, where the virtual object is located. The controller 740 may control the lens assembly 853 to adjust the optical power to provide an accommodation that matches the vergence depth ($d_v$) associated with the virtual object at which the eyes 760 are currently looking, thereby reducing the accommodation-vergence conflict in the system 850. For example, the controller 740 may control the lens assembly 853 to operate in a desirable operation state to provide an optical power corresponding to a focal plane (or an image plane) that matches the vergence depth ($d_v$).

In some embodiments, when used for AR and/or MR applications, in addition to the lens assembly 853 (referred to as a first lens assembly 853), the system 850 may further include a second lens assembly 855. The first lens assembly 853 and the second lens assembly 855 may be disposed at two sides of the light guide 810. The controller 740 may be communicatively coupled with the second lens assembly 855. In some embodiments, when used for AR and/or MR applications, the controller 740 may be configured to control the first lens assembly 853 and the second lens assembly 855 to provide opposite steering effects and lensing effects to the real-world light 842. For example, the optical powers provided by the first lens assembly 853 and the second lens assembly 855 may have opposite signs and a substantially same absolute value, the steering provided by the first lens assembly 853 and the second lens assembly 855 may have opposite directions. Thus, the second lens assembly 855 may be configured to compensate for the distortion of the real-world light 842 caused by the first lens assembly 853, such that images of the real-world objects viewed through the system 850 may be substantially unaltered.

In some embodiments, each of the first lens assembly 853 and the second lens assembly 855 may be an active element. For example, the steering effect and lensing effect of the first lens assembly 853 or the second lens assembly 855 may be adjustable by an external field. When the birefringent medium layer included in the first lens assembly 853 or the second lens assembly 855 includes a plurality of sub-layers, the steering effect and lensing effect of each sub-layer may be adjustable by an external field. In some embodiments, each of the first lens assembly 853 and the second lens assembly 855 may be a passive element. Each of the first lens assembly 853 and the second lens assembly 855 may be coupled with a switchable halfwave plate. The switchable halfwave plate may control the polarization of a light that is to be incident onto the first lens assembly 853 or the second lens assembly 855. Thus, the steering effect and lensing effect of the first lens assembly 853 or the second lens assembly 855 may be adjustable by controlling the switchable halfwave plate. When the birefringent medium layer included in the first lens assembly 853 or the second lens assembly 855 includes a plurality of sub-layers, each sub-layer may be coupled with a switchable halfwave plate, and the steering effect and lensing effect of each sub-layer may be individually or independently adjustable by controlling the corresponding switchable halfwave plate.

Referring to FIGS. 8A and 8B, in some embodiments, the display element (e.g., display panel) 820 may include one or more narrowband light sources, e.g., one or more LEDs, a one or more SLEDs, one or more laser diodes, or a combination thereof, etc. In some embodiments, the one or more narrowband light sources may output narrowband blue, green, and red image lights each having a bandwidth (full width at half maximum (FWHM)) within a range of about 5 nm to 10 nm, a range of about 10 nm to 20 nm, a range of about 20 nm to 30 nm, or a range of about 30 nm to 40 nm, etc. For example, the display element (e.g., display panel) 820 may include a micro-LED display panel configured to emit blue, green, and red image lights each having a bandwidth of about 20 nm. In some embodiments, the display element (e.g., display panel) 820 may include a laser scanning display panel configured to emit blue, green, and red image lights each having a bandwidth of several nanometers, e.g., 5 nm. In some embodiments, the reflection band of at least one of the in-coupling element 835, the out-coupling element 845, the redirecting element first lens assembly 853, or the second lens assembly 855 may substantially match with the emission band of the one or more narrowband light sources included in the display element (e.g., display panel) 820.

Figure 9A:
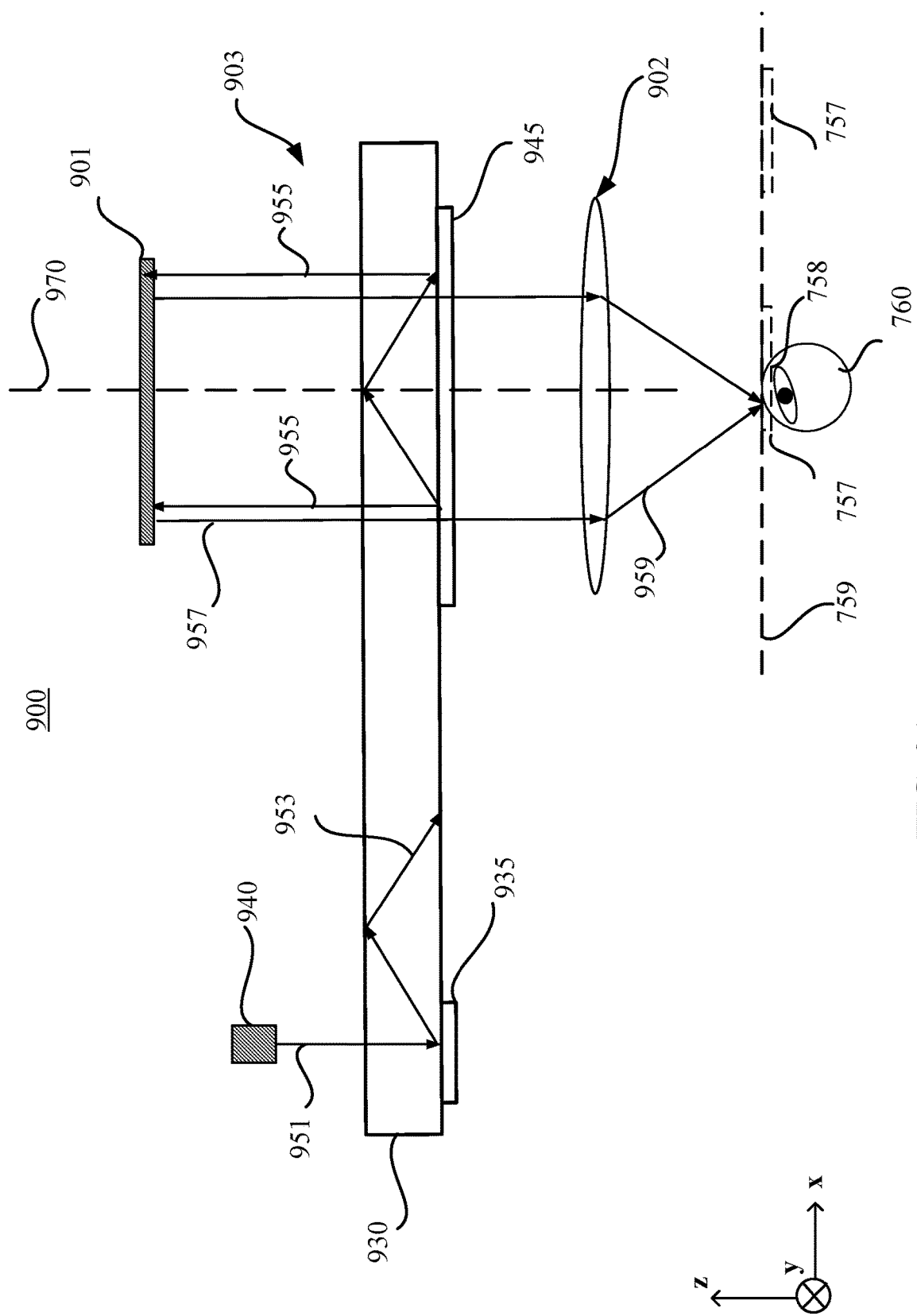

FIG. 9A schematically illustrates a diagram of a system 900, according to an embodiment of the present disclosure. As shown in FIG. 9A, the system 900 may include a light guide illumination assembly 903, a display panel 901, and a lens assembly 902. The light guide illumination assembly 903 may include a light source assembly 940, and a light guide 930 coupled with an in-coupling element 935 and an out-coupling element 945. The display panel 901 and the lens assembly 902 may be disposed at opposite sides of the light guide 930. The display panel 901 and the lens assembly 902 may be arranged in parallel, and may be aligned on a same axis 970. The axis 970 may be an optical axis of the lens assembly 902, or an axis of symmetry of the display panel 901. The light guide 930 may be arranged in parallel with the display panel 901 and the lens assembly 902, with the surface normal of the light guide 930 being parallel with the axis 970. The light source assembly 940 may output a light 951 toward the light guide 930.

The light 951 may be guided by the light guide 930 to the display panel 901 for illuminating the display panel 901. The in-coupling element 935 may couple the light 951 into the light guide 930 as an in-coupled light 953 that prorogates along the light guide 930 toward the out-coupling element 945 via total internal reflection ("TIR"). The out-coupling element 945 may couple the in-coupled light 953 out of the light guide 930 as a light 955 propagating toward the display panel 901 to illuminate the display panel 901. Thus, the light 955 may also be referred to as an illuminating light 955. In some embodiments, the in-coupling element 935 may include a direct edge illumination, an input grating, a prism, a mirror, and/or photonic integrated circuits. In some embodiments, at least one of the in-coupling element 935 or the out-coupling element 945 may include one or more LCPH elements disclosed herein, such as the LCPH element 200 shown in FIG. 2A, or the LCPH element 600 shown in FIG. 6A or FIG. 6C. In some embodiments, the one or more LCPH elements may be configured to function as a grating that couples the illumination light into the light guide 910 or out of the light guide 910 via diffraction.

The light 955 may be normally incident onto the display panel 901. The display panel 901 may modulate and convert the light 955 into an image light 957 that represents a virtual image generated by the display panel 901. The lens assembly 902 may focus the image light 957 to an exit pupil 757 in the eyebox 759. Thus, the eye 760 located at the exit pupil 757 may perceive the image light 959 that represents the virtual image displayed on the display panel 901. In some embodiments, the lens assembly 902 may be configured to provide at least one of an adjustable optical power or an adjustable steering angle to the image light 959.

Figure 9B:
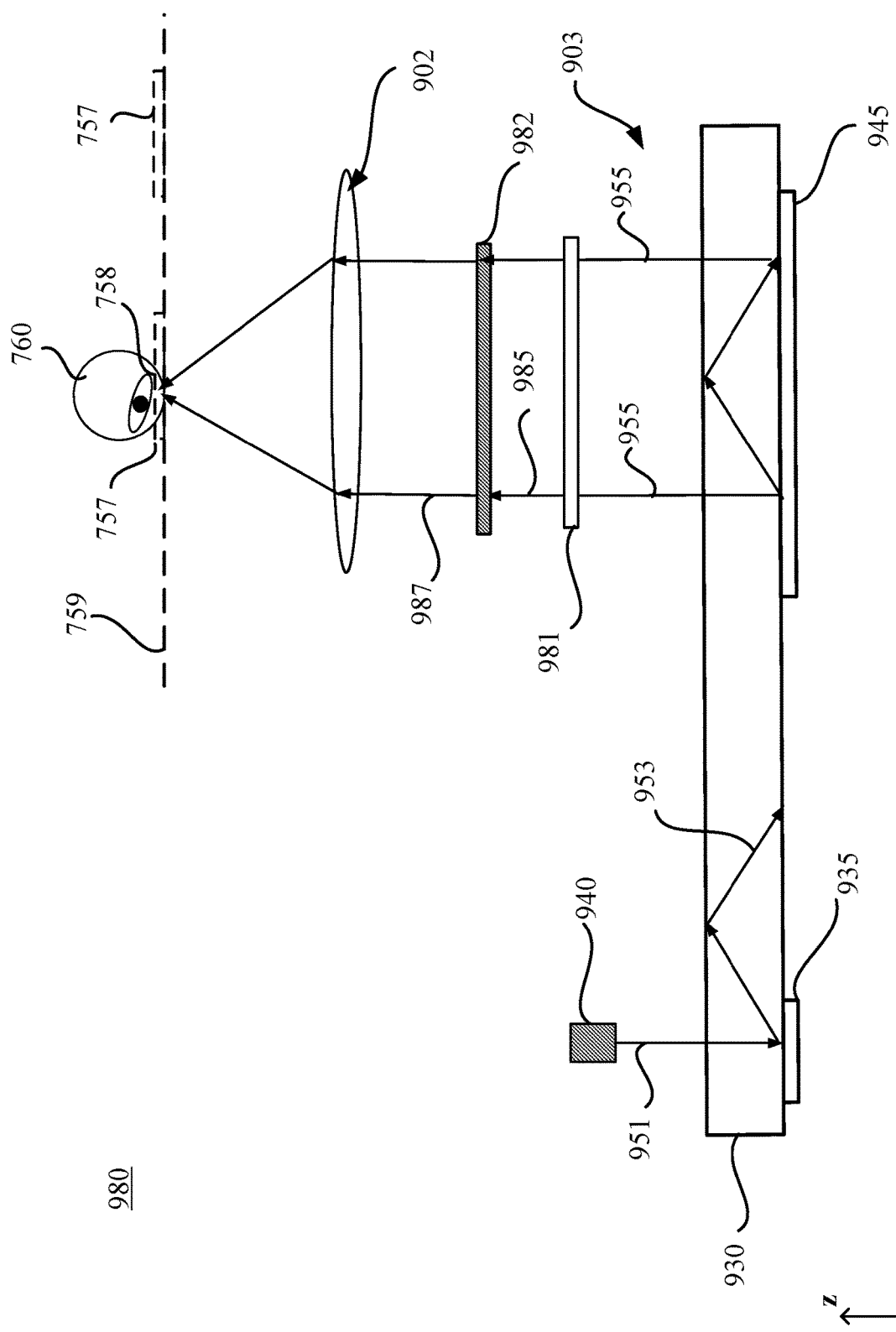

The display panel 901 may be a reflective display panel or a transmissive display panel. For illustrative purposes, FIG. 9A shows the display panel 901 as a reflective display panel (e.g., a reflective LCD panel) that modulates and reflects the light 955 into the image light 957. In a system 980 shown in FIG. 9B, a display panel 982 may be a transmissive display panel (e.g., a transmissive LCD panel) that modulates and transmits the light 955 as an image light 987 that represents a virtual image generated by the display panel 982. The display panel 982 may be disposed between the lens assembly 902 and the light guide 930, and the lens assembly 902 may focus the image light 987 to the exit pupil 757 in the eyebox 759. In some embodiments, as shown in FIG. 9B, the system 980 may also include a polarizer or quarter-wave plate 981 disposed between the display panel 982 and the light guide 930. The polarizer or quarter-wave plate 981 may be configured to convert the illuminating light 955 into an illuminating light 985 having a predetermined polarization state, e.g., a linear polarization.

Referring to FIGS. 9A and 9B, in some embodiments, the light source assembly 940 may include one or more narrowband light sources, e.g., one or more LEDs, a one or more SLEDs, one or more laser diodes, or a combination thereof, etc. In some embodiments, the one or more narrowband light sources may output narrowband blue, green, and red image lights each having a bandwidth (full width at half maximum (FWHM)) within a range of about 5 nm to 10 nm, a range of about 10 nm to 20 nm, a range of about 20 nm to 30 nm, or a range of about 30 nm to 40 nm, etc. For example, the light source assembly 940 may include one or more LEDs configured to emit blue, green, and red image lights each having a bandwidth of about 20 nm. In some embodiments, the light source assembly 940 may include one or more laser diodes configured to emit blue, green, and red image lights each having a bandwidth of several nanometers, e.g., 5 nm. In some embodiments, the reflection band of at least one of the in-coupling element 935 or the out-coupling element 945 may substantially match with the emission band of the one or more narrowband light sources included in the light source assembly 940.

Figure 10A:
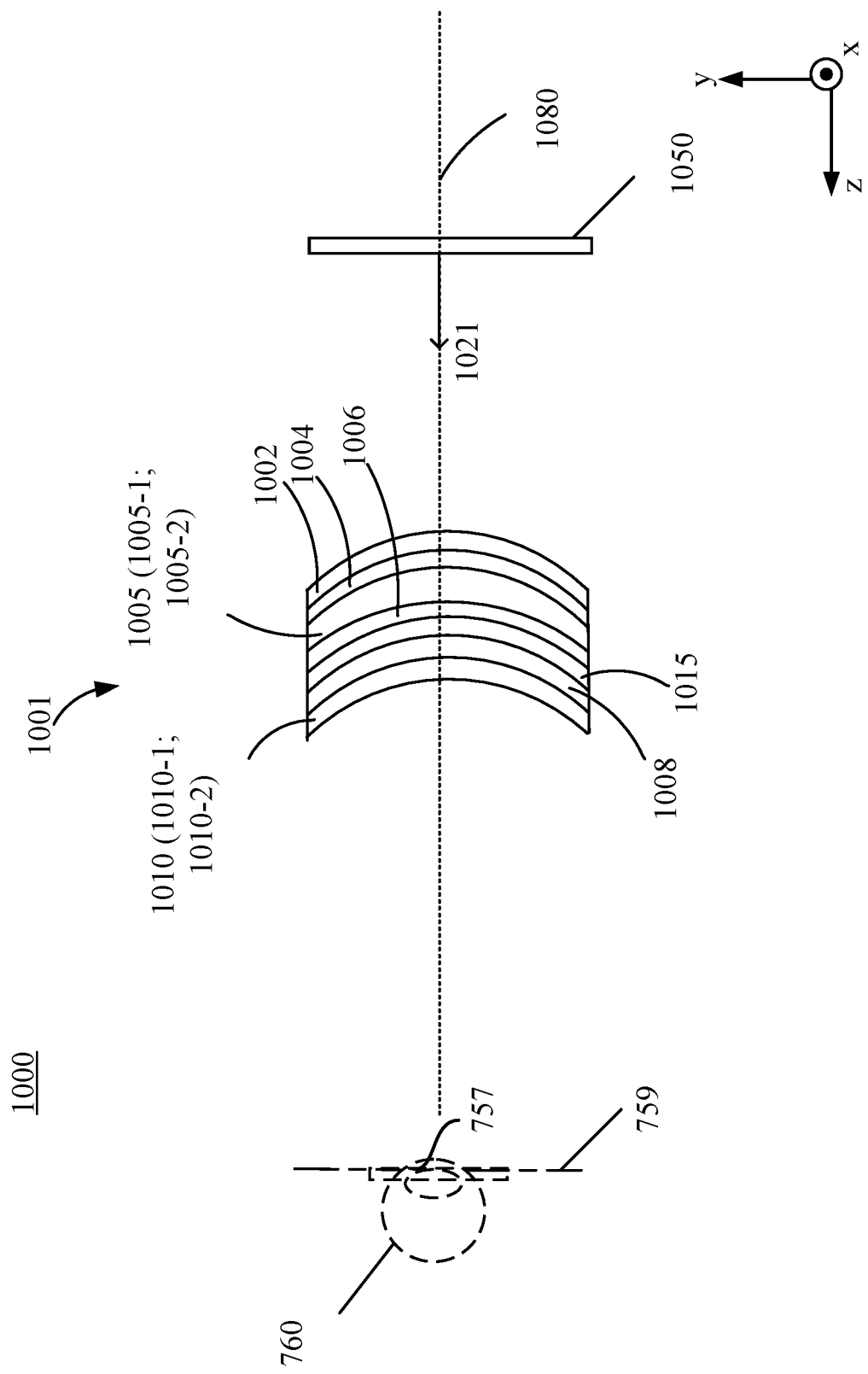
FIG. 10A schematically illustrates a system including one or more LCPH elements disclosed herein, according to an embodiment of the present disclosure.

FIG. 10A schematically illustrates a system 1000, according to an embodiment of the present disclosure. The system 1000 may include a light source assembly (e.g., a display element) 1050 configured to output an image light 1021 (e.g., a divergent image light) representing a virtual image. The system 1000 may also include a path-folding lens assembly (e.g., pancake lens assembly) 1001 configured to fold the optical path of the image light 1021, and transform the rays (forming the divergent image light 1021) emitted from each light outputting unit of the display element 1050 into a bundle of parallel rays that substantially cover one or more exit pupils 757 in the eyebox 759 of the system 1000. Due to the path folding, the lens assembly 1001 may increase a field of view ("FOV") of the system 1000 without increasing the physical distance between the display element 1050 and the eyebox region 759, and without compromising the image quality. The path-folding lens assembly 1001 may include one or more LCPH elements disclosed herein, such as the LCPH element 200 shown in FIG. 2A, or the LCPH device 600 shown in FIG. 6A or FIG. 6C.

In some embodiments, the display element 1050 may be a monochromatic display that includes a narrowband monochromatic light source (e.g., a 30-nm-bandwidth light source). In some embodiments, the display element 1050 may be a polychromatic display (e.g., a red-green-blue ("RGB") display) that includes a broadband polychromatic light source (e.g., 300-nm-bandwidth light source covering the visible wavelength range). In some embodiments, the display element 1050 may be a polychromatic display (e.g., an RGB display) including a stack of a plurality of monochromatic displays, which may include corresponding narrowband monochromatic light sources respectively.

In some embodiments, the path-folding lens assembly 1001 may include a first optical element (e.g., a first optical lens) 1005 and a second optical element (e.g., a second optical lens) 1010. In some embodiments, the path-folding lens assembly 1001 may be configured as a monolithic pancake lens assembly without any air gaps between optical elements included in the path-folding lens assembly. In some embodiments, one or more surfaces of the first optical element 1005 and the second optical element 1010 may be shaped (e.g., curved) to compensate for field curvature. In some embodiments, one or more surfaces of the first optical element 1005 and/or the second optical element 1010 may be shaped to be spherically concave (e.g., may be a portion of a sphere), spherically convex, a rotationally symmetric asphere, a freeform shape, or some other shape that can mitigate field curvature. In some embodiments, the shape of one or more surfaces of the first optical element 1005 and/or the second optical element 1010 may be designed to additionally compensate for other forms of optical aberration. The disclosed LCPH element may be formed on one or more curved surfaces of at least one of the first optical element 1005 or the second optical element 1010. In some embodiments, one or more of the optical elements within the path-folding lens assembly 1001 may have one or more coatings, such as an anti-reflective coating, to reduce ghost images and enhance contrast. In some embodiments, the first optical element 1005 and the second optical element 1010 may be coupled together by an adhesive 1015. Each of the first optical element 1005 and the second optical element 1010 may include one or more optical lenses. In some embodiments, at least one of the first optical element 1005 or the second optical element 1010 may have at least one flat surface.

The first optical element 1005 may include a first surface 1005-1 facing the display element 1050 and an opposing second surface 1005-2 facing the eye 760. The first optical element 1005 may be configured to receive an image light at the first surface 1005-1 from the display element 1050 and output an image light with an altered property at the second surface 1005-2. The path-folding lens assembly 1001 may also include a linear polarizer 1002, a waveplate 1004, and a mirror 1006 arranged in an optical series, each of which may be an individual layer, film, or coating disposed at (e.g., bonded to or formed at) the first optical element 1005. The linear polarizer 1002, the waveplate 1004, and the mirror 1006 may be disposed at (e.g., bonded to or formed at) the first surface 1005-1 or the second surface 1005-2 of the first optical element 1005. For illustrative purposes, FIG. 10A shows that the linear polarizer 1002 and the waveplate 1004 are disposed at (e.g., bonded to or formed at) the first surface 1005-1 facing the display element 1050, and the mirror 1006 is disposed at (e.g., bonded to or formed at) the second surface 1005-2 facing the second optical element 1010. Other arrangements are also contemplated.

In some embodiments, the waveplate 1004 may be a quarter-wave plate ("QWP"). A polarization axis of the waveplate 1004 may be oriented relative to the polarization direction of a linearly polarized light to convert the linearly polarized light into a circularly polarized light or vice versa for a visible spectrum and/or an IR spectrum. In some embodiments, for an achromatic design, the waveplate 1004 may include a multilayer birefringent material (e.g., a polymer, liquid crystals, or a combination thereof) to produce quarter-wave birefringence across a wide spectral range. For example, an angle between the polarization axis (e.g., the fast axis) of the waveplate 1004 and the transmission axis of the linear polarizer 1002 may be configured to be in a range of about 35-50 degrees. In some embodiments, for a monochrome design, an angle between the polarization axis (e.g., the fast axis) of the waveplate 1004 and the transmission axis of the linear polarizer 1002 may be configured to be about 45 degrees. In some embodiments, the mirror 1006 may be a polarization non-selective partial reflector that is partially reflective to reflect a portion of a received light. In some embodiments, the mirror 1006 may be configured to transmit about 50% and reflect about 50% of a received light, and may be referred to as a "50/50 mirror." In some embodiments, the handedness of the reflected light may be reversed, and the handedness of the transmitted light may remain unchanged.

The second optical element 1010 may have a first surface 1010-1 facing the first optical element 1005 and an opposing second surface 1010-2 facing the eye 760. The path-folding lens assembly 1001 may also include a reflective polarizer 1008, which may be an individual layer, film, or coating disposed at (e.g., bonded to or formed at) the second optical element 1010. The reflective polarizer 1008 may be configured to primarily reflect a circularly polarized light having a first handedness and primarily transmit a circularly polarized light having a second handedness that is orthogonal to the first handedness.

In the embodiment shown in FIG. 10A, the reflective polarizer 1008 may include one or more LCPH elements disclosed herein. Thus, the light leakage of the reflective polarizer 1008 for an input light having a large incident angle (e.g., greater than or equal to 60°) may be reduced. Accordingly, the ghost image caused by the light leakage may be suppressed. In some embodiments, the reflective polarizer 1008 may function as a passive reflective polarizer with zero optical power. In some embodiments, the reflective polarizer may function as an active reflective polarizer with an adjustable optical power, for addressing the vergence accommodation conflict in the system 1001.

The reflective polarizer 1008 may be disposed at (e.g., bonded to or formed at) the first surface 1010-1 or the second surface 1010-2 of the second optical element 1010 and may receive a light output from the mirror 1006. For illustrative purposes, FIG. 10A shows that the reflective polarizer 1008 is disposed at (e.g., bonded to or formed at) the first surface 1010-1 of the second optical element 1010. That is, the reflective polarizer 1008 may be disposed between the first optical element 1005 and the second optical element 1010. For example, the reflective polarizer 1008 may be disposed between the second surface 1010-2 of the second optical element 1010 and the adhesive layer 1015. In some embodiments, the reflective polarizer 1008 may be disposed at the second surface 1010-2 of the second optical element 1010.

Referring to FIG. 10A, in some embodiments, the image light 1021 emitted from the display element 1050 may be an unpolarized light. The linear polarizer 1002 and the waveplate 1004 may be replaced by a circular polarizer, which may be configured to convert the unpolarized light into a circularly polarized light, and direct the circularly polarized light toward the mirror 1006. In some embodiments, the image light 1021 emitted from the display element 1050 may be a linearly polarized light, and the linear polarizer 1002 may be omitted. A polarization axis of the waveplate 1004 may be oriented relative to the polarization direction of the linearly polarized light to convert the linearly polarized light into a circularly polarized light or vice versa for a visible spectrum and/or an IR spectrum. In some embodiments, the image light 1021 emitted from the display element 1050 may be a circularly polarized light, and the linear polarizer 1002 and the waveplate 1004 may be omitted.

In some embodiments, one or more of the first surface 1005-1 and the second surface 1005-2 of the first optical element 1005 and the first surface 1010-1 and the second surface 1010-2 of the second optical element 1010 may be curved surface(s) or flat surface(s). In some embodiments, the path-folding lens assembly 1001 may have one of the optical elements 1005 and 1010, or may include more than two optical elements that may be similar to the optical element 1005 or 1010. In some embodiments, the path-folding lens assembly 1001 may further include other optical elements in addition to the first and second optical elements 1005 and 1010, such as one or more linear polarizers, one or more waveplate, one or more circular polarizers, etc.

Figure 10B:
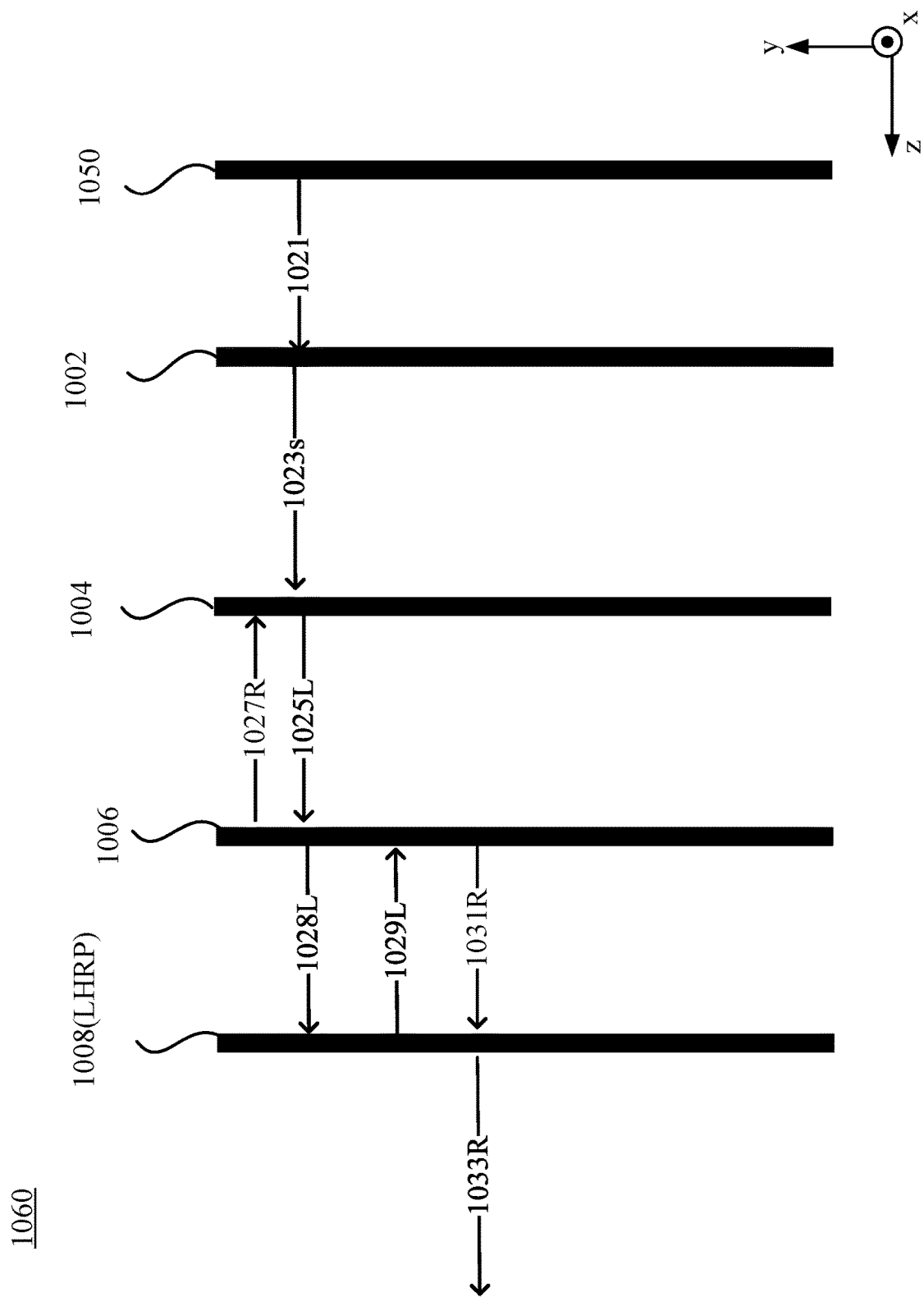
FIG. 10B schematically illustrates an optical path of an image light from a display element to an eyebox of the system shown in FIG. 10A, according to an embodiment of the present disclosure.

FIG. 10B illustrates a schematic cross-sectional view of an optical path 1060 of a light propagating in the path-folding lens assembly 1001 shown in FIG. 10A, according to an embodiment of the present disclosure. In the light propagation path 1060, the change of polarization of the light is shown. Thus, the first optical element 1005 and the second optical element 1010, which are presumed to be lenses that do not affect the polarization of the light, are omitted for the simplicity of illustration. In FIG. 10B, the letter "R" appended to a reference number (e.g., "1027R") denotes a right-handed circularly polarized light, and the letter "L" appended to a reference number (e.g., "1025L") denotes a left-handed circularly polarized light, the letter "s" appended to a reference number (e.g., "1023s") denotes an s-polarized light.

For discussion purposes, as shown in FIG. 10B, the linear polarizer 1002 may be configured to transmit an s-polarized light and block a p-polarized light, and the reflective polarizer 1008 may be a left-handed reflective polarizer configured to reflect a left-handed circularly polarized light and transmit a right-handed circularly polarized light. For illustrative purposes, the display element 1050, the linear polarizer 1002, the waveplate 1004, the mirror 1006, and the reflective polarizer 1008 are illustrated as having flat surfaces in FIG. 10B. In some embodiments, one or more of the display element 1050, the linear polarizer 1002, the waveplate 1004, the mirror 1006, and the reflective polarizer 1008 may include a curved surface.

As shown in FIG. 10B, the display element 1050 may generate the unpolarized image light 1021 covering a predetermined spectrum, such as a portion of the visible spectral range or substantially the entire visible spectral range. The unpolarized image light 1021 may be transmitted by the linear polarizer 1002 as an s-polarized image light 1023s, which may be transmitted by the waveplate 1004 as a left-handed circularly polarized image light 1025. A first portion of the left-handed circularly polarized image light 1025 may be reflected by the mirror 1006 as a right-handed circularly polarized image light 1027 toward the waveplate 1004, and a second portion of the left-handed circularly polarized image light 1025 may be transmitted as a left-handed circularly polarized image light 1028 toward the reflective polarizer 1008. The left-handed circularly polarized image light 1028 may be reflected by the reflective polarizer 1008 as a left-handed circularly polarized image light 1029 toward the mirror 1006. The left-handed circularly polarized image light 1029 may be reflected by the mirror 1006 as a right-handed circularly polarized image light 1031, which may be transmitted through the reflective polarizer 1008 as a right-handed circularly polarized image light 1033 toward the eyebox 759.

Figure 11:
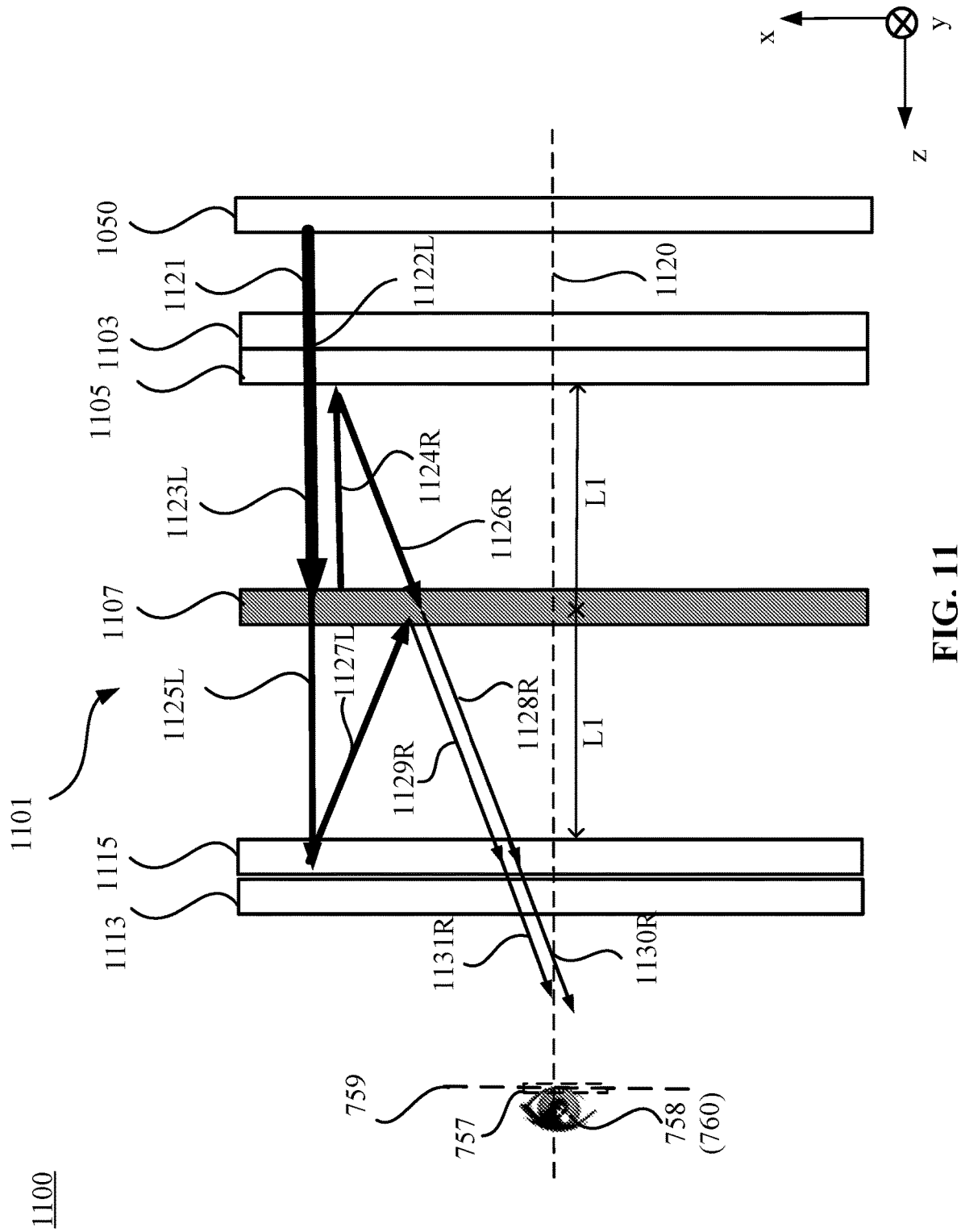
FIG. 11 schematically illustrates a system including one or more LCPH elements disclosed herein, according to an embodiment of the present disclosure.

FIG. 11 schematically illustrates an x-z sectional view of a system 1100, according to an embodiment of the present disclosure. The system 1100 may include the display element 1050 (which is an example of a light source) configured to output an image light 1121 representing a virtual image, and a path-folding lens assembly 1101 (also referred to as a lens assembly 1101) configured to fold the path of the image light 1121 from the display element 1050 to the eyebox 759. The lens assembly 1101 may be disposed between the display element 1050 and the eyebox 759. The lens assembly 1101 may transform the rays (forming a divergent image light) emitted from each light outputting unit of the display element 1050 into a bundle of parallel rays that substantially cover one or more exit pupils 757 in the eyebox 759 of the system 1100. For illustrative purposes, FIG. 11 shows a single ray of the image light 1121 emitted from a light outputting unit (e.g., a pixel) at the upper half of the display element 1050. The exit pupil 757 may correspond to a spatial zone where the eye pupil 758 of the eye 760 may be positioned in the eyebox 759 of the system 1100 to perceive the virtual image.

The lens assembly 1101 may include a first circular polarizer 1103, a first polarization selective reflector 1105 (e.g., a first reflective PVH element configured with a first optical power (i.e., functioning as a first PVH lens)), a polarization non-selective partial reflector 1107 (also referred to as a partial reflector 1107), a second polarization selective reflector 1115 (e.g., a second reflective PVH element configured with a second optical power (i.e., functioning as a second PVH lens)), and a second circular polarizer 1113 arranged in an optical series. For discussion purposes, the first polarization selective reflector 1105 and the second polarization selective reflector 1115 are referred to as a first PVH element 1105 and a second PVH element 1115, respectively.

In the embodiment shown in FIG. 11, at least one of the first PVH element 1105 or the second PVH element 1115 may include one or more disclosed LCPH elements, e.g., one or more disclosed passive or active LCPH elements. In some embodiments, the birefringent medium layer included in at least one of the first PVH element 1105 or the second PVH element 1115 may include a plurality of sub-layers.

The partial reflector 1107 may be configured to partially transmit an input light while maintaining the polarization and propagation direction, and partially reflect the input light while changing the polarization, independent of the polarization of the input light. That is, regardless of the polarization of the input light, the partial reflector 1107 may partially transmit the input light and partially reflect the input light. For discussion purposes, the partial reflector 1107 is also referred to as a mirror. In some embodiments, the mirror 1107 may be configured to transmit about 50% of an input light and reflect about 50% of the input light (referred to as a 50/50 mirror).

FIG. 11 illustrates an optical path or a propagation path of the image light 1121 propagating from the display element 1050 to the eyebox 759 through the lens assembly 1101. In below figures, the letter "R" appended to a reference number (e.g., "1124R") denotes a right-handed circularly polarized light, and the letter "L" appended to a reference number (e.g., "1123L") denotes a left-handed circularly polarized light, the letter "s" appended to a reference number denotes an s-polarized light, and the letter "p" appended to a reference number denotes a p-polarized light.

In the embodiment shown in FIG. 11, the first PVH element 1105 and the second PVH element 1115 may have the same optical power and different polarization selectivities (e.g., may reflect lights of orthogonal polarizations). For example, the first PVH element 1105 may function as a right-handed PVH lens that reflects and converges, via diffraction, a right-handed circularly polarized light, and transmits a left-handed circularly polarized light with negligible or zero diffraction. The second PVH element 1115 may function as a left-handed PVH lens that reflects and converges, via diffraction, a left-handed circularly polarized light, and transmits a right-handed circularly polarized light with negligible or zero diffraction. A distance (e.g., L1) between the first PVH element 1105 and the mirror 1107 may be equal to a distance (e.g., L1) between the second PVH element 1115 and the mirror 1107. In some embodiments, the first PVH element 1105 and the second PVH element 1115 may have different optical powers, and the distance between the first PVH element 1105 and the mirror 1107 may be different from the distance the second PVH element 1115 and the mirror 1107.

As shown in FIG. 11, the first circular polarizer 1103 may convert the image light 1121 into an image light 1122L. The first PVH element 1105 may substantially transmit the image light 1122L as an image light 1123L toward the mirror 1107. The mirror 1107 may transmit a first portion of the image light 1123L as an image light 1125L toward the second PVH element 1115, and reflect a second portion of the image light 1123L back to the first PVH element 1105 as an image light 1124R. The second PVH element 1115 may substantially reflect and converge, via diffraction, the image light 1125L as an image light 1127L toward the mirror 1107. The mirror 1107 may transmit a first portion of the image light 1127L toward the first PVH element 1105 as a left-handed circularly polarized image light (not shown), and reflect a second portion of the image light 1127L back to the second PVH element 1115 as an image light 1129R. The second PVH element 1115 may substantially transmit the image light 1129R while maintaining the polarization and propagation direction. The second circular polarizer 1113 may transmit the image light 1129R as an image light 1131R toward the eyebox 759.

When the image light 1123L is normally incident onto the mirror 1107, the image light 1124R may propagate in a direction opposite to the propagation direction of the image light 1123L. That is, the image light 1124R and the image light 1123L may substantially coincide with one another and have opposite propagation directions. To better illustrate the optical paths of the image light 1124R and the image light 1123L, FIG. 11 shows a small gap between the image light 1124R and the image light 1123L. The first PVH element 1105 may reflect and converge, via diffraction, the image light 1124R as an image light 1126R toward the mirror 1107. The mirror 1107 may transmit a first portion of the image light 1126R toward the second PVH element 1105 as an image light 1128R, and reflect a second portion of the image light 1126R back to the first PVH element 1105 as a left-handed circularly polarized image light (not shown). The second PVH element 1115 may substantially transmit the image light 1128R, while maintaining the propagation direction and the polarization. The second circular polarizer 1113 may transmit the image light 1128R as an image light 1130R toward the eyebox 759.

In the embodiment shown in FIG. 11, both of the first PVH element 1105 and the second PVH element 1115 may be passive elements, or both of the first PVH element 1105 and the second PVH element 1115 may be active elements configured to operate in the active state. As the first PVH element 1105 and the second PVH element 1115 have the same optical power, and the same axial distance (e.g., L1) to the mirror 1107 along an optical axis 1120 of the system 1100, the image light 1130R and the image light 1131R may substantially coincide or overlap with one another, forming a single image with a high image quality within the eyebox 759. When the distance between the between the first PVH element 1105 and the mirror 1107 is different from the distance between the second PVH element 1115 and the mirror 1107, the optical powers of the first PVH element 1105 and the second PVH element 1115 may be configured to be different, and additional optical elements may be included such that the image light 1130R and the image light 1131R may still substantially coincide or overlap with one another.

Figure 13A:
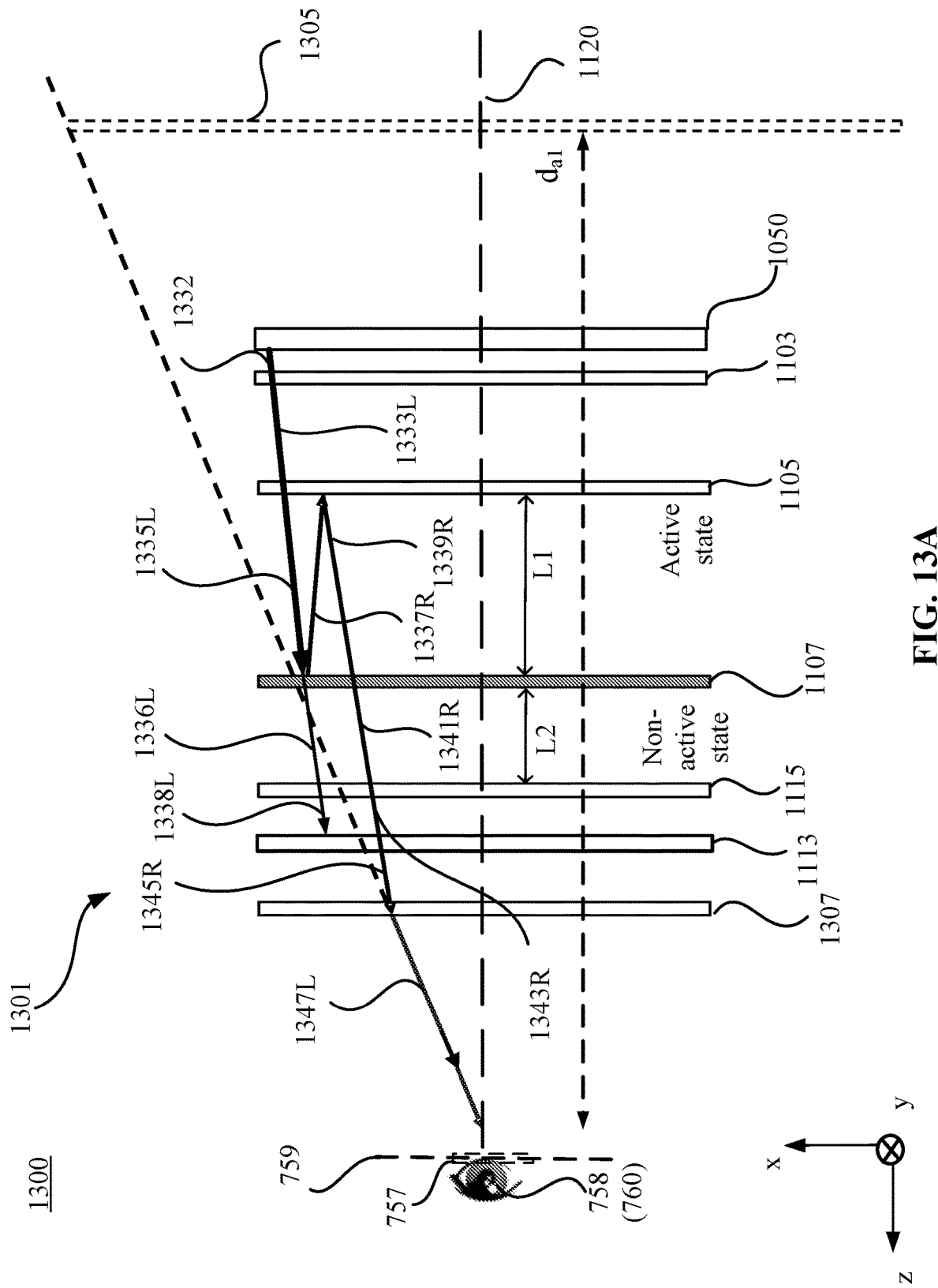
FIG. 13A schematically illustrates a system including one or more LCPH elements disclosed herein, according to an embodiment of the present disclosure.

FIG. 13A illustrates an x-z sectional view of a system 1300, according to an embodiment of the present disclosure. The system 1300 may include elements that are similar to or the same as those included in the system 1100 shown in FIG. 11. Descriptions of the same or similar elements or features can refer to the above corresponding descriptions, including those rendered in connection with FIG. 11. As shown in FIG. 13A, the system 1300 may include the display element 1050, and a path-folding lens assembly 1301 (also referred to as lens assembly 1301) configured to fold the path of an image light emitted from the display element 1050 to the eyebox 759. The lens assembly 1301 may include the first circular polarizer 1103, the first PVH lens 1105 (also referred to as a first lens 1105), the mirror 1107, the second PVH lens 1115 (also referred to as a second lens 1115), and the second circular polarizer 1113 arranged in an optical series.

The system 1300 may also include a transmissive lens 1307 (also referred to as a third lens 1307) disposed between the eyebox 759 and the second circular polarizer 1113. The transmissive lens 1307 may include a conventional solid lens including at least one curved surface (e.g., a glass lens, a polymer lens, or a resin lens, etc.), a liquid lens, a Fresnel lens, a meta lens, a transmissive PVH lens, etc. The transmissive lens 1307 may be configured with a fixed optical power or a tunable optical power. For discussion purposes, FIG. 13A shows that the transmissive lens 1307 includes flat surfaces. In some embodiments, the transmissive lens 1307 may include at least one curved surface.

In the embodiment shown in FIG. 13A, each of the first PVH lens 1105 and the second PVH lens 1115 may be an active element that is switchable between operating in an active state and operating in a non-active state. When operating in the active state, the first PVH lens 1105 or the second PVH lens 1115 may selectively reflect or transmit an input light depending on a polarization of the input light. When operating in the non-active state, the first PVH lens 1105 or the second PVH lens 1115 may transmit an input light independent of the polarization of the input light. Thus, the first PVH lens 1105 or the second PVH lens 1115 operating in the active state may have a polarization selective optical power (e.g., zero or non-zero optical power depending on the polarization of the input light), and the first PVH lens 1105 or the second PVH lens 1115 operating in the non-active state may have a zero optical power independent of the polarization of the input light. For example, the first PVH lens 1105 or the second PVH lens 1115 may operate in the active state when an applied voltage is less than or equal to a first threshold value (e.g., a voltage that is insufficient to reorientate the LC molecules), and may operate in the non-active state when the applied voltage is equal to or greater than a second threshold value (e.g., a voltage that is sufficiently high to reorientate the LC molecules to be substantially parallel with an electric field direction).

In some embodiments, the controller 740 (not shown) may be communicatively coupled with the first PVH lens 1105 and the second PVH lens 1115 to control the operation state thereof. For example, the first PVH lens 1105 or the second PVH lens 1115 may be electrically coupled with a power source (not shown). The controller 740 may control the output of the power source to control the electric field in the first PVH lens 1105 or the second PVH lens 1115, thereby controlling the operation state of the first PVH lens 1105 or the second PVH lens 1115.

The optical power of the first PVH lens 1105 or the second PVH lens 1115 may be fixed or adjustable. The first PVH lens 1105 and the second PVH lens 1115 may be configured to have at least one of different optical powers or different axial distances (e.g., L1 and L2) to the mirror 1107 along the optical axis 1120. For example, in some embodiments, the first PVH lens 1105 and the second PVH lens 1115 may be configured to have the same optical power, and different axial distances to the mirror 1107. In some embodiments, the first PVH lens 1105 and the second PVH lens 1115 may be configured to have different optical powers, and the same axial distance to the mirror 1107. In some embodiments, the first PVH lens 1105 and the second PVH lens 1115 may be configured to have different optical powers, and different axial distances to the mirror 1107. For discussion purposes, FIG. 13A shows that the axial distance L1 is greater than the axial distance L2. In some embodiments, the axial distance L1 may be equal to or smaller than the axial distance L2.

FIG. 13A also illustrates an optical path of an image light 1332 from the display element 1050 to the eyebox 759, according to an embodiment of the present disclosure. In FIG. 13A, the controller 740 (not shown) may control the first PVH lens 1105 to operate in the active state, and control the second PVH lens 1115 to operate in the non-active state.

Figure 13B:
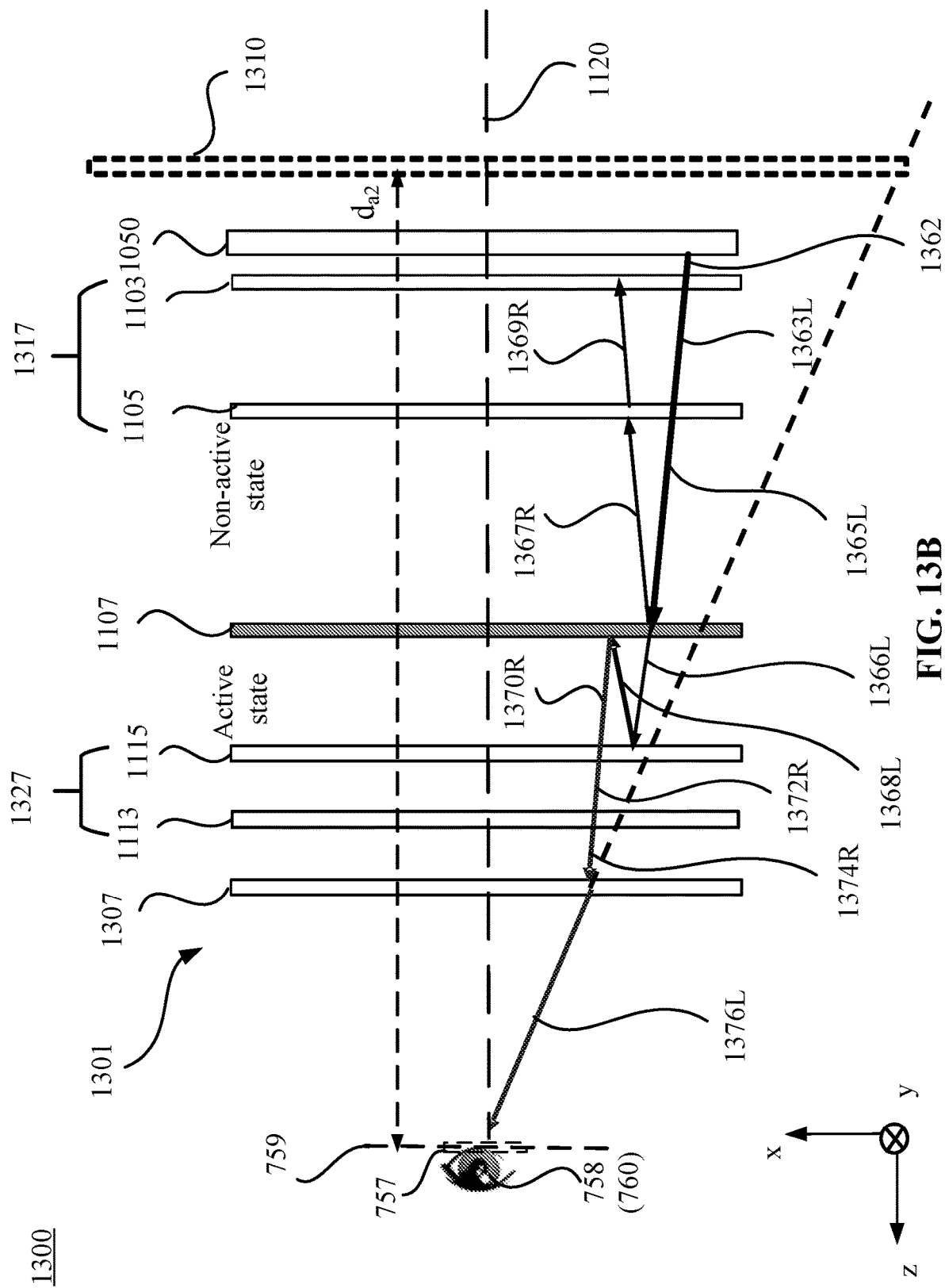
FIG. 13B schematically illustrates a cross-sectional view of an optical path in the system shown in FIG. 13A, according to an embodiment of the present disclosure.

FIG. 13B illustrates an optical path of an image light 1362 from the display element 1050 to the eyebox 759, according to an embodiment of the present disclosure. In FIG. 13B, the controller 740 (not shown) may control the first PVH lens 1105 to operate in the non-active state, and control the second PVH lens 1115 to operate in the active state.

For discussion purposes, in FIGS. 13A and 13B, the first PVH lens 1105 operating in the active state may reflect and converge a right-handed circularly polarized light, and may transmit a left-handed circularly polarized light while maintaining the propagation direction of the left-handed circularly polarized light. The second PVH lens 1115 operating in the active state may reflect and converge a left-handed circularly polarized light, and may transmit a right-handed circularly polarized light while maintaining the propagation direction of the right-handed circularly polarized light. For discussion purposes, the transmissive lens 1307 may be a right-handed PBP lens configured to converge a right-handed circularly polarized light and diverge a left-handed circularly polarized light, the first circular polarizer 1103 may transmit a left-handed circularly polarized light and block a right-handed circularly polarized light, and the second circular polarizer 1113 may transmit a right-handed circularly polarized light and block a left-handed circularly polarized light.

Referring back to FIG. 13A, the display element 1050 may output a first image light 1332 (e.g., representing a first virtual object). The first circular polarizer 1103 may convert the image light 1332 into an image light 1333L toward the first PVH lens 1105. The first PVH lens 1105 operating in the active state may substantially transmit the image light 1333L as an image light 1335L toward the mirror 1107. The mirror 1107 may transmit a first portion of the image light 1335L as an image light 1336L toward the second PVH lens 1115, and reflect a second portion of the image light 1335L back to the first PVH lens 1105 as an image light 1337R. The second PVH lens 1115 may transmit the image light 1336L as an image light 1338L toward the second circular polarizer 1113. The second circular polarizer 1113 may block the image light 1338L from being incident onto the transmissive lens 1307, such that a ghost image may be suppressed.

The first PVH lens 1105 may reflect and converge, via diffraction, the image light 1337R as an image light 1339R toward the mirror 1107. The mirror 1107 may transmit a first portion of the image light 1339R toward the second PVH lens 1115 as an image light 1341R, and reflect a second portion of the image light 1339R back to the first PVH lens 1105 as a left-handed circularly polarized image light (not shown). The second PVH lens 1115 may substantially transmit the image light 1341R as an image light 1343R toward the second circular polarizer 1113. The second circular polarizer 1113 may transmit the image light 1343R as an image light 1345R toward the transmissive lens 1307. The transmissive lens 1307 may focus the image light 1345R into an image light 1347L. The light intensity of the image light 1347L may be about 25% of the light intensity of the image light 1332L output from the display element 1050. The optical path of an image light from being the image light 1332L to being the image light 1347L may be referred to as a first optical path.

The lens assembly 1301 may image the display element 1050 to a first image plane 1305 having a first axial distance of $d_{a1}$ to the eyebox 759, along the optical axis 1120 of the lens assembly 1301. Thus, the first virtual object displayed by the display element 1050 (e.g., displayed on the display panel) may be imaged, by the lens assembly 1301, to the first image plane 1305 that is apart from the eyebox 759 by the first axial distance of $d_{a1}$. In other words, the lens assembly 1301 may form an image of the first virtual object at the first image plane 1305. Accordingly, for the eye 760 placed at the exit pupil 757 within the eyebox 759, the accommodation distance of the first virtual object may be substantially equal to the first axial distance $d_{a1}$.

As shown in FIG. 13B, the display element 1050 may output a second image light 1362 (e.g., representing a second virtual object). The first circular polarizer 1103 may convert the image light 1362 into an image light 1363L propagating toward the first PVH lens 1105. The first PVH lens 1105 may substantially transmit the image light 1363L as an image light 1365L toward the mirror 1107. The mirror 1107 may transmit a first portion of the image light 1365L as an image light 1366L toward the second PVH lens 1115, and reflect a second portion of the image light 1365L back to the first PVH lens 1105 as an image light 1367R. The first PVH lens 1105 may transmit the image light 1367R as an image light 1369R toward the first circular polarizer 1103. The first circular polarizer 1103 may block the image light 1369R from being incident onto the display element 1050.

The second PVH lens 1115 may reflect and converge, via diffraction, the image light 1366L as an image light 1368L toward the mirror 1107. The mirror 1107 may transmit a first portion of the image light 1368L toward the first PVH lens 1105 as a left-handed circularly polarized image light (not shown), and reflect a second portion of the image light 1368L back to the second PVH lens 1115 as an image light 1370R. The second PVH lens 1115 may substantially transmit the image light 1370R as an image light 1372R toward the second circular polarizer 1113. The second circular polarizer 1113 may transmit the image light 1372R as an image light 1374R toward the transmissive lens 1307. The transmissive lens 1307 may focus the image light 1374R into an image light 1376L. The light intensity of the image light 1376L may be about 25% of the light intensity of the image light 1362L output from the display element 1050. The optical path of an image light from being the image light 1363L to being the image light 1376L may be referred to as a second optical path.

The lens assembly 1301 may image the display element 1050 to a second image plane 1310 having a second axial distance of $d_{a2}$ to the eyebox 759, along the optical axis 1120 of the lens assembly 1301. Thus, the second virtual object displayed by the display element 1050 (e.g., displayed on the display panel) may be imaged by the lens assembly 1301 to be at the second image plane 1310 that is spaced apart from the eyebox 759 by the second axial distance of $d_{a2}$. In other words, the lens assembly 1301 may form an image of the second virtual object at the second image plane 1310. Accordingly, for the eye 760 placed at the exit pupil 757 within the eyebox 759, the accommodation distance of the second virtual object may be substantially equal to the second axial distance $d_{a2}$.

Referring to FIGS. 13A and 13B, in some embodiments, when the axial distances L1 and L2 are fixed, the first axial distance $d_{a1}$ of the first image plane 1305 may be determined by the respective optical powers of the first PVH lens 1105 and the transmissive lens 1307, and the second axial distance $d_{a2}$ of the second image plane 1310 may be determined by the respective optical powers of the second PVH lens 1115 and the transmissive lens 1307. Thus, through configuring the respective optical powers of the transmissive lens 1307, the first PVH lens 1105, and the second PVH lens 1115, the second axial distance $d_{a2}$ may be configured to be different from the first axial distance $d_{a1}$. For discussion purposes, FIGS. 13A and 13B show that the first axial distance $d_{a1}$ is greater than the second axial distance $d_{a2}$, and the first virtual object and the second virtual object displayed by the display element 1050 may be a distant virtual object and a close virtual object, respectively.

Thus, when each of the transmissive lens 1307, the first PVH lens 1105, and the second PVH lens 1115 is presumed to have a fixed optical power, the lens assembly 1301 may image the display element 1050 to two different image planes having different axial distances to the eyebox 759. In other words, the lens assembly 1301 may form respective images of the first virtual object and the second virtual object displayed by the display element 1050 (e.g., displayed on the display panel) at two different image planes that are spaced apart from the eyebox 759 by different axial distances. Accordingly, for the eye 760 placed at the exit pupil 757 within the eyebox 759, the accommodation distance of the first virtual object and the second virtual object may be different from one another.

When the display element 1050 displays the first virtual object and the second virtual object associated with different vergence distances (from the eye 760 placed at the exit pupil 757 within the eyebox 759), the respective optical powers of the transmissive lens 1307, the first PVH lens 1105, and the second PVH lens 1115 may be configured, and the axial distances L1, and L2 for the lens assembly 1301 may be configured, such that the first axial distance $d_{a1}$ may be substantially equal to the vergence distance of the first virtual object, and the second axial distance $d_{a2}$ may be substantially equal to the vergence distance of the second virtual object.

Thus, the vergence-accommodation conflict in the system 1300 may be reduced, and the user experience may be enhanced. In some embodiments, when at least one of the transmissive lens 1307, the first PVH lens 1105, or the second PVH lens 1115 has an adjustable optical power, the lens assembly 1301 may image the virtual content displayed by the display element 1050 to more than two different image planes having different axial distances to the eyebox 759. The accommodation capability of the lens assembly 1301 may be further improved.

In some embodiments, during a display frame of the display element 1050, a distant virtual object and a close virtual object may be displayed by the display element 1050, during different sub-frames of the display frame. The display element 1050 may render the close virtual object to appear closer to the eyes 760 than the distant virtual object. Referring to FIGS. 13A and 13B, the distant virtual object may be the first virtual object represented by the image light 1332 shown in FIG. 13A, and the close virtual object may be the second virtual object represented by the image light 1362 shown in FIG. 13B.

The display element 1050 may be configured to display virtual objects associated with different vergence distances in a time sequential manner during the operation of the system 200. For example, the display element 1050 may be configured to switch between displaying the distant virtual object and displaying the close virtual object at a predetermined frequency or predetermined frame rate. In some embodiments, the display frame of the display element 1050 may include a first sub-frame and a second sub-frame. The controller 740 may be configured to control the display element 1050 to display the distant virtual object and the close virtual object during the respective sub-frames of the display frame of the display element 1050. In some embodiments, the frame rate of the display element 1050 may be at least 60 Hz according to the frame rate of the human vision.

In addition, during the operation of the system 1300, the controller 740 may be configured to control each of the first PVH lens 1105 and the second PVH lens 1115 to switch between the active state and the non-active state. In some embodiments, when the display frame of the display element 1050 includes a first sub-frame and a second sub-frame, the controller 740 may be configured to control the first PVH lens 1105 and the second PVH lens 1115 to sequentially operate in the active state during the two sub-frames. The switching of the first PVH lens 1105 and the second PVH lens 1115 may be synchronized with the switching of the display element 1050 between displaying the distant virtual object and the close virtual object.

For example, during the first sub-frame, the controller 740 may be configured to control the display element 1050 to display only the distant virtual object, and output the image light 1332 representing the distant virtual object (as shown in FIG. 13A). In some embodiments, based on the eye tracking information provided by the eye tracking device (not shown), the controller 740 may determine a vergence distance $d_{v1}$ of the distant virtual object. Based on the determined eye tracking information, the controller 740 may control the first PVH lens 1105 to operate in the active state and the second PVH lens 1115 to operate in the non-active state. Referring to FIG. 13A, the lens assembly 1301 may image the distant virtual object to the first image plane 1305 having the first axial distance of $d_{a1}$ to the eyebox 759. In some embodiments, the first axial distance of $d_{a1}$ may be configured to be substantially equal to the vergence distance $d_{v1}$ of the distant virtual object. Thus, the eyes 760 placed at the exit pupil 757 within the eyebox 759 may accommodate for the distant virtual object.

During the second sub-frame, the controller 740 may be configured to control the display element 1050 to display only the close virtual object, and output the image light 1362 representing the close virtual object (as shown in FIG. 13B). Based on the eye tracking information provided by the eye tracking device (not shown), the controller 740 may determine a vergence distance $d_{v2}$ of the close virtual object. Based on the determined eye tracking information, the controller 740 may control the first PVH lens 1105 to operate in the non-active state and the second PVH lens 1115 to operate in the active state. Referring to FIG. 13B, the lens assembly 1301 may image the close virtual object to the second image plane 1310 having the second axial distance of $d_{a2}$ to the eyebox 759. In some embodiments, the second axial distance of $d_{a2}$ may be configured to be substantially equal to the vergence distance $d_{v2}$ of the close virtual object. Thus, the eyes 760 placed at the exit pupil 757 within the eyebox 759 may accommodate for the close virtual object.

Referring to FIGS. 10A-11 and FIGS. 13A and 13B, in some embodiments, the display element 1050 may include one or more narrowband light sources, e.g., one or more LEDs, a one or more SLEDs, one or more laser diodes, or a combination thereof, etc. In some embodiments, the one or more narrowband light sources may output narrowband blue, green, and red image lights each having a bandwidth (full width at half maximum (FWHM)) within a range of about 5 nm to 10 nm, a range of about 10 nm to 20 nm, a range of about 20 nm to 30 nm, or a range of about 30 nm to 40 nm, etc. For example, the display element 1050 may include a micro-LED display panel configured to emit blue, green, and red image lights each having a bandwidth of about 20 nm. In some embodiments, the display element 1050 may include a laser scanning display panel configured to emit blue, green, and red image lights each having a bandwidth of several nanometers, e.g., 5 nm. In some embodiments, referring to FIG. 10A, the reflection band of the reflective polarizer 1008 may substantially match with the emission band of the one or more narrowband light sources included in the display element 1050. In some embodiments, referring to FIG. 11 and FIGS. 13A and 13B, the reflection band of at least one of (e.g., each of) the first PVH element 1105 or the second PVH element 1115 may substantially match with the emission band of the one or more narrowband light sources included in the display element 1050.

Figure 12A:
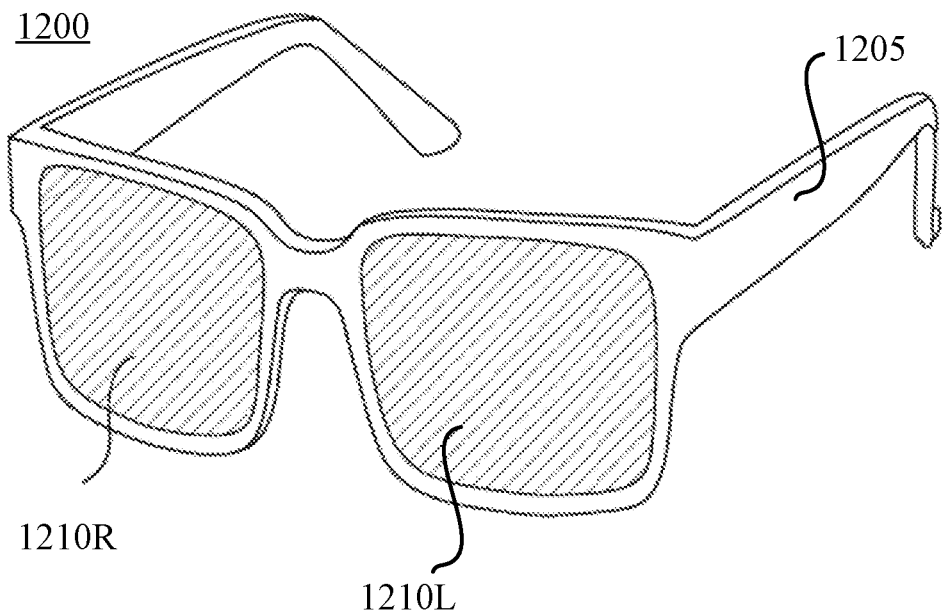
FIG. 12A illustrates a schematic diagram of an artificial reality device, according to an embodiment of the present disclosure.

FIG. 12A illustrates a schematic diagram of an artificial reality device 1200 according to an embodiment of the present disclosure. In some embodiments, the artificial reality device 1200 may produce VR, AR, and/or MR content for a user, such as images, video, audio, or a combination thereof. The artificial reality device 1200 may include one or more disclosed LCPH elements, and may provide an enhanced performance and user experience. In some embodiments, the artificial reality device 1200 may be smart glasses. In one embodiment, the artificial reality device 1200 may be a near-eye display ("NED"). In some embodiments, the artificial reality device 1200 may be in the form of eyeglasses, goggles, a helmet, a visor, or some other type of eyewear. In some embodiments, the artificial reality device 1200 may be configured to be worn on a head of a user (e.g., by having the form of spectacles or eyeglasses, as shown in FIG. 12A), or to be included as part of a helmet that is worn by the user. In some embodiments, the artificial reality device 1200 may be configured for placement in proximity to an eye or eyes of the user at a fixed location in front of the eye(s), without being mounted to the head of the user. In some embodiments, the artificial reality device 1200 may be in a form of eyeglasses which provide vision correction to a user's eyesight. In some embodiments, the artificial reality device 1200 may be in a form of sunglasses which protect the eyes of the user from the bright sunlight. In some embodiments, the artificial reality device 1200 may be in a form of safety glasses which protect the eyes of the user. In some embodiments, the artificial reality device 1200 may be in a form of a night vision device or infrared goggles to enhance a user's vision at night.

Figure 12B:
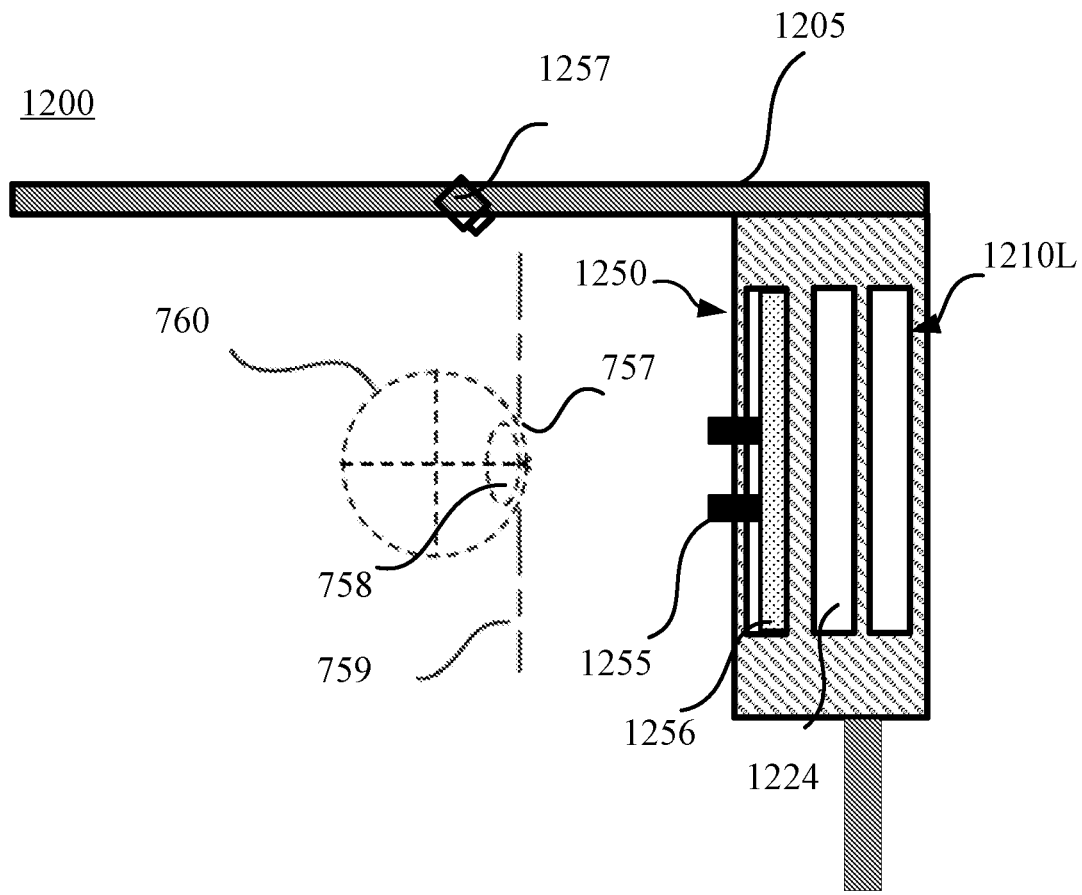
FIG. 12B schematically illustrates a cross-sectional view of half of the artificial reality device shown in FIG. 12A, according to an embodiment of the present disclosure.

For discussion purposes, FIG. 12A shows that the artificial reality device 1200 includes a frame 1205 configured to mount to a head of a user, and left-eye and right-eye display systems 1210L and 1210R mounted to the frame 1205. FIG. 12B is a cross-sectional view of half of the artificial reality device 1200 shown in FIG. 12A according to an embodiment of the present disclosure. For illustrative purposes, FIG. 12B shows the cross-sectional view associated with the left-eye display system 1210L. The frame 1205 is merely an example structure to which various components of the artificial reality device 1200 may be mounted. Other suitable type of fixtures may be used in place of or in combination with the frame 1205.

In some embodiments, the left-eye and right-eye display systems 1210L and 1210R each may include suitable image display components configured to generate virtual images, such as the display element 705 shown in FIG. 7, the display panel 901 and the light guide illumination assembly 903 shown in FIG. 9A, the display panel 982 and the light guide illumination assembly 903 shown in FIG. 9B, or the display element 1050 shown in FIG. 10A, FIG. 11, and FIGS. 13A and 13B, etc. In some embodiments, the left-eye and right-eye display systems 1210L and 1210R may each include a light guide display system, e.g., the system 800 shown in FIG. 8A or the system 850 in FIG. 8B. In some embodiments, the left-eye and right-eye display systems 1210L and 1210R may include one or more disclosed LCPH elements.

In some embodiments, the artificial reality device 1200 may also include a viewing optics system 1224 disposed between the left-eye display system 1210L or right-eye display system 1210R and the eyebox 759. The viewing optics system 1224 may be configured to guide an image light (representing a computer-generated virtual image) output from the left-eye display system 1210L or right-eye display system 1210R to propagate through one or more exit pupils 757 within the eyebox 759. For example, the viewing optics system 1224 may include the off-axis combiner 720 shown in FIG. 7, the lens assembly 853 shown in FIG. 8B, the lens assembly 902 shown in FIG. 9A or FIG. 9B, the path-folding lens assembly 1001 shown in FIG. 10A, the path-folding lens assembly 1101 shown in FIG. 11, or the path-folding lens assembly 1301 shown in FIGS. 13A and 13B, etc. In some embodiments, the viewing optics system 1224 may also be configured to perform a suitable optical adjustment of an image light output from the left-eye display system 1210L or right-eye display system 1210R, e.g., correct aberrations in the image light, adjust a position of the focal point of the image light in the eyebox 759, etc. In some embodiments, the viewing optics system 1224 may include one or more disclosed LCPH elements. In some embodiments, the viewing optics system 1224 may be omitted.

In some embodiments, as shown in FIG. 12B, the artificial reality device 1200 may also include an object tracking system 1250 (e.g., eye tracking system and/or face tracking system). In some embodiments, the object tracking system 1250 may include one or more disclosed LCPH elements. For example, the object tracking system 1250 may include one or more IR light sources 1255 configured to illuminate the eye 760 and/or the face, a light deflecting element 1256 configured to deflect the IR light reflected by the eye 760 toward an optical sensor 1257. The optical sensor 1257 may receive the IR light deflected by the deflecting element 1256 and generate a tracking signal (e.g., an eye tracking signal).

The foregoing description of the embodiments of the present disclosure have been presented for the purpose of illustration. It is not intended to be exhaustive or to limit the disclosure to the precise forms disclosed. Persons skilled in the relevant art can appreciate that modifications and variations are possible in beam of the above disclosure.

Any of the steps, operations, or processes described herein may be performed or implemented with one or more hardware and/or software modules, alone or in combination with other devices. In one embodiment, a software module is implemented with a computer program product including a computer-readable medium containing computer program code, which can be executed by a computer processor for performing any or all of the steps, operations, or processes described. In some embodiments, a hardware module may include hardware components such as a device, a system, an optical element, a controller, an electrical circuit, a logic gate, etc.

Embodiments of the present disclosure may also relate to an apparatus for performing the operations herein. This apparatus may be specially constructed for the specific purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. The non-transitory computer-readable storage medium can be any medium that can store program codes, for example, a magnetic disk, an optical disk, a read-only memory ("ROM"), or a random access memory ("RAM"), an Electrically Programmable read only memory ("EPROM"), an Electrically Erasable Programmable read only memory ("EEPROM"), a register, a hard disk, a solid-state disk drive, a smart media card ("SMC"), a secure digital card ("SD"), a flash card, etc. Furthermore, any computing systems described in the specification may include a single processor or may be architectures employing multiple processors for increased computing capability. The processor may be a central processing unit ("CPU"), a graphics processing unit ("GPU"), or any processing device configured to process data and/or perform computation based on data. The processor may include both software and hardware components. For example, the processor may include a hardware component, such as an application-specific integrated circuit ("ASIC"), a programmable logic device ("PLD"), or a combination thereof. The PLD may be a complex programmable logic device ("CPLD"), a field-programmable gate array ("FPGA"), etc.

Embodiments of the present disclosure may also relate to a product that is produced by a computing process described herein. Such a product may include information resulting from a computing process, where the information is stored on a non-transitory, tangible computer readable storage medium and may include any embodiment of a computer program product or other data combination described herein.

Further, when an embodiment illustrated in a drawing shows a single element, it is understood that the embodiment or an embodiment not shown in the figures but within the scope of the present disclosure may include a plurality of such elements. Likewise, when an embodiment illustrated in a drawing shows a plurality of such elements, it is understood that the embodiment or an embodiment not shown in the figures but within the scope of the present disclosure may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one figure/embodiment but not shown in another figure/embodiment may nevertheless be included in the other figure/embodiment. In any optical device disclosed herein including one or more optical layers, films, plates, or elements, the numbers of the layers, films, plates, or elements shown in the figures are for illustrative purposes only. In other embodiments not shown in the figures, which are still within the scope of the present disclosure, the same or different layers, films, plates, or elements shown in the same or different figures/embodiments may be combined or repeated in various manners to form a stack.

Various embodiments have been described to illustrate the exemplary implementations. Based on the disclosed embodiments, a person having ordinary skills in the art may make various other changes, modifications, rearrangements, and substitutions without departing from the scope of the present disclosure. Thus, while the present disclosure has been described in detail with reference to the above embodiments, the present disclosure is not limited to the above described embodiments. The present disclosure may be embodied in other equivalent forms without departing from the scope of the present disclosure. The scope of the present disclosure is defined in the appended claims.

What is claimed is:

1. A device, comprising:
a plurality of electrode layers;
a birefringent medium layer disposed between the plurality of electrode layers; and
at least one alignment structure disposed at a surface of the birefringent medium layer;
wherein the birefringent medium layer includes liquid crystal molecules arranged in a plurality of helical twist structures having a helical axis, and
wherein the plurality of electrode layers are configured to generate an electric field within the birefringent medium layer to align the liquid crystal molecules to be tilted with respect to the helical axis, and to align a direction of the helical axis extending throughout the birefringent medium layer to be parallel with a direction of the electric field.

2. The device of claim 1, wherein an angle of the liquid crystal molecules with respect to the helical axis is configured to be equal to or less than 30°.

3. The device of claim 1, wherein the birefringent medium layer includes a liquid crystal material, and a ratio between a bend elastic constant ($K_{33}$) and a twist elastic constant ($K_{22}$) of the liquid crystal material is configured to be less than 0.5.

4. The device of claim 3, wherein the liquid crystal material is a first liquid crystal material, and the birefringent medium layer further includes a second liquid crystal material, and a ratio between the bend elastic constant ($K_{33}$) and the twist elastic constant ($K_{22}$) of the second liquid crystal material is configured to be greater than 0.5.

5. The device of claim 4, wherein the second liquid crystal material has a greater weight percentage than the first liquid crystal material in the birefringent medium layer.

6. The device of claim 1, wherein a bandwidth of a reflection band of the birefringent medium layer is configured to be within a range of about 5 nm to 10 nm, a range of about 10 nm to 20 nm, a range of about 20 nm to 30 nm, or a range of about 30 nm to 40 nm.

7. The device of claim 1, wherein the direction of the electrode field is tilted with respect to the surface of the birefringent medium layer.

8. The device of claim 1, wherein the direction of the electrode field is perpendicular to the surface of the birefringent medium layer.

9. The device of claim 1, further comprising a controller configured to adjust an intensity of the electric field to adjust a helical pitch of the helical twist structures.

10. The device of claim 1, further comprising a controller configured to adjust the direction of the electric field to adjust the direction of the helical axis of the helical twist structures.

11. The device of claim 1, wherein the at least one alignment structure is configured to at least partially align the liquid crystal molecules located in close proximity to the surface of the birefringent medium layer to have an in-plane origination pattern.

12. The device of claim 11, further comprising a controller configured to adjust the direction of the electric field to adjust an in-plane pitch of the in-plane origination pattern.

13. The device of claim 1, wherein the plurality of electrode layers are patterned electrode layers including a plurality of patterned electrodes, and the direction of the electrode field is tilted with respect to the surface of the birefringent medium layer.

14. The device of claim 13, further comprising a controller configured to individually adjust voltages applied to the patterned electrodes.

15. The device of claim 1, wherein the birefringent medium layer includes a plurality of sub-layers configured with different helical pitches of the helical twist structures.

* * * * *